US006449884B1

(12) United States Patent
Watanabe et al.

(10) Patent No.: US 6,449,884 B1
(45) Date of Patent: Sep. 17, 2002

(54) METHOD AND SYSTEM FOR MANAGING CONSTRUCTION MACHINE, AND ARITHMETIC PROCESSING APPARATUS

(75) Inventors: Hiroshi Watanabe, Ushiku (JP); Koichi Shibata, Tsuchiura (JP); Hiroyuki Adachi, Tsuchiura (JP); Toichi Hirata, Ushiku (JP); Genroku Sugiyama, Ibaraki-ken (JP); Hideki Komatsu, Ibaraki-ken (JP)

(73) Assignee: Hitachi Construction Machinery Co., Ltd., Tokyo (JP)

( * ) Notice: Subject to any disclaimer, the term of this patent is extended or adjusted under 35 U.S.C. 154(b) by 0 days.

(21) Appl. No.: 09/979,078

(22) PCT Filed: Apr. 2, 2001

(86) PCT No.: PCT/JP01/02853

§ 371 (c)(1), (2), (4) Date: Nov. 16, 2001

(87) PCT Pub. No.: WO01/73226

PCT Pub. Date: Oct. 4, 2001

(30) Foreign Application Priority Data

Mar. 31, 2000 (JP) ........................................ 2000-98118

(51) Int. Cl.[7] ............................ E02F 9/20; G05B 23/02

(52) U.S. Cl. ................................ 37/348; 172/2; 701/50

(58) Field of Search ............................ 37/348; 701/50; 172/2

(56) References Cited

U.S. PATENT DOCUMENTS 6,141,629 A 10/2000 Yamamoto et al. ......... 702/187

FOREIGN PATENT DOCUMENTS

| | | |
|---|---|---|
| JP | 3-17321 | 1/1991 |
| JP | 2584371 | 8/1998 |
| JP | 11-36381 | 2/1999 |

*Primary Examiner*—Christopher J. Novosad
(74) *Attorney, Agent, or Firm*—Mattingly, Stanger & Malur, P.C.

(57) ABSTRACT

Hydraulic excavators 1 working in fields each include a controller 2, and an operating time is measured for each of an engine 32, a front 15, a swing body 13 and a track body 12. The measured data is stored in a memory of the controller 2, transferred to a base station computer 3 through satellite communication, an FD, etc., and stored in a database 100 of the base station computer 3. In the base station computer 3, the data stored in the database 100 is read out for each of the hydraulic excavators to obtain a value of an index (e.g., a travel ratio) regarding the state of use of a particular one of the hydraulic excavators and a distribution of the number of operated hydraulic excavators of the same model as the particular hydraulic excavator with respect to the index. The index value and that distribution are compared with each other to determine whether the particular hydraulic excavator is an optimum model. It is therefore possible to make an evaluation after confirming how a customer employs a machine, and to give an advice about the optimum model depending on the state of use of the machines.

17 Claims, 49 Drawing Sheets

FIG.9

MODEL TYPE ○○○○○ MODEL NO. × × × ×
NOV. 26 TO DEC. 26, 2000

| DATE | OIL SUPPLY | START HOUR | WORKING TIME (TIME OF DAY) 0 2 4 6 8 10 12 14 16 18 20 22 24 | WORKING TIME (HR) | FUEL REMAINED(%) | EXCA-VATION | SWING | TRAVEL |
|---|---|---|---|---|---|---|---|---|
| 11/26 | | 1238 | | 7.0 | 30 | 5.5 | 0.5 | 1.0 |
| 11/27 | | 1245 | | 7.6 | 40 | 5.9 | 0.8 | 0.9 |
| 11/28 | | 1253 | | 7.8 | 35 | 6.2 | 0.4 | 1.2 |
| 11/29 | | 1260 | | 7.0 | 45 | 6.0 | 0.4 | 0.9 |
| 11/30 | | 1268 | | 7.7 | 80 | 6.3 | 0.1 | 1.0 |
| 12/01 | | | | 8.0 | 70 | 6.5 | 0.4 | 1.1 |
| 12/02 | | | | | 70 | | | |
| 12/03 | | | | 7.0 | 65 | 5.8 | 0.4 | 0.8 |
| 12/04 | | | | 7.2 | 40 | : | : | : |
| 12/05 | | | | 8.6 | 45 | : | : | : |
| 12/06 | | | | 7.6 | 89 | : | : | : |
| 12/07 | | 1314 | | 7.8 | 76 | : | : | : |
| 12/08 | | 1322 | | 7.4 | 65 | : | : | : |
| 12/09 | | 1329 | | | 65 | | | |
| 12/10 | | 1329 | | 7.4 | 50 | : | : | : |
| 12/11 | | 1336 | | 7.7 | 45 | : | : | : |
| 12/12 | | 1344 | | 7.5 | 90 | : | : | : |
| 12/13 | | 1352 | | 8.0 | 80 | : | : | : |
| 12/14 | | 1360 | | 7.5 | 77 | : | : | : |
| 12/15 | | 1367 | | 8.0 | 70 | : | : | : |
| 12/16 | | 1375 | | | 70 | | | |
| 12/17 | | 1375 | | 7.6 | 65 | : | : | : |
| 12/18 | | 1383 | | 7.7 | 60 | : | : | : |
| 12/19 | | 1391 | | 8.3 | 55 | : | : | : |
| 12/20 | | 1399 | | 8.0 | 50 | : | : | : |
| 12/21 | | 1407 | | 8.0 | 45 | : | : | : |
| 12/22 | | 1415 | | 7.4 | 40 | : | : | : |
| 12/23 | | 1422 | | | 40 | | | |
| 12/24 | | 1422 | | 7.4 | 37 | : | : | : |
| 12/25 | | 1430 | | 7.8 | 35 | : | : | : |
| 12/26 | | 1437 | | 7.4 | 30 | : | : | : |
| | | | TOTAL | 213.1 | | | | |

OIL SUPPLY AMOUNT (LITER) 200

OIL SUPPLY AMOUNT 4710 (LITER)

AMOUNT OF FUEL CONSUMED 22.1 (LITER/HR)

METHOD AND SYSTEM FOR MANAGING CONSTRUCTION MACHINE, AND ARITHMETIC PROCESSING APPARATUS

TECHNICAL FIELD

The present invention relates to a method and system for managing a construction machine, and a processing apparatus. More particularly, the present invention relates to a method and system for managing a construction machine, and a processing apparatus, with which whether the model used by a customer is an optimum one can be evaluated for a construction machine, such as a hydraulic excavator, having a plurality of sections operated for different periods of time, e.g., a front operating device section, a swing section and a track or travel section.

BACKGROUND ART

When advising customers, who are going to purchase construction machines such as hydraulic excavators, about which type of model is optimum, machine makers generally offer an advice based on the specification data listed in catalogues, etc. after hearing the customer's demands.

DISCLOSURE OF INVENTION

However, which type of model is optimum should be judged depending on how the customer employs a machine in practice; and it is difficult to make such a judgment based on only the customer's demand and the specification data listed in catalogues.

In a hydraulic excavator, particularly, excavation frequency and travel frequency differ depending on in which state the machine is used by a customer. Correspondingly, the operating or working time also differs depending on sections of the machine. More specifically, a hydraulic excavator comprises various sections, i.e., an engine, a front operating device (hereinafter referred to simply as a "front"), a swing body, and a track or travel body. The engine is operated upon turning-on of a key switch, whereas the front, the swing body, and the track body are operated upon an operator's manipulation made during the engine operation. Thus, the engine running time, the front operating time, the swing time, and the travel time take different values from one another.

Conventionally, since the operating time for each section cannot be confirmed and hence how a customer employs a hydraulic excavator in practice cannot be confirmed, it has been difficult to evaluate and select an optimum model.

An object of the present invention is to provide a method and system for managing a construction machine, and a processing apparatus, which make it possible to confirm how a customer employs a machine in practice, and to evaluate whether the machine is an optimum model for the customer.

(1) To achieve the above object, according to the present invention, there is provided a method for managing a construction machine, the method comprising a first step of measuring an operation or working status for each of sections of each of a plurality of construction machines working in fields and including various models, and transferring the measured operation status to a base station computer and then storing and accumulating it as operation data in a database; and a second step of, in the base station computer, statistically processing the operation data and producing and outputting evaluation data for determining whether a particular one of the plurality of construction machines is an optimum model.

With those features, how a customer employs a machine in practice can be confirmed, and whether the machine is an optimum model for the customer can be evaluated. It is therefore possible to give an advice to the customer about the optimum model depending on the state of use by using the evaluation result.

(2) In above (1), preferably, the second step includes a third step of calculating, as the evaluation data, a value of at least one index regarding the state of use of the particular one of the plurality of construction machines based on the operation data, and determines based on the calculated index value whether the particular construction machine is an optimum model.

By thus calculating a value of at least one index regarding the state of use of the particular construction machine, how a customer employs the machine in practice can be confirmed, and whether the machine is an optimum model for the customer can be evaluated.

(3) In above (2), preferably, the second step further includes a fourth step of calculating, as the evaluation data, a value of the index for each of construction machines of the same model as the particular construction machine based on the operation data, thereby obtaining first correlation between the index and the number of operated construction machines, and compares the index value of the particular construction machine with the first correlation to determine whether the particular construction machine is an optimum model.

By thus obtaining and comparing the index value and the first correlation, how a customer employs the particular construction machine in practice can be confirmed from comparison with other construction machines of the same model, and whether that machine is an optimum model for the customer can be evaluated more appropriately.

(4) In above (3), preferably, the second step further includes a fifth step of calculating, as the evaluation data, a value of the index for each of construction machines of at least one of the various models of the plurality of construction machines, which differs from the model of the particular construction machine, based on the operation data, thereby obtaining second correlation between the index and the number of operated construction machines, and compares the index value of the particular construction machine with the first and second correlations to determine whether the particular construction machine is an optimum model.

By thus obtaining and comparing the index value and the first and second correlations, how a customer employs a construction machine (particular construction machine) in practice can be confirmed from comparison with other construction machines of the same model and other construction machines of different model, and whether that machine is an optimum model for the customer can be evaluated more appropriately.

(5) In above (1), preferably, the first step measures a load for each of said sections in addition to the operation status for each section, and stores and accumulates the measured load in the database of the base station computer; and the second step further includes a sixth of modifying the measured operation status depending on an amount of the measured load, and produces the evaluation data by using, as the operation data, the load-dependent modified operation status.

In a construction machine, not only the operation status but also the load differ one section to another, and the state of use of the machine varies depending on the amount of load of each section as well. By modifying the measured operation status for each section depending on load and producing the evaluation data by using the load-dependent modified operation status as the operation data, it is possible to compensate for differences in the state of use caused by differences in load, and to evaluate more appropriately whether that machine is an optimum model.

(6) In above (1) to (5), preferably, the operation status is represented by at lease one of an operating time and the number of times of operations.

With that feature, whether the machine is an optimum model for the customer can be evaluated more appropriately by employing any of the operating time and the number of times of operations.

(7) In above (1) to (5), preferably, the construction machine is a hydraulic excavator, and the section is any of a front, a swing body, a track body and an engine of the hydraulic excavator.

With those features, the operation status for each section, i.e., each of the front, the swing body, the track body and the engine of the hydraulic excavator, can be measured, and whether that hydraulic excavator is an optimum model for the customer can be evaluated more appropriately.

(8) In above (1) to (5), preferably, the construction machine is a hydraulic excavator; the sections include a front, a swing body, a track body and an engine of the hydraulic excavator; the operation status is represented by an operating time for each of the front, the swing body, the track body and the engine; and the index includes at least one of a ratio of an engine running time to a travel time, a ratio of the engine running time to a time during which a pump pressure is not lower than a predetermined value, the product of a ratio of the engine running time to a swing time and a bucket capacity, and the product of a ratio of the engine running time to an excavation time and an excavator body weight.

With those features, it is possible to confirm the state of use of the hydraulic excavator regarding travel, pump load, work amount of the bucket and swing, and amount of work requiring excavation force.

(9) In above (1) to (5), preferably, the construction machine is a hydraulic excavator; the sections include a front, a swing body and a track body of the hydraulic excavator; the operation status is represented by the number of times of operations for each of the front, the swing body and the track body; and the index includes at least one of a ratio of the total number of times of operations to the number of times of track operations, a ratio of the total number of times of operations to the number of times of operations in which a pump pressure is not lower than a predetermined value, the product of a ratio of the total number of times of operations to the number of times of track operations and a bucket capacity, and the product of a ratio of the total number of times of operations to the number of times of front operations and an excavator body weight.

With those features, it is similarly possible to confirm the state of use of the hydraulic excavator regarding travel, pump load, work amount of the bucket and swing, and amount of work requiring excavation force.

(10) Also, to achieve the above object, according to the present invention, there is provided a system for managing a construction machine, the system comprising data measuring and collecting means for measuring and collecting an operation status for each section of each of a plurality of construction machines working in fields and including various models; and a base station computer mounted in a base station and having a database in which the operation status measured and collected for each section is stored and accumulated as operation data, the base station computer including computing means for statistically processing the operation data to produce and output evaluation data for determining whether a particular one of the plurality of construction machines is an optimum model.

(11) In above (10), preferably, the computing means includes first means for calculating, as the evaluation data, a value of at least one index regarding the state of use of the particular one of the plurality of construction machines based on the operation data, and determines based on the calculated index value whether the particular construction machine is an optimum model.

(12) In above (11), preferably, the computing means further includes second means for calculating, as the evaluation data, a value of the index for each of construction machines of the same model as the particular construction machine based on the operation data, thereby obtaining first correlation between the index and the number of operated construction machines, and compares the index value of the particular construction machine with the first correlation to determine whether the particular construction machine is an optimum model.

(13) In above (12), preferably, the computing means further includes third means for comparing the index value of the particular construction machine with the first correlation to determine whether the particular construction machine is an optimum model.

(14) In above (12), preferably, the computing means further includes fourth means for calculating, as the evaluation data, a value of the index for each of construction machines of at least one of the various models of the plurality of construction machines, which differs from the model of the particular construction machine, based on the operation data, thereby obtaining second correlation between the index and the number of operated construction machines, and compares the index value of the particular construction machine with the first and second correlations to determine whether the particular construction machine is an optimum model.

(15) In above (14), preferably, the computing means further includes fifth means for comparing the index value of the particular construction machine with the first and second correlations to determine whether the particular construction machine is an optimum model.

(16) In above (10), preferably, the data measuring and collecting means measures and collects, in addition to the operation status for each section, a load for each section; the base station computer stores and accumulates the operation status and the load measured and collected for each section, as the operation data, in the database; and the computing means further includes sixth means for modifying the measured operation status depending on an amount of the measured load, and produces the evaluation data by using, as the operation data, the load-dependent modified operation status.

(17) Further, to achieve the above object, according to the present invention, there is provided a processing apparatus wherein an operation status for each section of each of a plurality of construction machines working in fields and including various models is stored and accumulated as operation data, and the operation data is statistically processed to produce and output evaluation data for determining whether a particular one of the plurality of construction machines is an optimum model.

BRIEF DESCRIPTION OF THE DRAWINGS

FIG. 9 is a table showing one example of a daily report transmitted to an in-house computer and a user side computer.

BEST MODE FOR CARRYING OUT THE INVENTION

Embodiments of the present invention will be described below with reference to the drawings.

Figure 1:
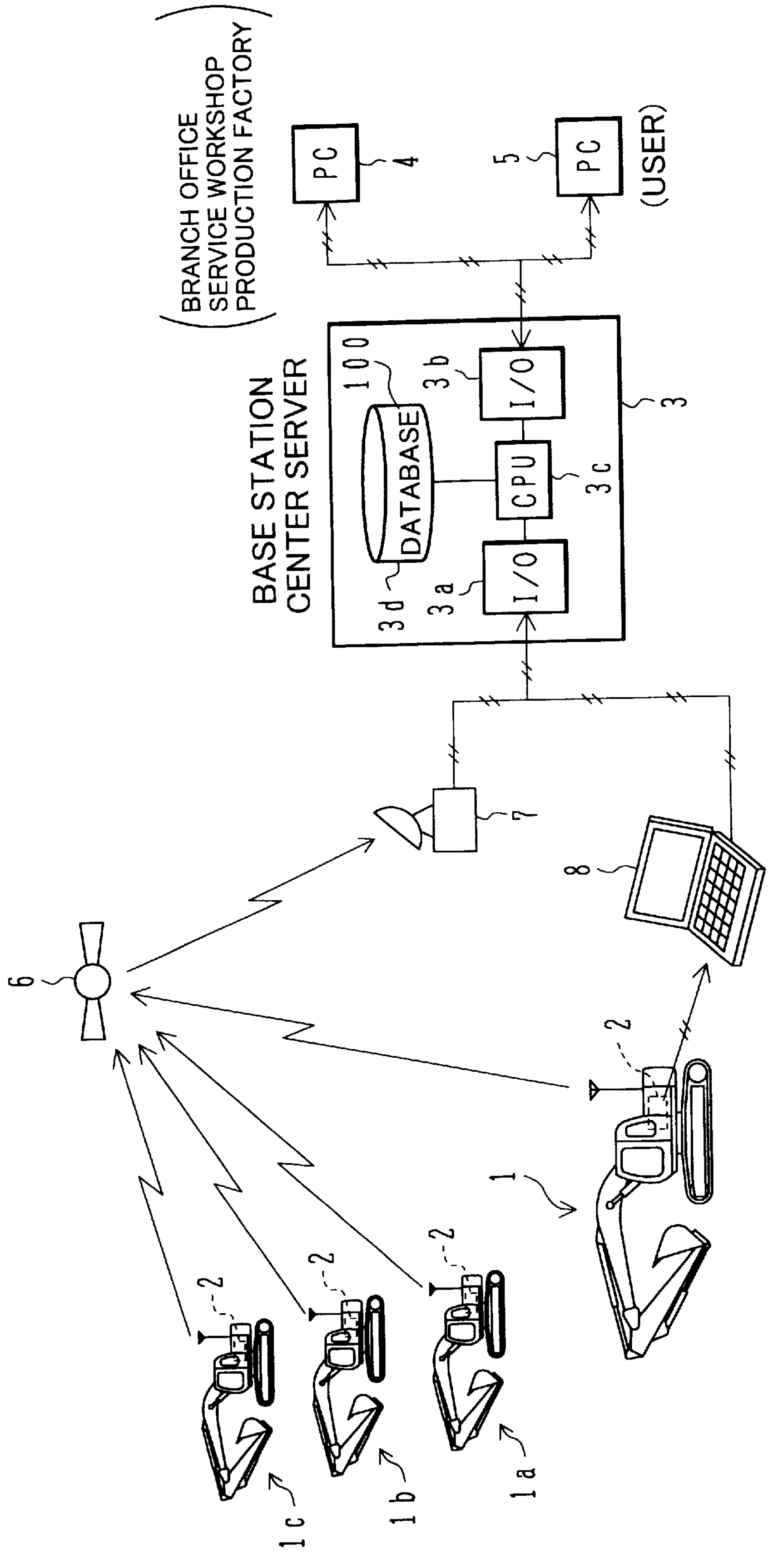
FIG. 1 shows an overall outline of a management system including a system for evaluating an optimum model of a construction machine according to a first embodiment of the present invention.

FIG. 1 shows an overall outline of a management system including a system for evaluating an optimum model of a construction machine according to a first embodiment of the present invention. The management system comprises machine side controllers 2 mounted on hydraulic excavators 1, 1*a*, 1*b*, 1*c*, . . . (hereinafter represented by numeral 1) working in fields; a base station center server 3 installed in a main office, a branch office, a production factory or the like; an in-house computer 4 installed in the branch office, a service workshop, the production factory or the like; and a user side computer 5. The base station center server 3 may be installed, in addition to the above-mentioned places, in any other desired place, for example, in a rental company possessing several units of hydraulic excavators.

The controller 2 in each hydraulic excavator 1 collects operation information of the hydraulic excavator 1. The collected operation information is sent along with machine body information (machine model and number) to a ground station 7 through satellite communication using a communication satellite 6, and then transmitted from the ground station 7 to the base station center server 3. The machine body/operation information may be taken into the base station center server 3 through a personal computer 8 instead of satellite communication. In such a case, a serviceman downloads the operation information collected by the controller 2 into the personal computer 8 along with the machine body information (machine model and number). The downloaded information is taken into the base station center server 3 from the personal computer 8 using a floppy disk or via a communication line such as a public telephone line or the Internet. When using the personal computer 8, in addition to the machine body/operation information of the hydraulic excavator 1, check information obtained by the routine inspection and repair information can also be collected through manual inputting by the serviceman. Such manually inputted information is similarly taken into the base station center server 3.

Figure 2:
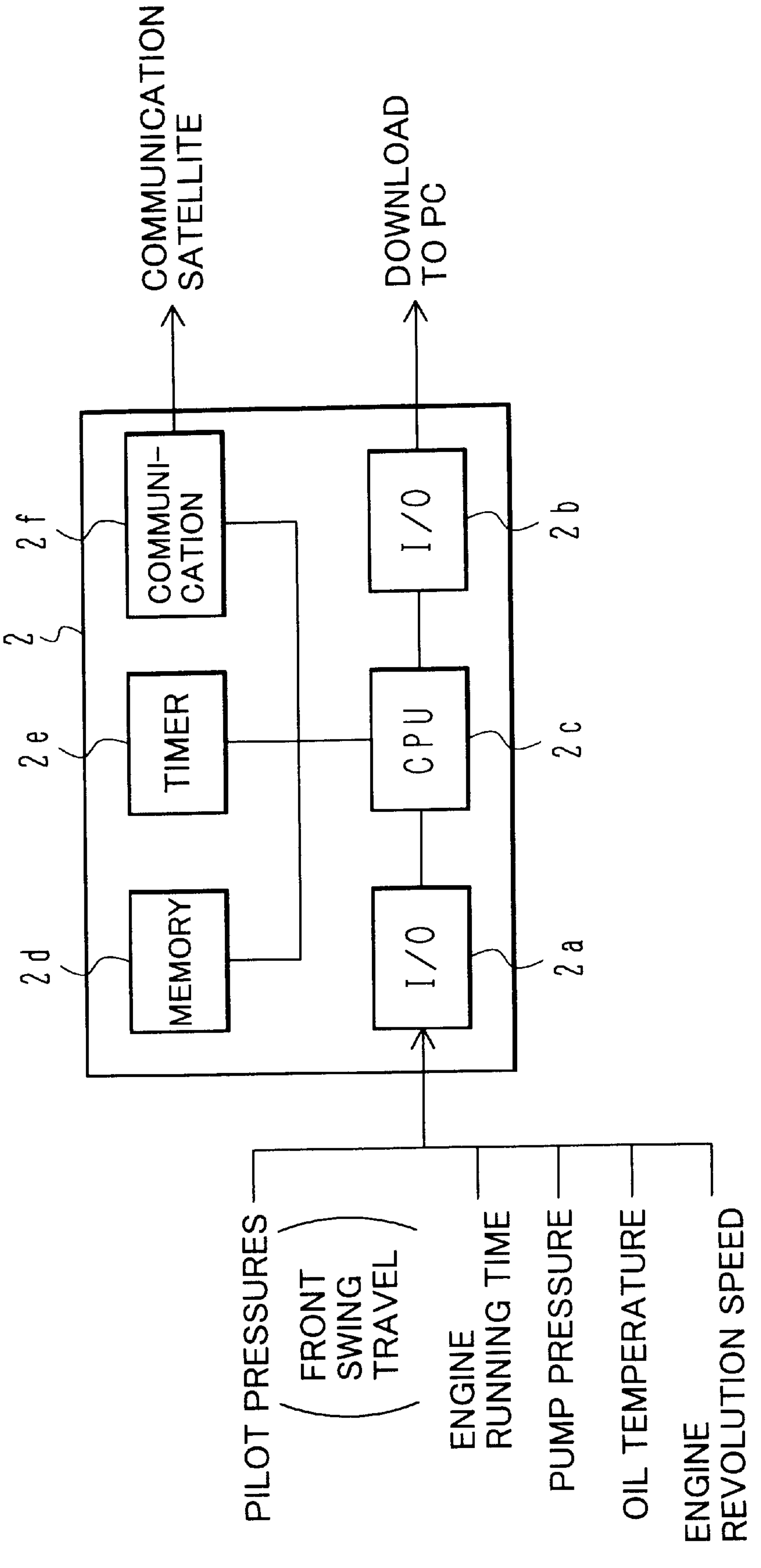
FIG. 2 shows details of the configuration of a machine side controller.

FIG. 2 shows details of the configuration of the machine side controller 2. In FIG. 2, the controller 2 comprises input/output interfaces 2*a*, 2*b*, a CPU (Central Processing Unit) 2*c*, a memory 2*d*, a timer 2*e*, and a communication control unit 2*f*.

The controller 2 receives, from a sensor group (described later) through the input/output interface 2*a*, detection signals of pilot pressures associated with the front, swing and track or travel; a detection signal of the operating time of the engine 32 (see FIG. 3) (hereinafter referred to as the "engine running time"); a detection signal of pump pressure in a hydraulic system; a detection signal of oil temperature in the hydraulic system; and a detection signal of the engine revolution speed. The CPU 2*c* processes those data of the received information into operation information in the predetermined form by using a timer (including the clocking function) 2*e*, and then stores the operation information in the memory 2*d*. The communication control unit 2*f* routinely transmits the operation information to the base station center server 3 through satellite communication. Also, the operation information is downloaded into the personal computer 8 through the input/output interfaces 2*b*.

Additionally, the machine side controller 2 includes a ROM for storing control programs, with which the CPU 2*c* executes the above-described processing, and a RAM for temporarily storing data used during the processing.

Figure 3:
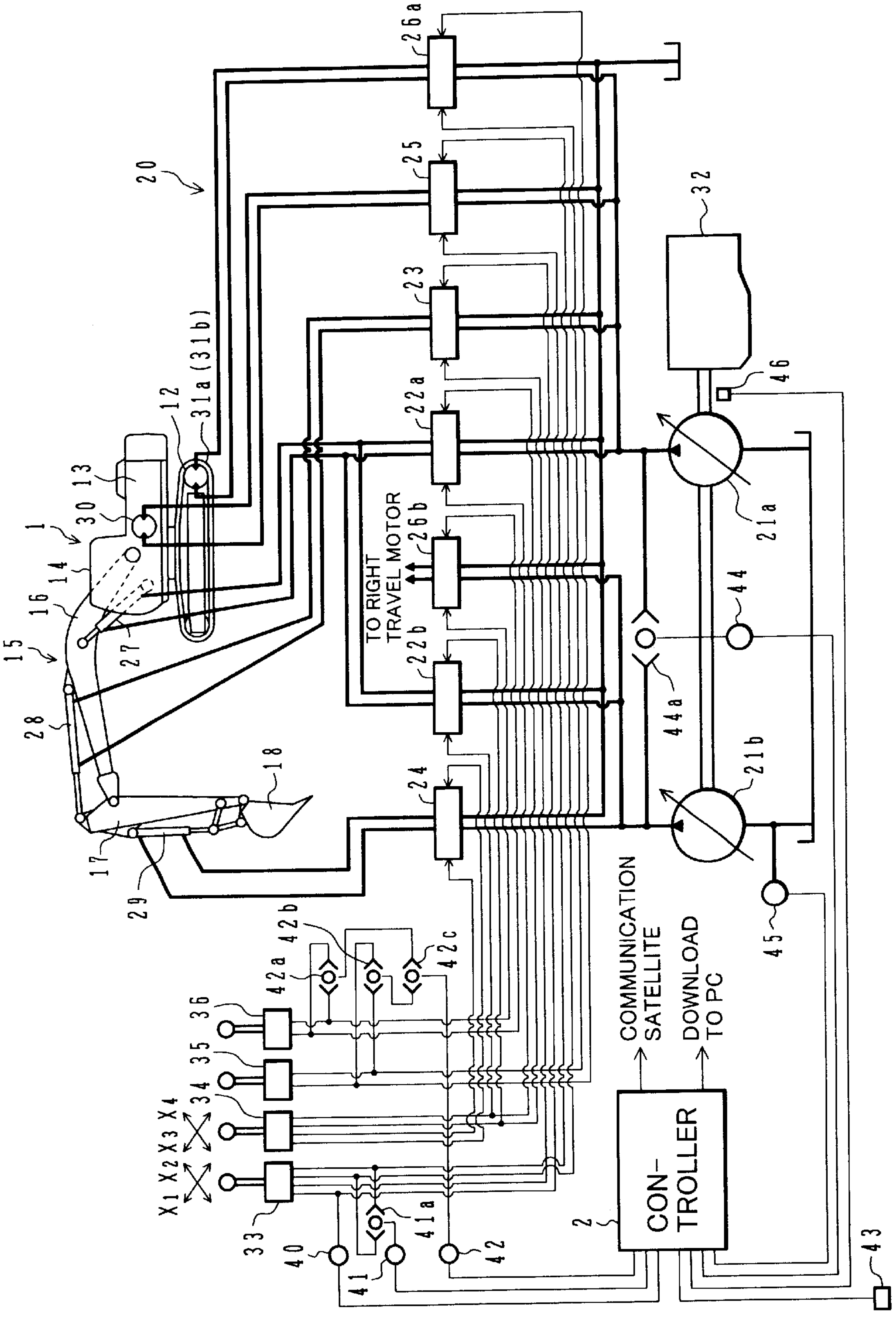
FIG. 3 shows details of a hydraulic excavator and a sensor group.

FIG. 3 shows details of the hydraulic excavator 1 and the sensor group. In FIG. 3, the hydraulic excavator 1 comprises a track or travel body 12; a swing body 13 rotatably mounted on the track body 12; a cab 14 provided in a front left portion of the swing body 13; and a front operating device (excavation device), i.e., a front 15, mounted to a front central portion of. the swing body 13 in a vertically rotatable manner. The front 15 is made up of a boom 16 rotatably provided on the swing body 13; an arm 17 rotatably provided at a fore end of the boom 16; and a bucket 18 rotatably provided at a fore end of the arm 17.

Also, a hydraulic system 20 is mounted on the hydraulic excavator 1. The hydraulic system 20 comprises hydraulic pumps 21*a*, 21*b* ; boom control valves 22*a*, 22*b*, an arm control valve 23, a bucket control valve 24, a swing control valve 25, and track or travel control valves 26*a*, 26*b* ; and a boom cylinder 27, an arm cylinder 28, a bucket cylinder 29, a swing motor 30, and track motors 31*a*, 31*b*. The hydraulic pumps 21*a*, 21*b* are driven for rotation by a diesel engine (hereinafter referred to simply as an "engine") 32 to deliver a hydraulic fluid (oil). The control valves 22*a*, 22*b* to 26*a*, 26*b* control flows (flow rates and flow directions) of the hydraulic fluid supplied from the hydraulic pumps 21*a*, 21*b* to the actuators 27 to 31*a* and 31*b*. The actuators 27 to 31*a* and 31*b* drive the boom 16, the arm 17, the bucket 18, the swing body 13, and the track body 12. The hydraulic pumps 21*a*, 21*b*, the control valves 22*a*, 22*b* to 26*a*, 26*b*, and the engine 32 are installed in an accommodation room formed in a rear portion of the swing body 13.

Control lever devices 33, 34, 35 and 36 are provided in association with the control valves 22*a*, 22*b* to 26*a*, 26*b*. When a control lever of the control lever device 33 is operated in one direction X1 of two crossing directions (+), an arm-crowding pilot pressure or an arm-dumping pilot pressure is generated and applied to the arm control valve 23. When the control lever of the control lever device 33 is operated in the other direction X2 of the two crossing directions (+), a rightward-swing pilot pressure or a leftward-swing pilot pressure is generated and applied to the swing control valve 25. When a control lever of the control lever device 34 is operated in one direction X3 of two crossing directions (+), a boom-raising pilot pressure or a boom-lowering pilot pressure is generated and applied to the boom control valves 22*a*, 22*b*. When the control lever of the control lever device 34 is operated in the other direction X4 of the two crossing directions (+), a bucket-crowding pilot pressure or a bucket-dumping pilot pressure is generated and applied to the bucket control valve 24. Further, when control levers of the control lever devices 35, 36 are operated, a left-track pilot pressure and a right-track pilot pressure are generated and applied to the track control valves 26*a*, 26*b*, respectively.

The control lever devices 33 to 36 are disposed in the cab 14 together with the controller 2.

Sensors 40 to 46 are provided in the hydraulic system 20 having the above-described construction. The sensor 40 is a pressure sensor for detecting the arm-crowding pilot pressure as an operation signal for the front 15. The sensor 41 is a pressure sensor for detecting the swing pilot pressure taken out through a shuttle valve 41*a*, and the sensor 42 is a pressure sensor for detecting the track or travel pilot pressure taken out through shuttle valves 42*a*, 42*b* and 42*c*. Also, the sensor 43 is a sensor for detecting the on/off state of a key switch of the engine 32, the sensor 44 is a pressure sensor for detecting a delivery pressure of the hydraulic pumps 21*a*, 21*b*, i.e., a pump pressure, taken out through a shuttle valve 44*a*, and the sensor 45 is an oil temperature sensor for detecting a temperature of working oil (oil temperature) in the hydraulic system 1. Further, the revolution speed of the engine 32 is detected by a revolution speed sensor 46. Signals from those sensors 40 to 46 are sent to the controller 2.

Returning to FIG. 1, the base station center server 3 comprises input/output interfaces 3*a*, 3*b*, a CPU 3*c*, and a storage device 3*d* in which a database 100 is formed. The input/output interface 3*a* receives the machine body/operation information and the check information from the machine side controller 2, and the input/output interface 3*b* receives the machine body information for each machine model and a request for evaluating an optimum model from the in-house computer 4. The CPU 3*c* stores and accumulates those data of the received information in the storage device 3*d* in the form of the database 100. Also, the CPU 3*c* processes the information stored in the database 100 to make a daily report, a diagnostic report, an optimum model evaluation result report, etc., and then transmits those reports to either one or both of the in-house computer 4 and the user side computer 5 via the input/output interface 3*b*.

Additionally, the base station center server 3 includes a ROM for storing control programs, with which the CPU 3*c* executes the above-described processing, and a RAM for temporarily storing data in the course of the processing.

Figure 4:
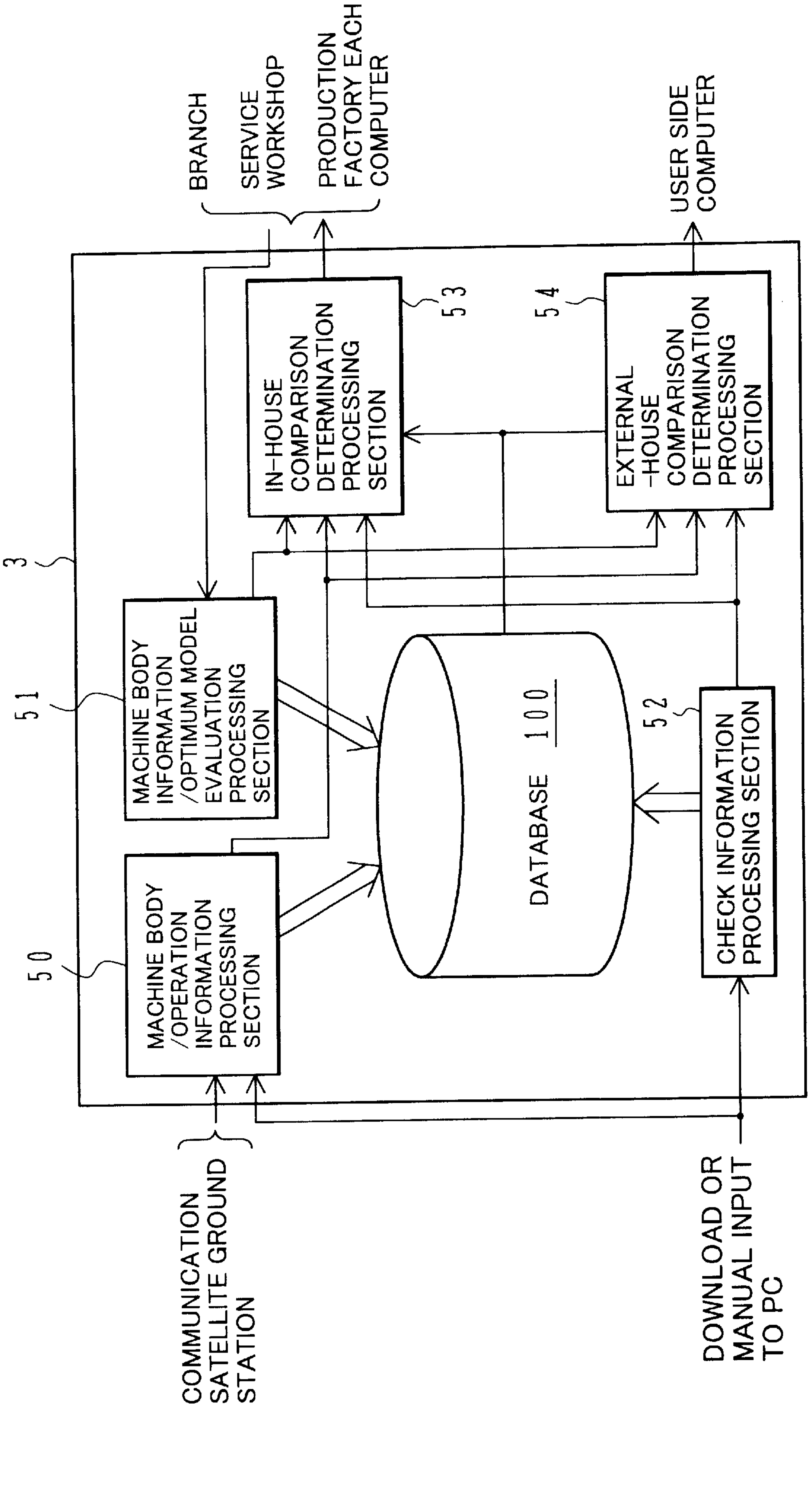
FIG. 4 is a functional block diagram showing an outline of processing functions of a CPU in a base station center server.

FIG. 4 is a functional block diagram showing an outline of processing functions of the CPU 3*c*. The CPU 3*c* has various processing functions executed by a machine body/operation information processing section 50, a machine body information/optimum model evaluation processing section 51, a check information processing section 52, an in-house comparison determination processing section 53, and an external-house comparison determination processing section 54. The machine body/operation information processing section 50 executes predetermined processing by using the operation information inputted from the machine side controller 2. The machine body information/optimum model evaluation processing section 51 executes predetermined processing based on the machine body information for each machine model and a request for evaluating an optimum model both inputted from the in-house computer 4 (as described later). The check information processing section 52 stores and accumulates the check information, inputted from the personal computer 8, in the database 100, and also processes the check information to make a diagnostic report. The in-house comparison determination processing section 53 and the external-house comparison determination processing section 54 select required data among from not only the information prepared by the machine body/operation information processing section 50, the machine body information/optimum model evaluation processing section 51 and the check information processing section 52, but also the information stored and accumulated in the database 100, and transmit the selected data to the in-house computer 4 and the user side computer 5.

The processing functions of the machine side controller 2 and the processing functions of the machine body/operation information processing section 50 and the machine body information/optimum model evaluation processing section 51 in the base station center server 3 will be described below with reference to flowcharts.

The processing function of the machine side controller 2 is mainly divided into the function of collecting an operating or working time for each section of the hydraulic excavator and the function of collecting frequency distribution data such as load frequency distribution for each section. Correspondingly, the machine body/operation information processing section 50 of the base station center server 3 has the function of processing the operating time and the function of collecting the frequency distribution data.

A description is first made of the function of collecting the operating time for each section of the hydraulic excavator, which is executed in the machine side controller 2.

Figure 5:
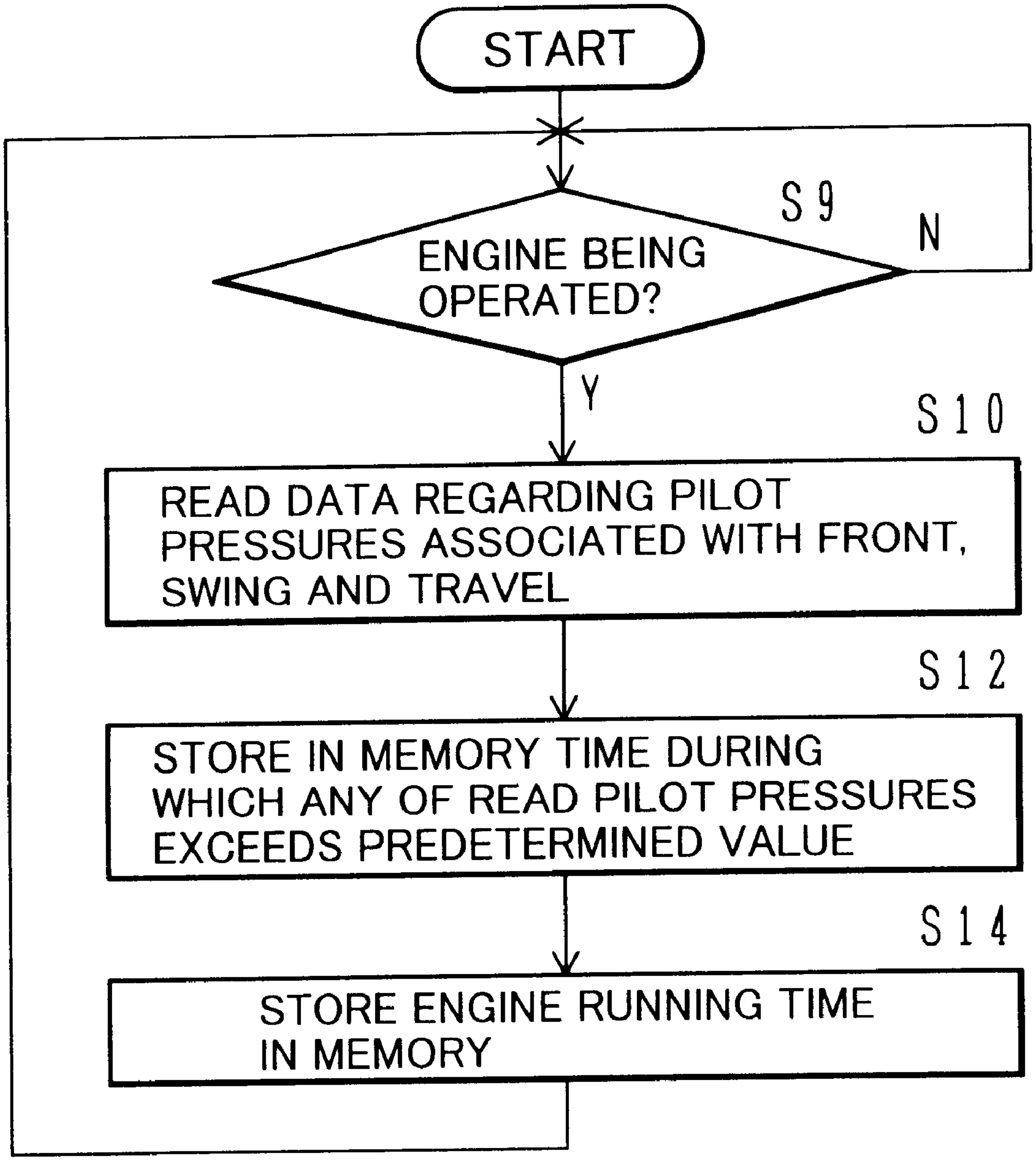
FIG. 5 is a flowchart showing the function of collecting an operating time for each section of a hydraulic excavator executed in a CPU of the machine side controller.
Figure 6:
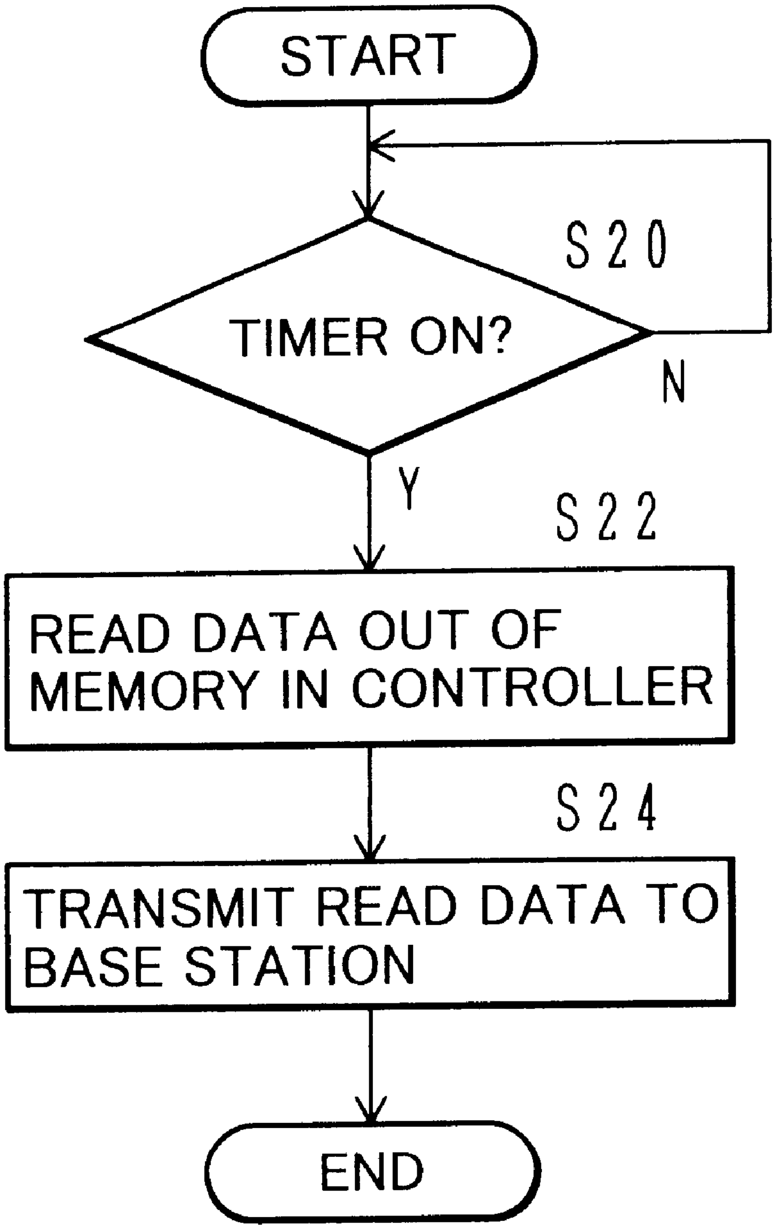
FIG. 6 is a flowchart showing the processing function of a communication control unit in the machine side controller executed when the collected operating time data is transmitted.

FIG. 5 is a flowchart showing the function of collecting the operating time for each section of the hydraulic excavator executed in the CPU 2*c* of the controller 2, and FIG. 6 is a flowchart showing the processing function of the communication control unit 2*f* in the controller 2 executed when the collected operating time data for each section is transmitted.

In FIG. 5, the CPU 2*c* first determines whether the engine revolution speed signal from the sensor 46 is of a value not lower than a predetermined revolution speed, and hence whether the engine is being operated (step S9). If it is determined that the engine is not being operated, step S9 is repeated. If it is determined that the engine is being operated, the CPU 2*c* proceeds to next step S10 and reads data regarding the pilot pressure detection signals associated with the front, swing and track from the sensors 40, 41 and 42 (step S10). Then, for each of the read pilot pressures associated with the front, swing and track, the CPU 2*c* calculates, using time information from the timer 2*e*, a time during which the pilot pressure exceeds a predetermined pressure, and stores and accumulates the calculated result in the memory 2*d* in correspondence to the date and the time of day (step S12). Herein, the predetermined pressure represents a pilot pressure that can be regarded as indicating that each of the front, swing and track operations has been performed. Also, while it is determined in step S9 that the engine is being operated, the CPU 2*c* calculates an engine running time using time information from the timer 2*e*, and stores and accumulates the calculated result in the memory 2*d* in correspondence to the date and the time of day (step S14). The CPU 2*c* executes the above-described processing at a predetermined cycle during a period of time in which power supplied to the controller 2 is turned on.

The operating time calculated in each of steps S12, S14 may be added to the corresponding time calculated in the past and stored in the memory 2*d*, and may be stored as an accumulative operating time.

In FIG. 6, the communication control unit 2*f* monitors whether the timer 2*e* is turned on (step S20). When the timer 2*e* is turned on, the CPU reads the operating time for each section of the front, swing and track, the engine running time (including the date and the time of day), and the machine body information, which are stored and accumulated in the memory 2*d* (step S22), and then transmits the read data to the base station center server 3 (step S24). The timer 2*e* is set to turn on at the fixed time of day, for example, at a.m. 0. By so setting the timer, when it becomes a.m. 0, the operating time data for one preceding day is transmitted to the base station center server 3.

The CPU 2*c* and the communication control unit 2*f* repeat the above-described processing everyday. The data stored in the CPU 2*c* is erased when a predetermined number of days, e.g., 365 days (one year), have lased after the transmission to the base station center server 3.

Figure 7:
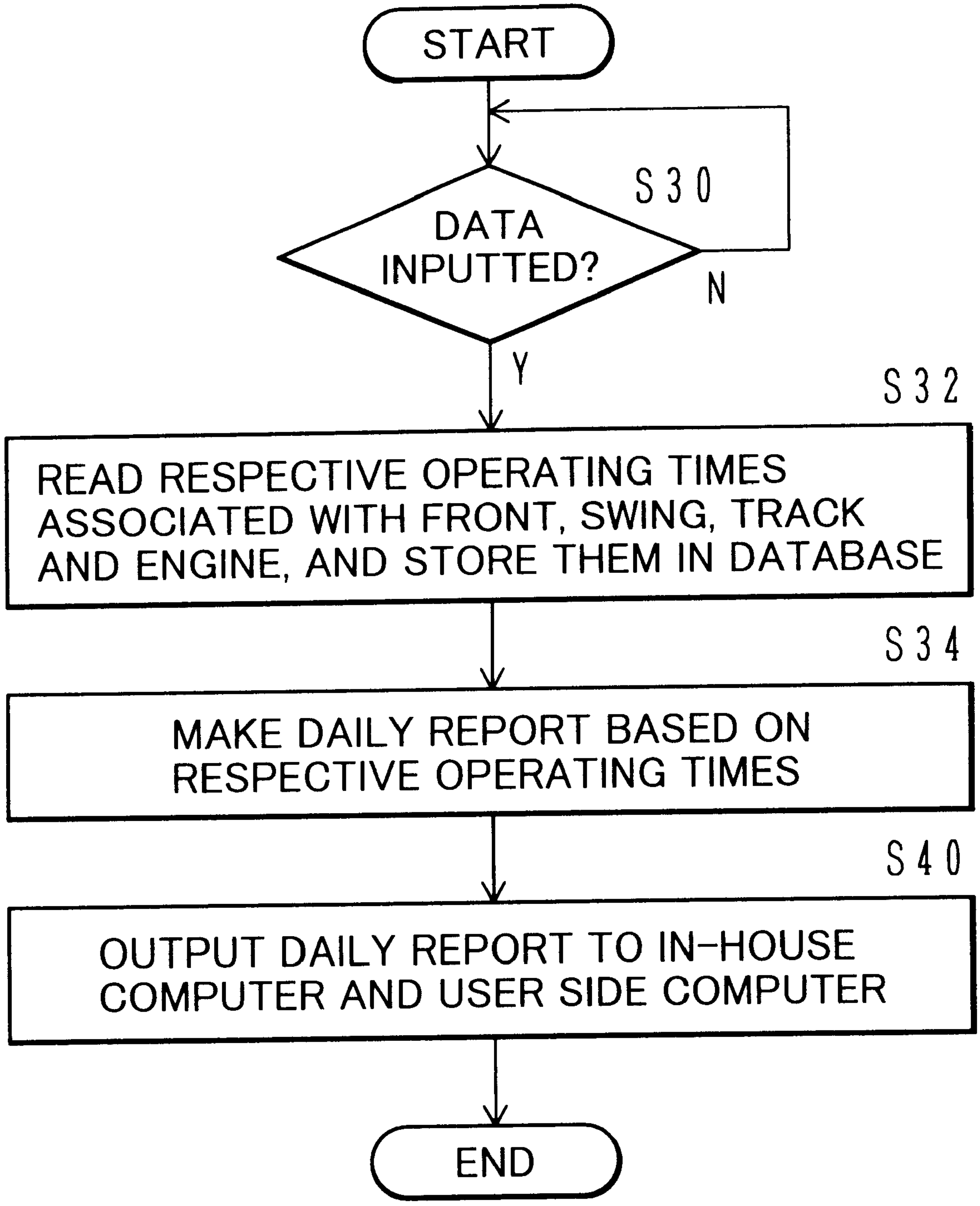
FIG. 7 is a flowchart showing the processing function of a machine body/operation information processing section in the base station center server executed when the operating time data is transmitted from the machine side controller.

FIG. 7 is a flowchart showing the processing function of the machine body/operation information processing section 50 in the center server 3 executed when the machine body/operation information is transmitted from the machine side controller 2.

In FIG. 7, the machine body/operation information processing section 50 monitors whether the machine body/operation information is inputted from the machine side controller 2 (step S30). When the machine body/operation information is inputted, the processing section 50 reads the inputted information, and then stores and accumulates it as operation data (see FIG. 8) in the database 100 (step S32). The machine body information contains, as described above, the machine model and number. Subsequently, the processing section 50 reads the operation data for a predetermined number of days, e.g., one month, out of the database 100 and makes a daily report regarding the operating time (step S34). Thereafter, the thus-prepared daily report and a maintenance report are transmitted to the in-house computer 4 and the user side computer 5 (step S40).

Figure 8:
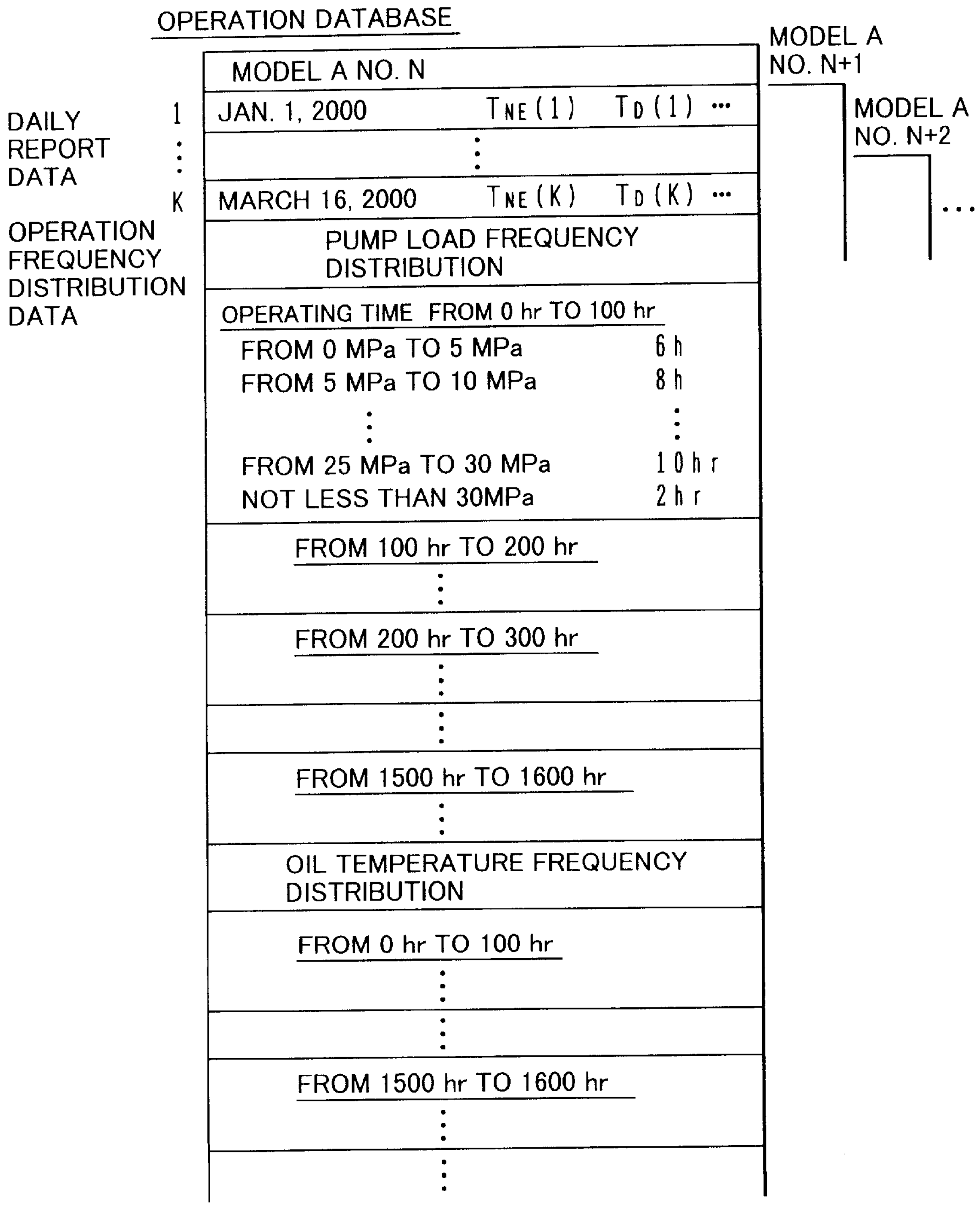
FIG. 8 shows how operation data is stored as a database in the base station center server.

FIG. 8 shows how the operation data is stored in the database 100.

The database 100 contains, as shown in FIG. 8, a database section (hereinafter referred to as an "operation database") in which the operation data per machine model and number is stored and accumulated. The operation database stores data as given below.

Referring to FIG. 8, the engine running time, the front operation time (hereinafter referred to also as the "excavation time"), the swing time, and the travel time per machine model and number are stored in the operation database per machine model and number as daily report data in the form of accumulative values in correspondence to the date. In an illustrated example, $T_{NE}(1)$ and $T_D(1)$ represent respectively an accumulative value of the engine running time and an accumulative value of the front operation time for a No. N machine of model A as of Jan. 1, 2000. $T_{NE}(K)$ and $T_D(K)$ represent respectively an accumulative value of the engine running time and an accumulative value of the front operation time for the No. N machine of model A as of Mar. 16, 2000. Similarly, accumulative values $T_S(1)$ to $T_S(K)$ of the swing time and accumulative values $T_T(1)$ to $T_T(K)$ of the travel time for the No. N machine of model A are stored in correspondence to the date. Similar data is also stored for a No. N+1 machine, a No. N+2 machine, etc. of model A.

Further, the operation database stores the frequency distribution data, although this point will be described below.

Figure 10:
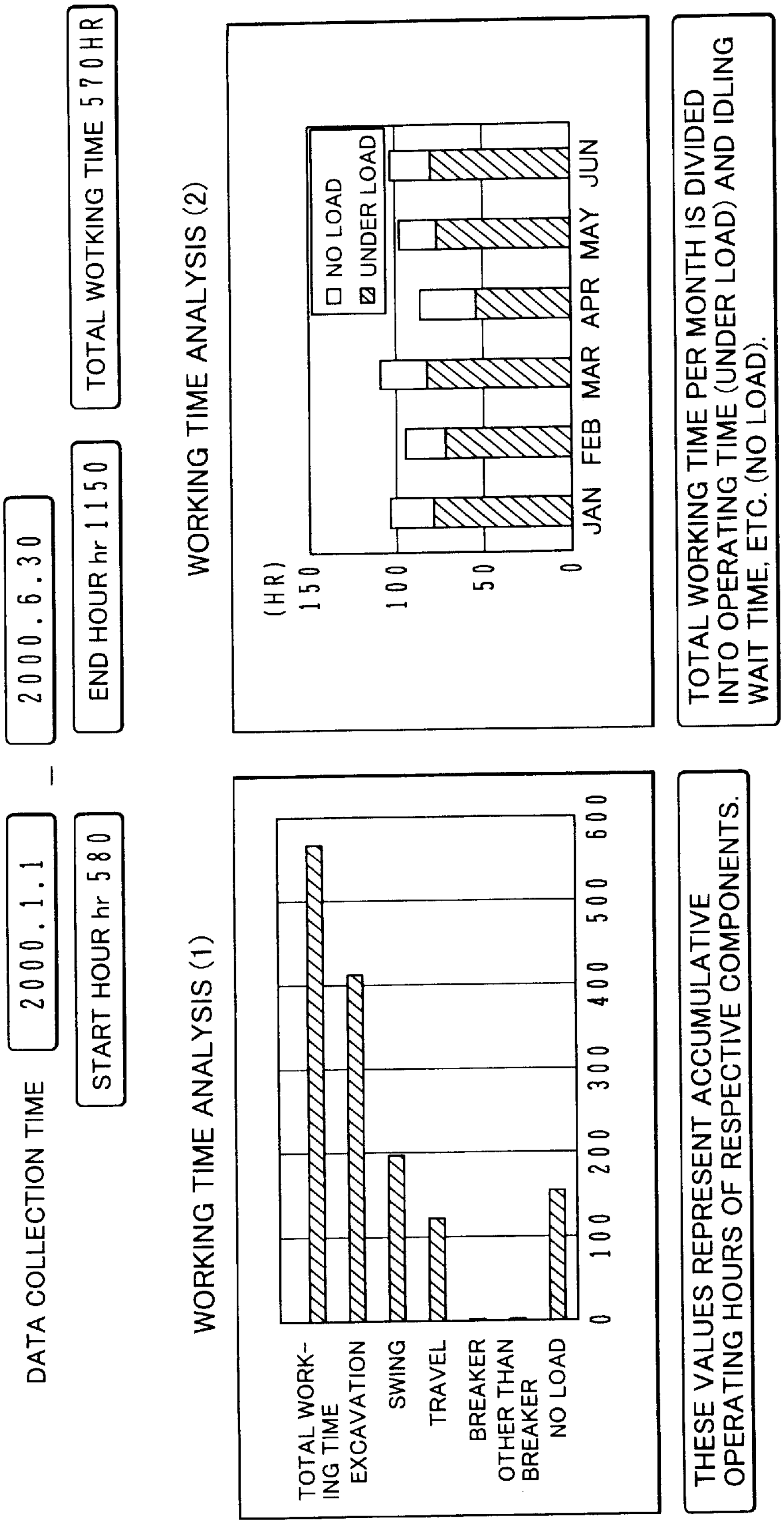
FIG. 10 is a table showing one example of a daily report transmitted to an in-house computer and a user side computer.

FIGS. 9 and 10 each show one example of the daily report,transmitted to the in-house computer 4 and the user side computer 5. FIG. 9 shows each operating time data for one month in the form of graph and numerical value in correspondence to the date. Base on FIG. 9, the user can confirm changes in the state of use of the owned hydraulic excavator for the past one month. The left side of FIG. 10 graphically shows the operating time for each section and the engine running time under no load for the past half year, and the right side of FIG. 10 graphically shows transition of a ratio between the engine running time under load and the engine running time under no load for the past half year. Base on FIG. 10, the user can confirm changes in the state and efficiency of use of the owned hydraulic excavator for the past half year.

Figure 11:
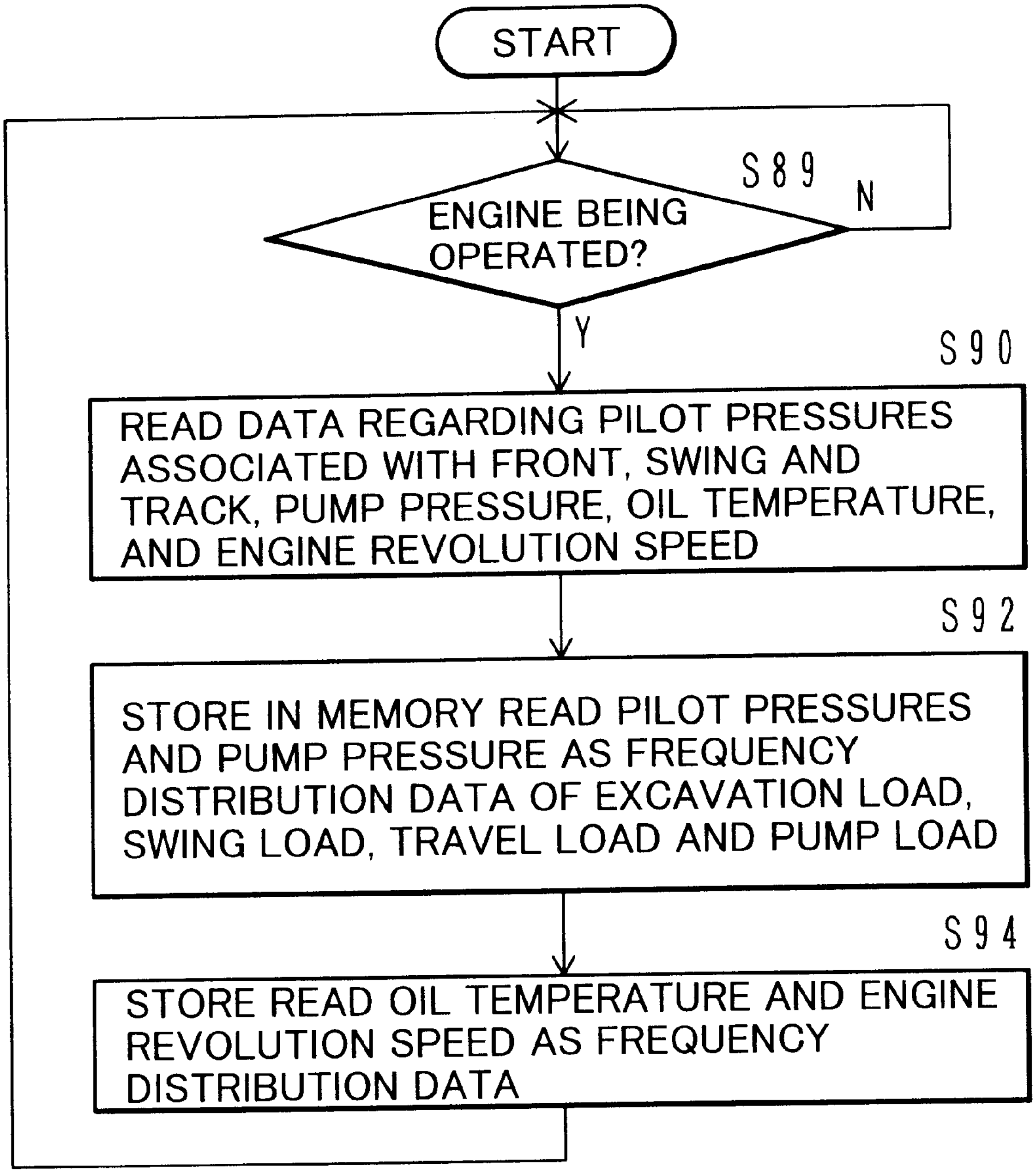
FIG. 11 is a flowchart showing the function of collecting frequency distribution data executed in the machine side controller.

The function of collecting the frequency distribution data executed in the machine side controller 2 will next be described with reference to FIG. 11. FIG. 11 is a flowchart showing the processing function of the CPU 2*c* in the controller 2.

In FIG. 11, the CPU 2*c* first determines whether the engine revolution speed signal from the sensor 46 is of a value not lower than a predetermined revolution speed, and hence whether the engine is being operated (step S89). If it is determined that the engine is-not being operated, step S89 is repeated. If it is determined that the engine is being operated, the CPU 2*c* proceeds to next step S90 and reads data regarding the pilot pressure detection signals associated with the front, swing and track from the sensors 40, 41 and 42, the pump pressure detection signal from the sensor 44, the oil temperature detection signal from the sensor 45, and the engine revolution speed detection signal from the sensor 46 (step S90). Then, of the read data, the pilot pressures associated with the front, swing and track and the pump pressure are stored in the memory 2*d* as the frequency distribution data of excavation load, swing load, travel load and pump load, respectively (step S92). The read oil temperature and engine revolution speed are also stored in the memory 2*d* as the frequency distribution data (step S94).

While the engine is being operated, steps S90 to S94 are repeated.

Herein, the frequency distribution data represents data resulting from obtaining a distribution of detected values per predetermined time, e.g., 100 hours, with respect to the pump pressure or the engine revolution speed. Also, the predetermined time (100 hours) is of a value on the basis of engine running time. Alternatively, the predetermined time may be of a value on the basis of the operating time for each section.

Figure 12:
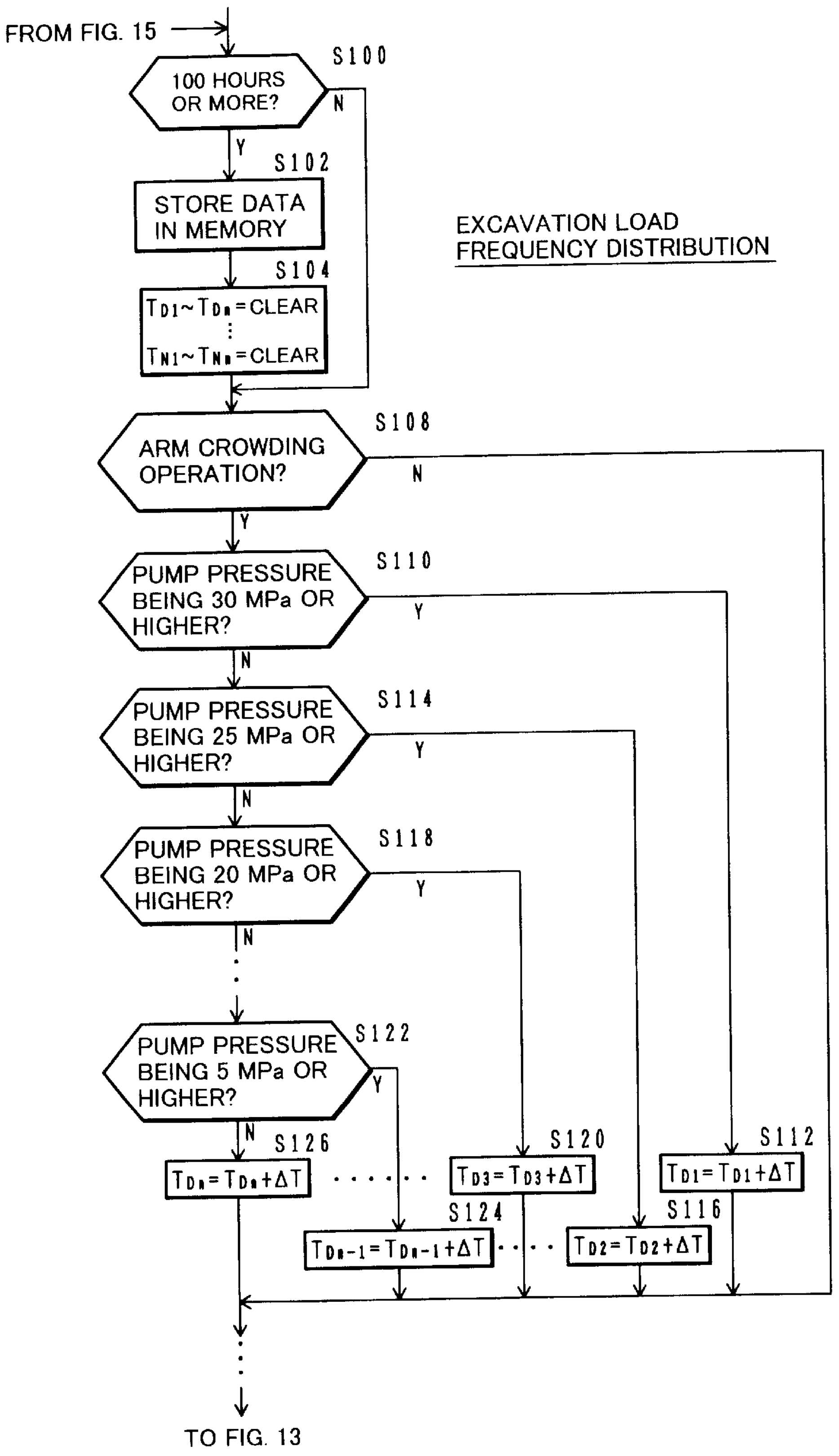
FIG. 12 is a flowchart showing details of processing procedures for preparing frequency distribution data of excavation load.

FIG. 12 is a flowchart showing details of processing procedures for preparing the frequency distribution data of excavation load.

The CPU first determines whether the engine running time has exceeded 100 hours after entering this processing (step S100). If it does not yet exceed 100 hours, the CPU then determines, using the signal from the sensor 40, whether the hydraulic excavator is in the state of arm crowding operation (under excavation) (step S108). If the hydraulic excavator is in the state of arm crowding operation (under excavation), the CPU determines, using the signal from the sensor 44, whether the pump pressure is, e.g., 30 MPa or higher (step S110). If the pump pressure is 30 MPa or higher, a unit time (computation cycle time) $\Delta T$ is added to an accumulative time $T_{D1}$ for the pressure zone of 30 MPa or higher, and the resulting sum is set to a new accumulative time $T_{D1}$ (step S112). If the pump pressure is not 30 MPa or higher, the CPU determines whether the pump pressure is 25 MPa or higher (step S114). If the pump pressure is 25 MPa or higher, the unit time (computation cycle time) $\Delta T$ is added to an accumulative time $T_{D2}$ for the pressure zone of 25 to 30 MPa, and the resulting sum is set to a new accumulative time $T_{D2}$ (step S116). Similarly, for the other pressure zones of 20 to 25 MPa, . . . , 5 to 10 MPa, and 0 to 5 MPa, if the pump pressure is in any of those pressure zones, the unit time $\Delta T$ is added to an accumulative time $T_{D3}$, . . . , $T_{Dn-1}$, or $T_{Dn}$ for the corresponding pressure zone, and the resulting sum is set to a new accumulative time $T_{D3}$, . . . , $T_{Dn-1}$, or $T_{Dn}$ (steps S118 to S126).

The processing procedures for preparing the frequency distribution data of swing load and travel load are the same as those shown in FIG. 12 except for that, in the process of step S108 in FIG. 12, the CPU determines using the sensor 44 whether the hydraulic excavator is in the state of swing operation, or determines using the sensor 42 whether the hydraulic excavator is in the state of travel operation, instead of determining, using the signal from the sensor 40, whether the hydraulic excavator is in the state of arm crowding operation (under excavation).

Figure 13:
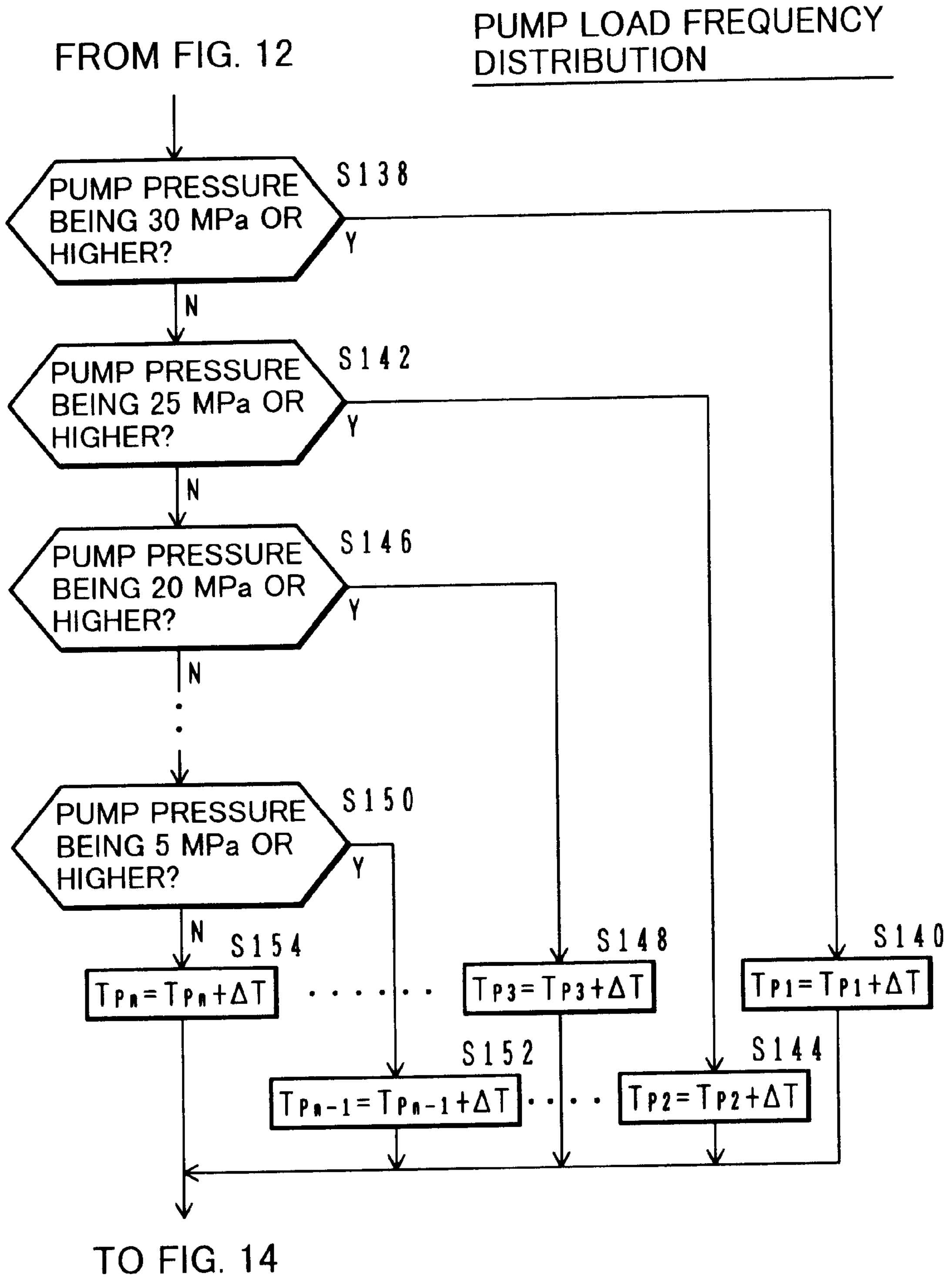
FIG. 13 is a flowchart showing details of processing procedures for preparing frequency distribution data of hydraulic pump load.

Next, the CPU proceeds to the processing, shown in FIG. 13, for preparing the frequency distribution data of pump load of the hydraulic pumps 21*a*, 21*b*.

The CPU first determines, using the signal from the sensor 44, whether the pump pressure is, e.g., 30 MPa or higher (step S138). Then, if the pump pressure is 30 MPa or higher, the unit time (computation cycle time) $\Delta T$ is added to an accumulative time $T_{P1}$ for the pressure zone of 30 MPa or higher, and the resulting sum is set to a new accumulative time $T_{P1}$ (step S140). If the pump pressure is not 30 MPa or higher, the CPU determines whether the pump pressure is 25 MPa or higher (step S142). If the pump pressure is 25 MPa or higher, the unit time (computation cycle time) $\Delta T$ is added to an accumulative time $T_{P2}$ for the pressure zone of 25 to 30 MPa, and the resulting sum is set to a new accumulative time $T_{P2}$ (step S144). Similarly, for the other pressure zones of 20 to 25 MPa, . . . , 5 to 10 MPa, and 0 to 5 MPa, if the pump pressure is in any of those pressure zones, the unit time $\Delta T$ is added to an accumulative time $T_{P3}$, . . . , $T_{Pn-1}$, or $T_{Pn}$ for the corresponding pressure zone, and the resulting sum is set to a new accumulative time $T_{P3}$, . . . , $T_{Pn-1}$, or $T_{Pn}$ (steps S146 to S154).

Figure 14:
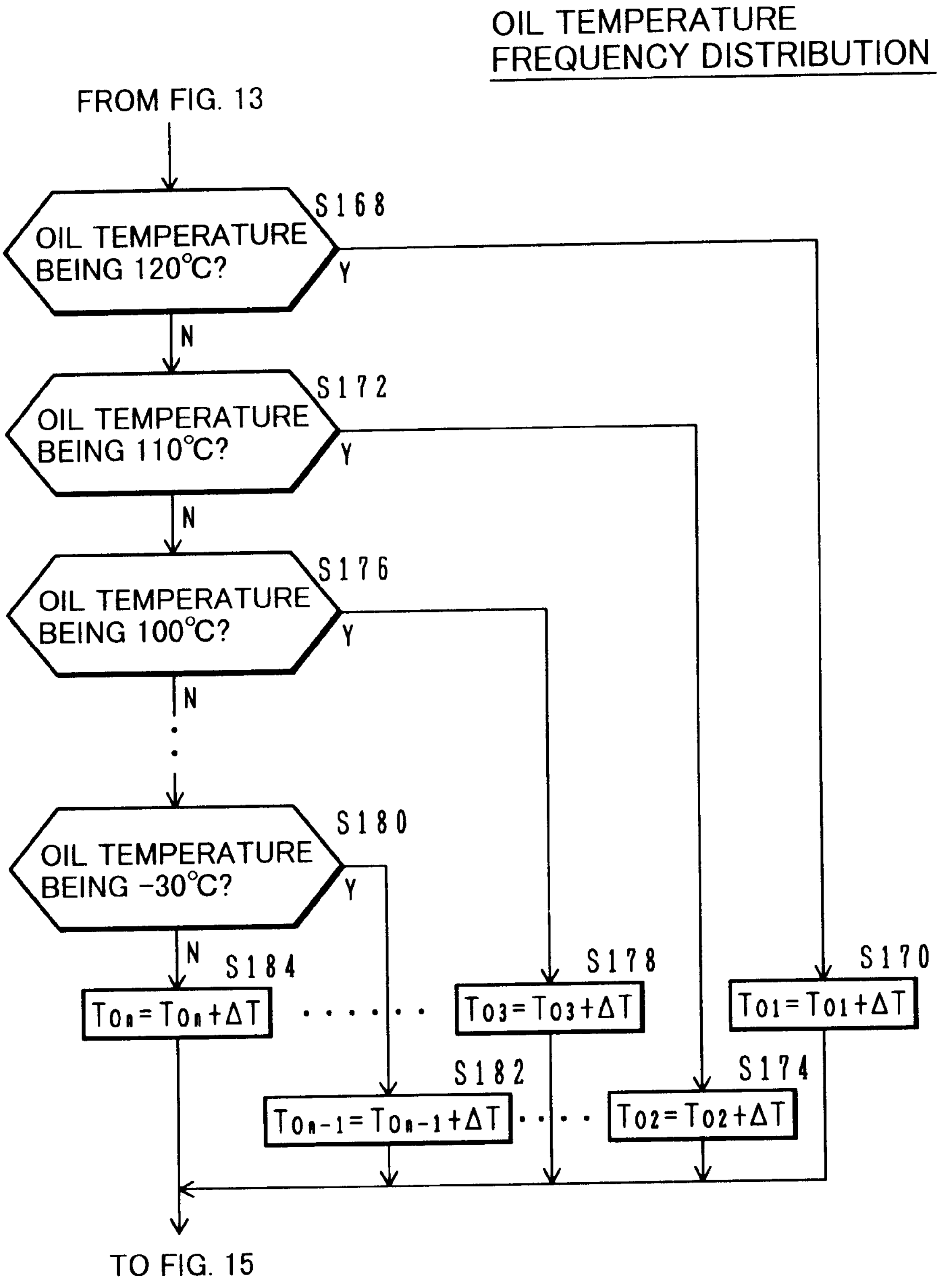
FIG. 14 is a flowchart showing details of processing procedures for preparing frequency distribution data of oil temperature.

Next, the CPU proceeds to the processing, shown in FIG. 14, for preparing the frequency distribution data of oil temperature.

The CPU first determines, using the signal from the sensor 45, whether the oil temperature is, e.g., 120° C. or higher (step S168). Then, if the oil temperature is 120° C. or higher, the unit time (computation cycle time) $\Delta T$ is added to an accumulative time $T_{O1}$ for the temperature zone of 120° C. or higher, and the resulting sum is set to a new accumulative time $T_{O1}$ (step S170). If the oil temperature is not 120 C. or higher, the CPU determines whether the oil temperature is 110° C. or higher (step S172). If the oil temperature is 110° C. or higher, the unit time (computation cycle time) $\Delta T$ is added to an accumulative time $T_{O2}$ for the temperature zone of 110 to 120° C., and the resulting sum is set to a new accumulative time $T_{O2}$ (step S174). Similarly, for the other temperature zones of 100 to 110° C., . . . , −30 to −20° C., and lower than −30° C., if the oil temperature is in any of those temperature zones, the unit time $\Delta T$ is added to an accumulative time $T_{O3}$, . . . , $T_{On-1}$, or $T_{On}$ for the corresponding temperature zone, and the resulting sum is set to a new accumulative time $T_{O3}$, . . . , $T_{On-1}$, or Ton (steps S176 to S184).

Figure 15:
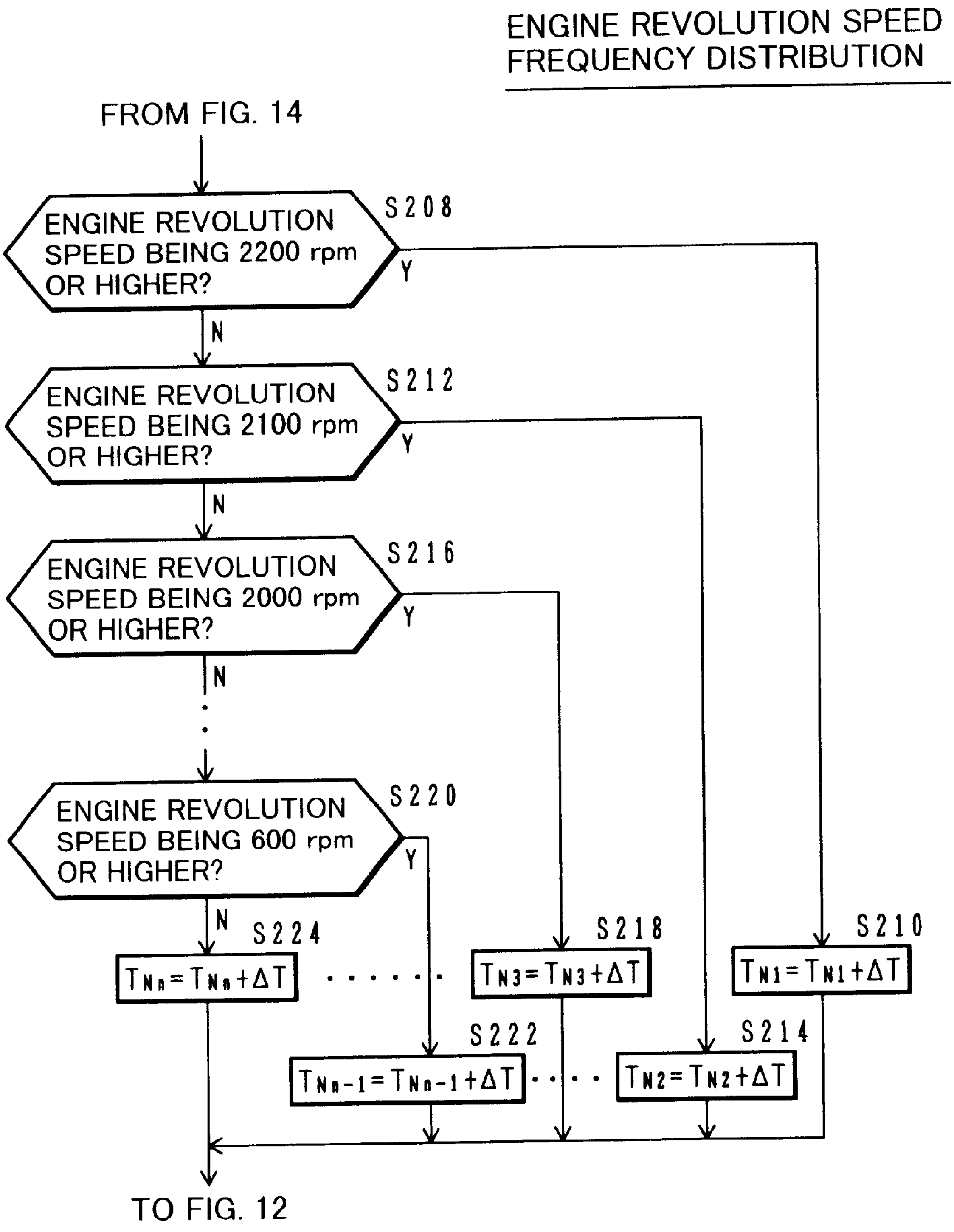
FIG. 15 is a flowchart showing details of processing procedures for preparing frequency distribution data of engine revolution speed.

Next, the CPU proceeds to the processing, shown in FIG. 15, for preparing the frequency distribution data of engine revolution speed.

The CPU first determines, using the signal from the sensor 46, whether the engine revolution speed is, e.g., 2200 rpm or higher (step S208). Then, if the engine revolution speed is 2200 rpm or higher, the unit time (computation cycle time) $\Delta T$ is added to an accumulative time $T_{N1}$ for the engine revolution speed of 2200 rpm or higher, and the resulting sum is set to a new accumulative time $T_{N1}$ (step S210). If the engine revolution speed is not 2200 rpm or higher, the CPU determines whether the engine revolution speed is 2100 rpm or higher (step S212). If the engine revolution speed is 2100 rpm or higher, the unit time (computation cycle time) $\Delta T$ is added to an accumulative time $T_{N2}$ for the engine revolution speed zone of 2100 to 2200 rpm, and the resulting sum is set to a new accumulative time $T_{N2}$ (step S214). Similarly, for the other engine revolution speed zones of 2000 to 2100 rpm, . . . , 600 to 700 rpm, and lower than 600 rpm, if the engine revolution speed is in any of those speed zones, the unit time $\Delta T$ is added to an accumulative time $T_{N3}$, . . . , $T_{Nn-1}$, or $T_{Nn}$ for the corresponding engine revolution speed zone, and the resulting sum is set to a new accumulative time $T_{N3}$, . . . , $T_{Nn-1}$, for $T_{Nn}$ (steps S216 to S224).

After the end of the processing shown in FIG. 15, the CPU returns to step S100 of FIG. 12 and repeats the processing shown in FIGS. 12 to 15 until the engine running time exceeds 100 hours.

If the engine running time has exceeded 100 hours after entering the processing shown in FIGS. 12 to 15, the respective values of the accumulative time $T_{D1}$ to $T_{Dn}$, $T_{S1}$ to $T_{Sn}$, $T_{T1}$ to $T_{Tn}$, $T_{P1}$ to $T_{Pn}$, $T_{O1}$ to $T_{On}$, and $T_{N1}$ to $T_{Nn}$ are stored in the memory 2*d* (step S102), and each accumulative time is initialized as $T_{D1}$ to $T_{Dn}$=0, $T_{S1}$ to $T_{Sn}$=0, $T_{T1}$ to $T_{Tn}$=0, $T_{P1}$ to $T_{Pn}$=0, $T_{O1}$ to $T_{On}$=0, and $T_{N1}$ to $T_{Nn}$=0 (step S104). Thereafter, the CPU repeats the same procedures as described above.

Figure 16:
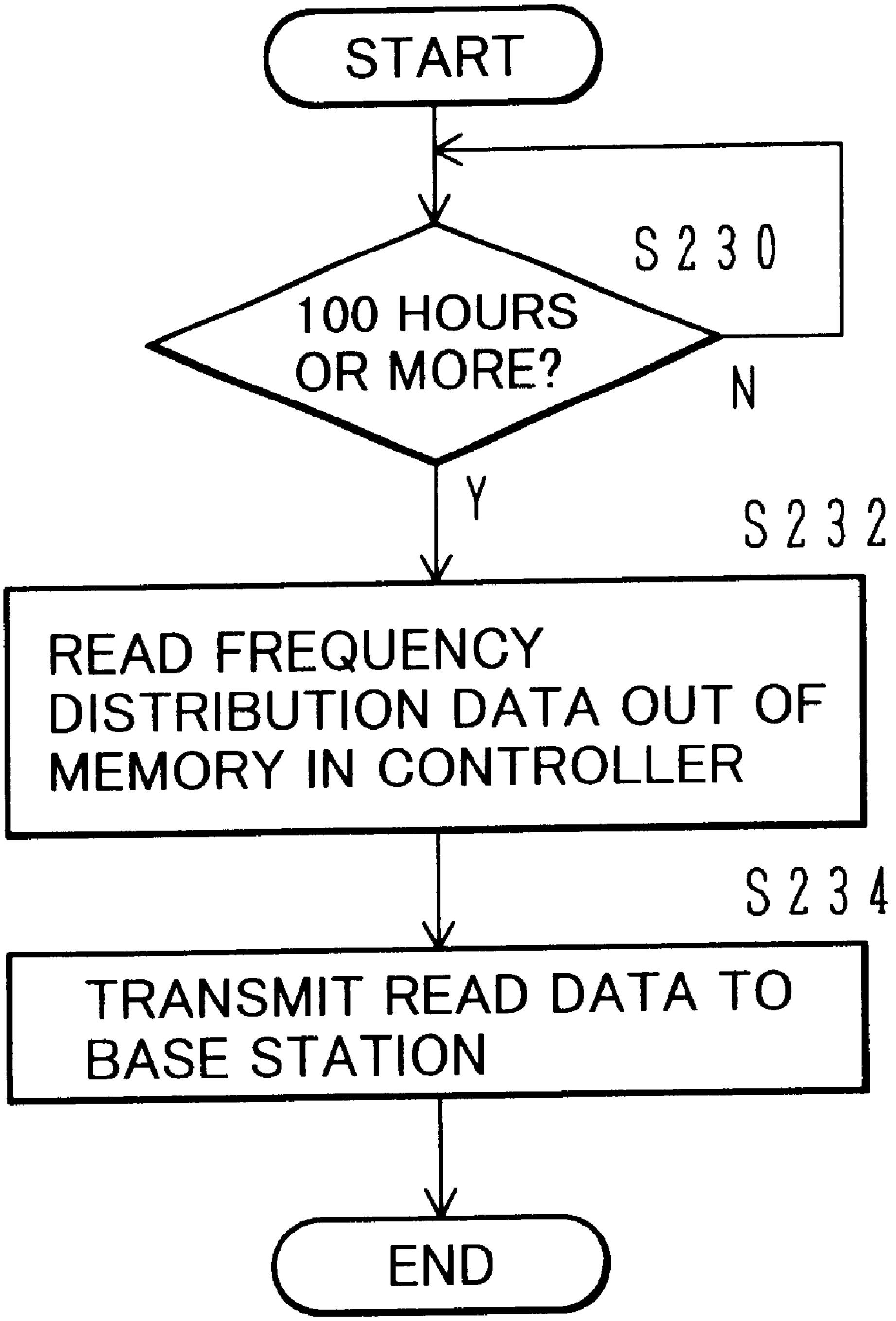
FIG. 16 is a flowchart showing the processing function of the communication control unit in the machine side controller executed when the collected frequency distribution data is transmitted.

The frequency distribution data thus collected is transmitted from the communication control unit 2*f* of the controller 2 to the base station center server 3. The processing function executed by the communication control unit 2*f* in that occasion is shown in a flowchart of FIG. 16.

First, in sync with the processing of step S100 shown in FIG. 12, the CPU monitors whether the engine running time has exceeded 100 hours (step S230). If the engine running time has exceeded 100 hours, the frequency distribution data and the,machine body information, both stored and accumulated in the memory 2*d*, are read out (step S232) and transmitted to the base station center server 3 (step S234). As a result, the frequency distribution data is transmitted to the base station center server 3 each time the data is accumulated in amount corresponding to 100 hours of the engine running time.

The CPU 2*c* and the communication control unit 2*f* execute. the above-described processing repeatedly per 100 hours on the basis of engine running time. The data stored in the CPU 2*c* is erased when a predetermined number of days, e.g., 365 days (one year), have lased after the transmission to the base station center server 3.

Figure 17:
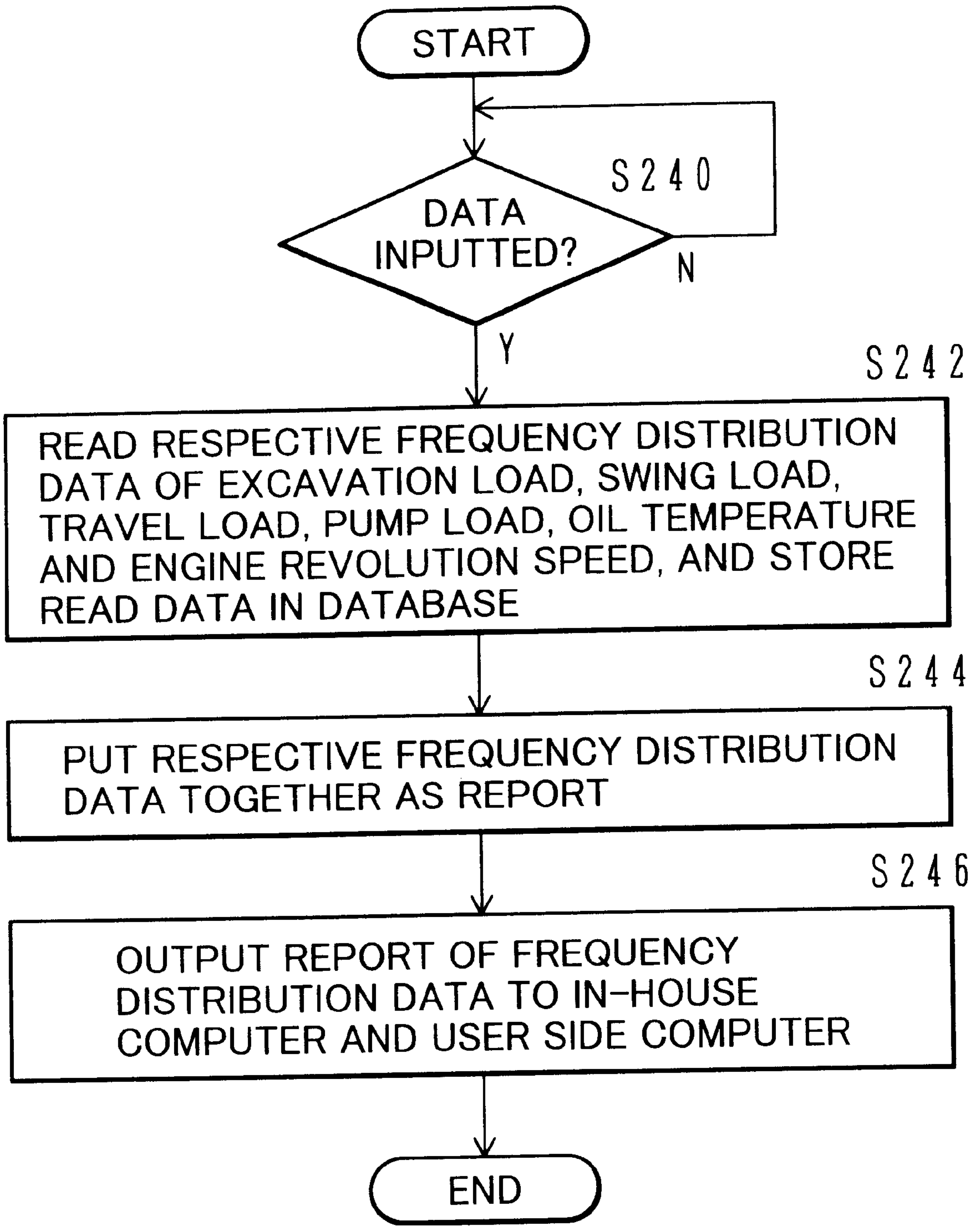
FIG. 17 is a flowchart showing the processing function of the machine body/operation information processing section in the base station center server executed when the frequency distribution data is transmitted from the machine side controller.

FIG. 17 is a flowchart showing the processing function of the machine body/operation information processing section 50 in the center server 3 executed when the frequency distribution data is transmitted from the machine side controller 2.

In FIG. 17, the machine body/operation information processing section 50 monitors whether the frequency distribution data for each of excavation load, swing load, travel load, pump load, oil temperature and engine revolution speed is inputted from the machine side controller 2 (step S240). When the data is inputted, the processing section 50 reads the inputted data, and then stores it as operation data (see FIG. 8) in the database 100 (step S242). Subsequently, the frequency distribution data for each of excavation load, swing load, travel load, pump load, oil temperature and engine revolution speed is processed to make a report in the form of a graphs (step S244), and the report is transmitted to the in-house computer 4 and the user side computer 5 (step S246).

Returning to FIG. 8, a description is now made of how the frequency distribution data is stored in the database 100.

In FIG. 8, as described above, the database 100 contains an operation database section per machine model and number, in which the operating time data for each day per machine model and number is stored and accumulated as daily report data. The respective values of the frequency distribution data of excavation load, swing load, travel load, pump load, oil temperature and engine revolution speed per machine model and number are stored and accumulated in the operation database per 100 hours on the basis of engine running time. FIG. 8 shows examples of the frequency distribution of pump load and oil temperature for the No. N machine of model A.

The frequency distribution of pump load for first 100 hours is stored in an area of from 0 hr to 100 hr for each pump pressure zone of 5 MPa, e.g., from 0 MPa to 5 MPa: 6 hr, from 5 MPa to 10 MPa: 8 hr, . . . , from 25 MPa to 30 MPa: 10 hr, and not less than 30 MPa: 2 hr. For each subsequent period of 100 hours, the frequency distribution of pump load is similarly stored in each area of from 100 hr to 200 hr, from 200 hr to 300 hr, . . . , from 1500 hr to 1600 hr.

The above description is likewise applied to the frequency distributions of excavation load, swing load and travel load, the frequency distribution of oil temperature, and the frequency distribution of engine revolution speed. In the frequency distribution data of excavation load, swing load and travel load, however, the load is represented by pump load. More specifically, the respective values of the operating time for excavation, swing and travel are collected for each of the pressure zones of from 0 MPa to 5 MPa, from 5 MPa to 10 MPa, . . . , from 25 MPa to 30 MPa, and not lower than 30 MPa on the basis of pump pressure, and then stored as the frequency distributions of excavation load, swing load and travel load.

Figure 18:
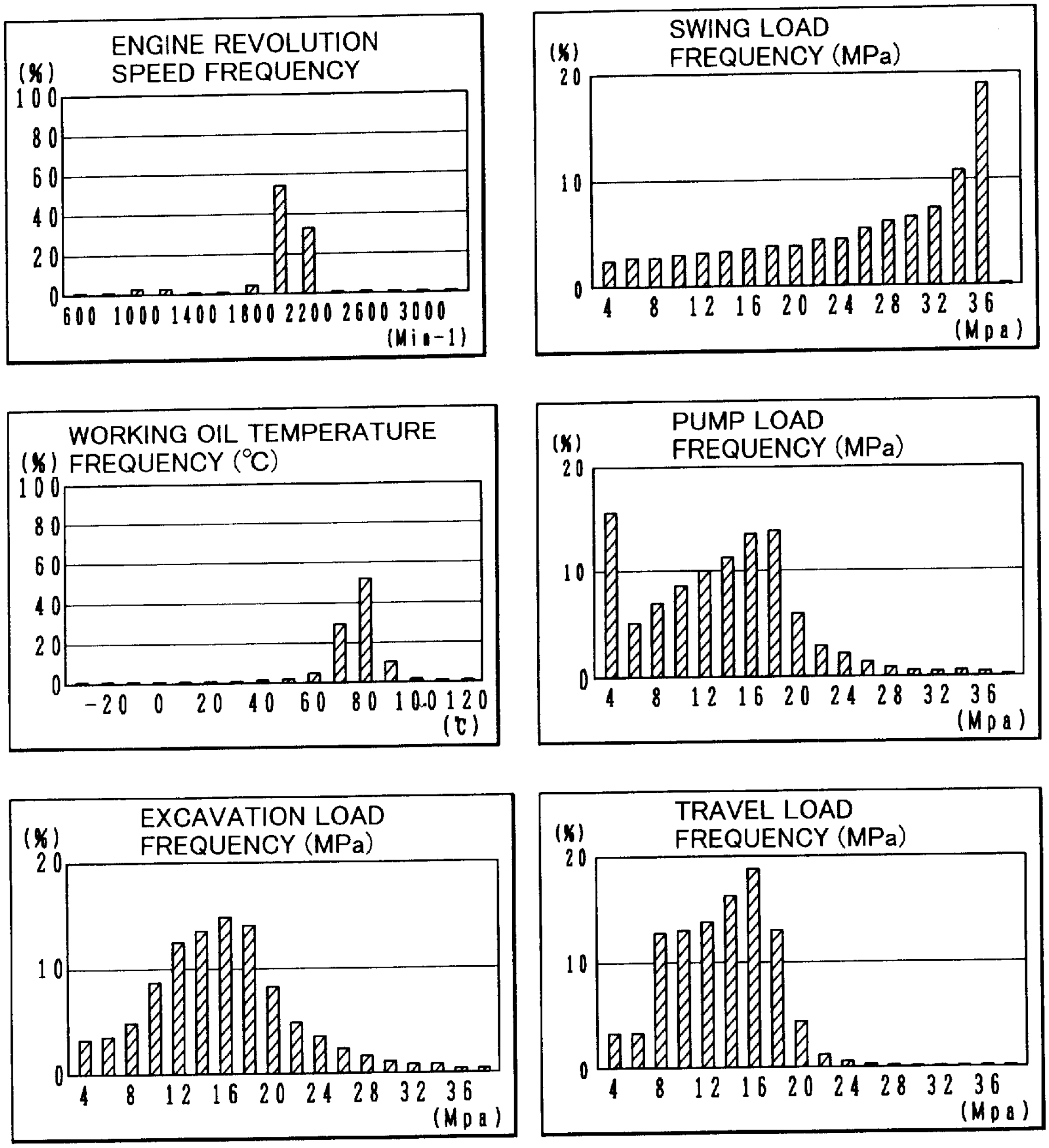
FIG. 18 shows one example of a daily report of frequency distribution data transmitted to an in-house computer and a user side computer.

FIG. 18 shows one example of a report of the frequency distribution data transmitted to the in-house computer 4 and the user side computer 5. This example shows each load frequency distribution as a rate with respect to each operating time among 100 hours of engine running time. More specifically, the frequency distribution of excavation load, for example, is represented by setting the excavation time (e.g., 60 hours) among 100 hours of engine running time to 100%, and obtaining a percentage (%) of an accumulative time for each pressure zone of pump pressure with respect to 60 hours. The frequency distributions of swing load, travel load and pump load are also represented in a similar manner. The frequency distributions of oil temperature and engine revolution speed are each represented by setting 100 hours of engine running time to 100% and obtaining a percentage of each accumulative time with respect to 100%. These reports enable the user to confirm the state of use for each section of the hydraulic excavator with respect to load.

Figure 19:
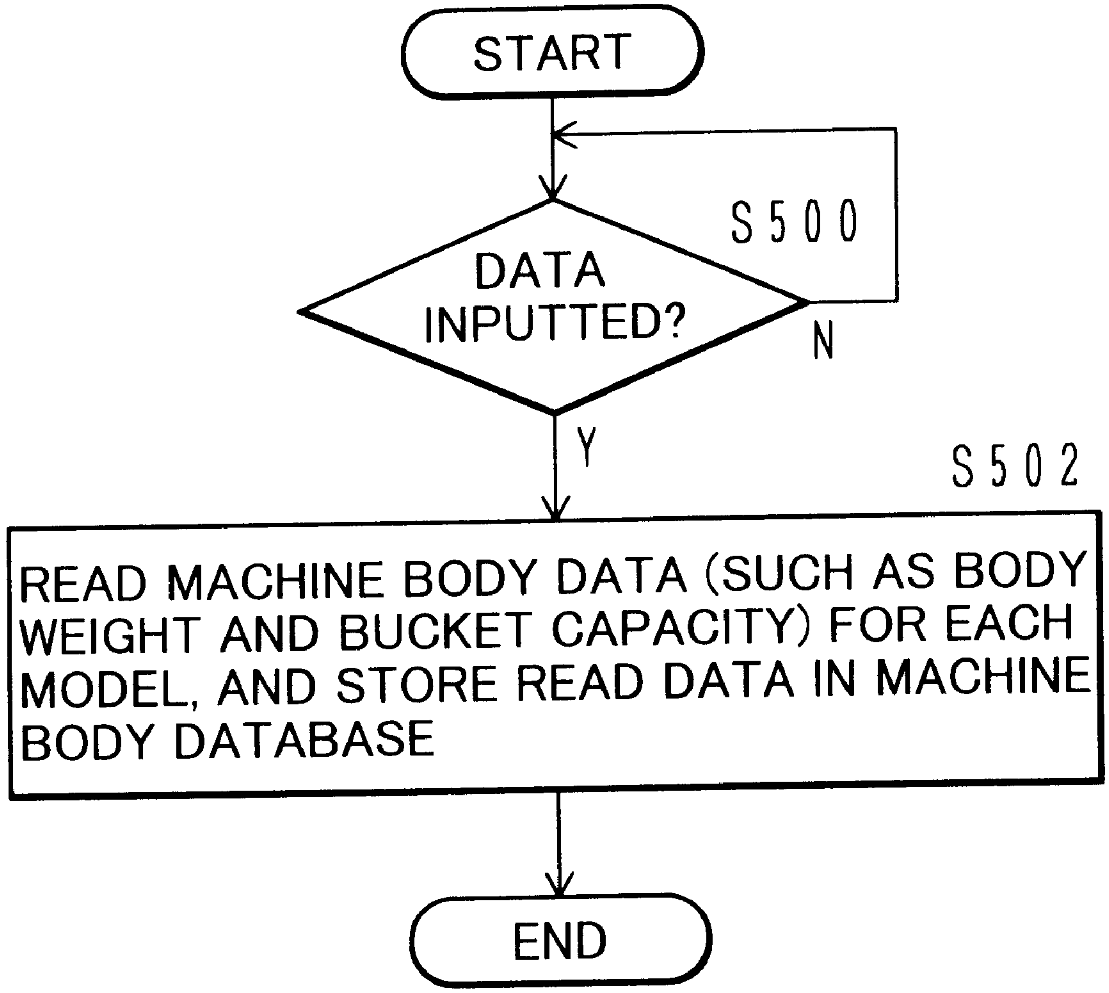
FIG. 19 is a flowchart showing the function of processing machine body information per model executed in a machine body information/optimum model evaluation processing section of the center server.

FIG. 19 is a flowchart showing the processing function of the machine body information per machine model executed in the machine body information/optimum model evaluating processing section 51 of the center server 3.

In FIG. 19, the machine body information/optimum model evaluating processing section 51 monitors whether the machine body information per machine model is inputted from the in-house computer 4 by, e.g., the serviceman (step S500). Each time when the machine body information is inputted, the processing section 51 reads the inputted machine body information, and then stores and accumulates it as machine body data (see FIG. 20) in the database 100 (step S502). Herein, the machine body information per machine model contains data regarding the specifications of the machine body, such as the machine weight, bucket capacity and crawler shoe width.

Figure 20:
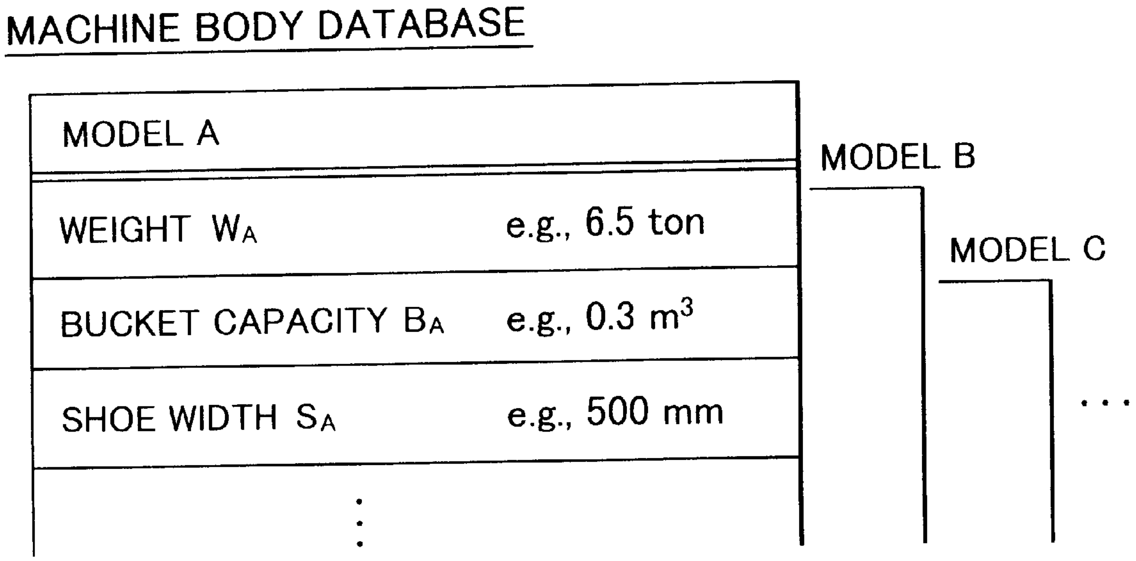
FIG. 20 shows how machine body data is stored as a database in the base station center server.

FIG. 20 shows how the machine body data is stored in the database 100.

The database 100 contains, in addition to the operation database shown in FIG. 8, a machine body database section (hereinafter referred to as a "machine body database") in which the machine body data per machine model, shown in FIG. 20, is stored and accumulated. The machine body database stores data as given below.

In FIG. 20, the machine body database stores, per machine model, data regarding the specifications of the machine body of each model. In an illustrated example, $W_A$ represents the weight (e.g., 6.5 ton) of the machine model A, $B_A$ represents the bucket capacity (e.g., 0.3 $m^3$), and $S_A$ represents the crawler shoe width (e.g., 500 mm) of the machine model A. For the other machine models B, C, . . . , the specification data of the machine body is similarly stored.

Figure 21:
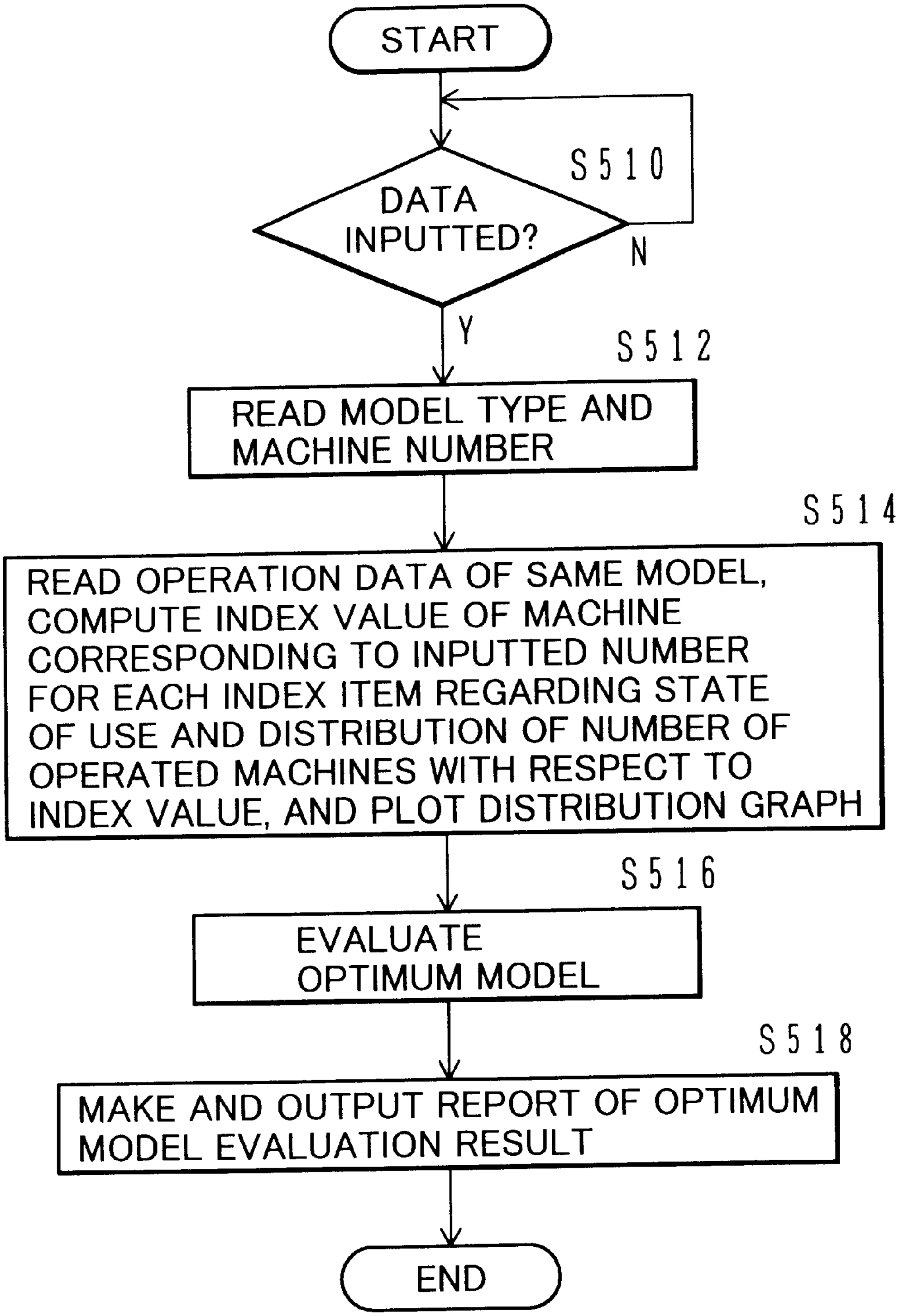
FIG. 21 is a flowchart showing the function of processing a request for evaluating an optimum model executed in the machine body information/optimum model evaluation processing section of the center server.

FIG. 21 is a flowchart showing the function of processing a request for evaluating an optimum model executed in the machine body information/optimum model evaluation processing section 51 of the center server 3.

In FIG. 21, the machine body information/optimum model evaluating processing section 51 monitors whether a request for evaluating an optimum model is inputted from the in-house computer 4 by, e.g., the serviceman (step S510). When the request for evaluating an optimum model is inputted, the processing section 51 reads the inputted demand (step S512). Herein, inputting of the request for evaluating an optimum model means an entry of the machine body and number of the hydraulic excavator used by the customer.

Then, the processing section 51 accesses the database 100 to read the operation data corresponding to the same machine number, to compute an index value of the hydraulic excavator corresponding to the inputted number for each index item regarding the state of use of the hydraulic excavator, and to obtain a distribution of the number of operated machines with respect to index values, thereby plotting a distribution graph (step S514). Herein, the index regarding the state of use of the hydraulic excavator implies a parameter indicating the state of use of the hydraulic excavator, such as an excavation ratio, a swing ratio and a travel ratio (described later). Subsequently, the processing section 51 evaluates whether the hydraulic excavator corresponding to the inputted machine number is an optimum model (step S516), and then prepares and outputs a report of the evaluation result (step S518).

Figure 22:
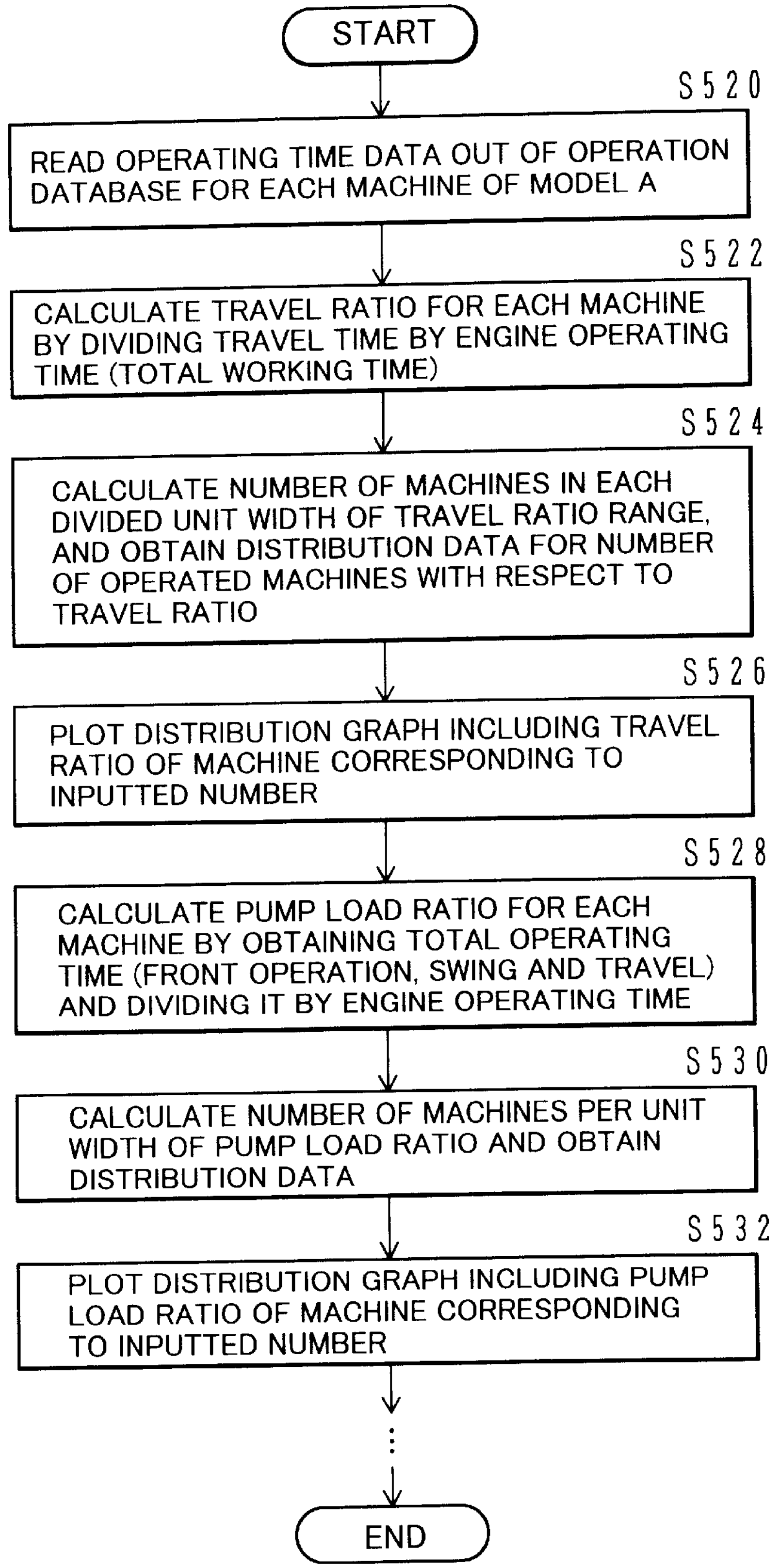
FIG. 22 is a flowchart showing details of processing to compute an index value of a hydraulic excavator corresponding to the inputted number for each index item regarding the state of use of the hydraulic excavator, to obtain a distribution of the number of operated machines with respect to index values, and to plot a distribution graph.

Details of the processing executed in step S514 is shown in a flowchart of FIG. 22.

In FIG. 22, first, the processing section 51 accesses the database 100 and reads the operating time data for each machine number of the model A from the operation database shown in FIG. 8 (step S520). Herein, the machine model A is a model read in step S512 of FIG. 21.

Then, the processing section 51 calculates, per machine number, a travel ratio (%) by dividing the past total travel time (e.g., the latest accumulative value $T_T(K)$ of travel time for the No. N machine shown in FIG. 8) by the past total engine running time (e.g., the latest accumulative value $T_{NE}(K)$ of engine running time for the No. N machine shown in FIG. 8) (step S522). Herein, the term "travel ratio" represents a proportion of the travel time with respect to the total working time, i.e., a value indicating a rate at which the hydraulic excavator is used for travel.

Subsequently, the processing section 51 classifies the travel ratios calculated per machine number and obtains a distribution of the number of operated machines with respect to the travel ratio (step S524). The travel ratio is divided into unit-width ranges of, for example, from 1% to 5%, from 5% to 10%, ., . . . from 90% to 95%, and not less than 95%. The number of operated machines belonging to each range of the travel ratio is calculated so that the number of operated machines is correlated with each range of the travel ratio.

The thus-obtained distribution data is prepared in the form of a distribution graph, and the travel ratio of the machine corresponding to the inputted number is put in the distribution graph (S526).

Likewise, the distribution data is obtained for a pump load ratio as another index, and a distribution graph including the pump load ratio of the machine corresponding to the inputted number is plotted (steps S528 to S532). Herein, the term "pump load ratio" represents a proportion of a time during which the pump load pressure is not lower than a predetermined pressure, with respect to the total working time (engine running time), i.e., a value indicating a rate at which the hydraulic excavator is used for work required for operating the pump.

The time during which the pump load pressure is not lower than the predetermined pressure can be obtained as, e.g., a pump operating time. Then, the pump operating time can be obtained as the sum of the front operating time, the swing time and the travel time (e.g., the sum of the latest accumulative value $T_D(K)$ of front operating time, the latest accumulative value $T_S(K)$ of swing time, and the latest accumulative value $T_T(K)$ of travel time for the No. N machine shown in FIG. 8). In such a case, the pump load ratio is given as a value resulting from dividing the above sum by the total engine running time (e.g., the latest accumulative value $T_{NE}(K)$ of engine running time for the No. N machine shown in FIG. 8) (step S528).

As another example, the pump operating time may be obtained by directly calculating the time during which the pump load pressure is not lower than the predetermined pressure, based on the pump load frequency distribution data in the operation frequency distribution data shown in FIG. 8. In such a case, the time during which the pump load pressure is not lower than the predetermined pressure is determined by summing up the pump load frequency distribution data per 100 hours of operating time in the operation frequency distribution data shown in FIG. 8, obtaining a pump load frequency distribution in the total operating time of the hydraulic pump, and totalizing periods of time during which the pump load pressure is not lower than the predetermined pump pressure (e.g., 5 MPa). Thus, the pump load ratio is given as a value resulting from dividing the totalized time by the total engine running time (e.g., the latest accumulative value $T_{NE}(K)$ of engine running time for the No. N machine shown in FIG. 8).

Other indices than stated above, such as an excavation load ratio (excavation time/total working time) and a swing load ratio (swing time/total working time), can also be set as required, and a distribution graph for each index can be obtained in a similar manner.

Figure 23:
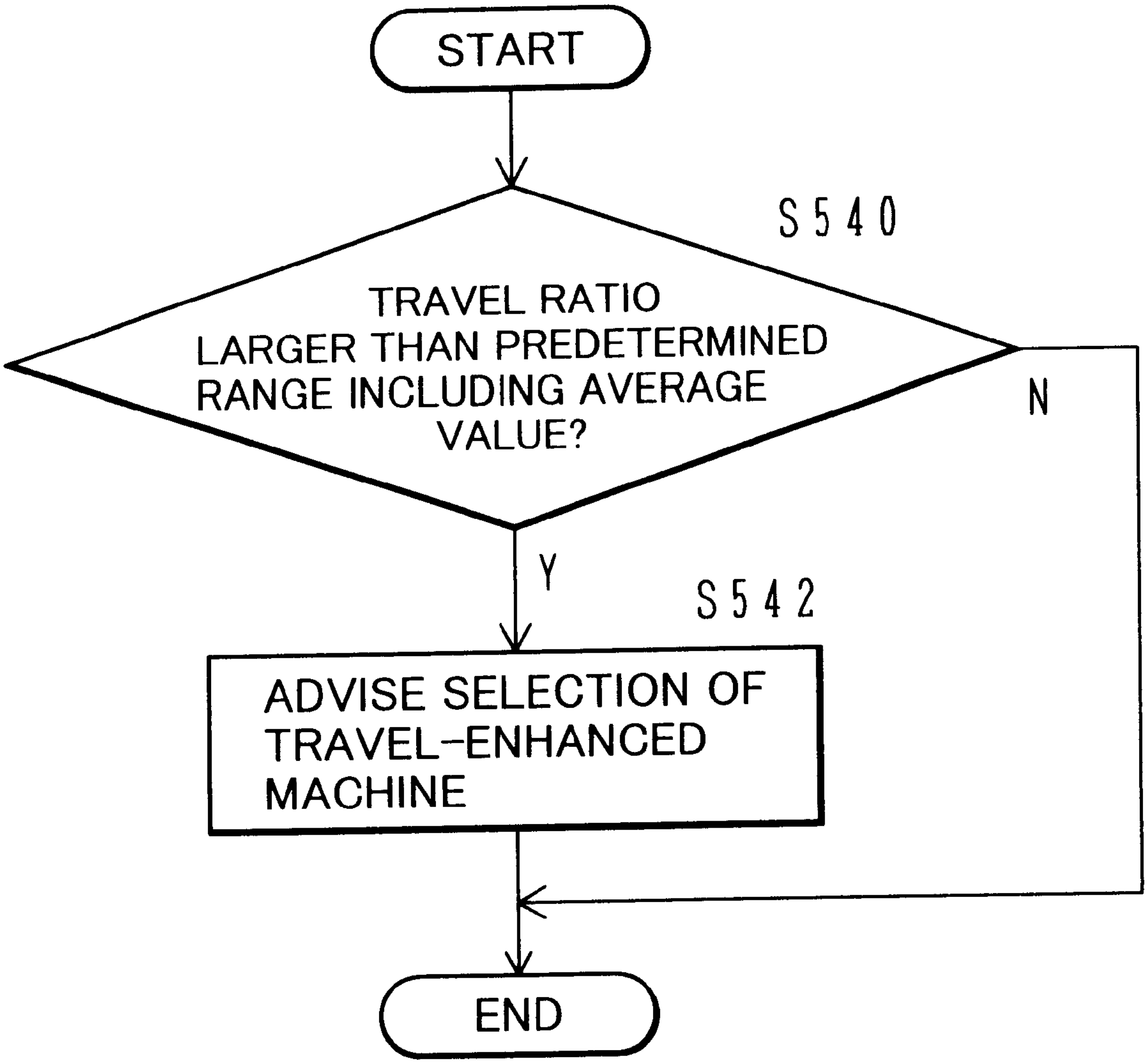
FIG. 23 is a flowchart showing details of an evaluation process.
Figure 24:
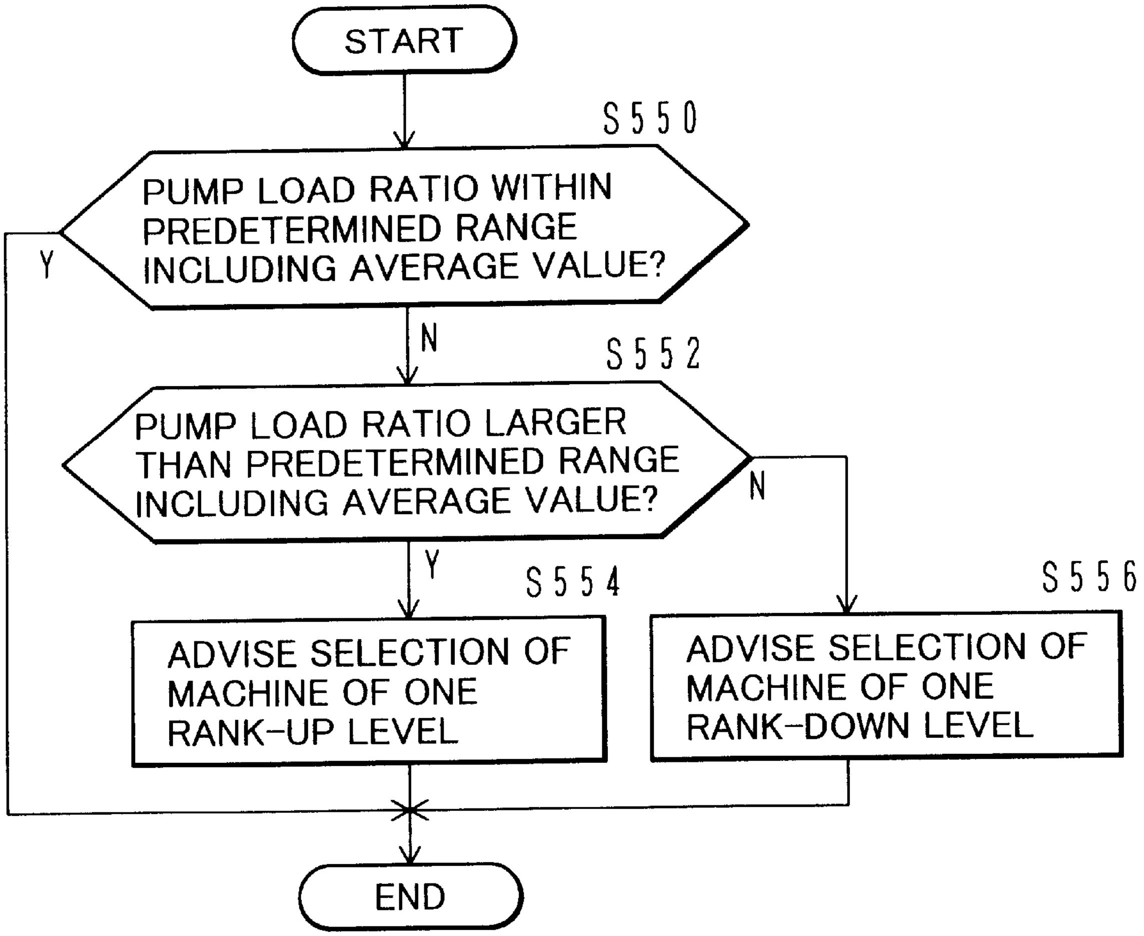
FIG. 24 is a flowchart showing details of an evaluation process.

FIGS. 23 and 24 are flowcharts showing details of the evaluation processing executed in step S516 of the flowchart shown in FIG. 21.

In FIG. 23, it is first determined whether the travel ratio of the machine corresponding to the inputted number is larger than a predetermined range including an average value (step S540). Herein, the travel ratio of the machine corresponding to the inputted number has been obtained by the processing of step S522 in FIG. 22, and the predetermined range including the average value has been obtained as a travel ratio range in which the number of operated machines is maximum among the distribution data obtained by the processing of step S524 in FIG. 22. Then, if the travel ratio is larger than the predetermined range, this is regarded as indicating that the rate at which the machine is used for travel is higher than the average, and an advice for selection of a travel-enhanced model is provided (step S542).

Also, in FIG. 24, it is first determined whether the pump load ratio of the machine corresponding to the inputted number is larger than a predetermined range including an average value (step S550). Herein, the pump load ratio of the machine corresponding to the inputted number has been obtained by the processing of step S528 in FIG. 22, and the predetermined range including the average value has been obtained as a pump load ratio range in which the number of operated machines is maximum among the distribution data obtained by the processing of step S530 in FIG. 22. Then, if the pump load ratio is not within the predetermined range, it is now determined whether the pump load ratio is larger than the predetermined range including the average value (step S552). If the pump load ratio is larger than the predetermined range, an advice for selection of a model of a one rank-up level is provided (step S554). If the pump load ratio is not larger than the predetermined range, an advice for selection of a model of a one rank-down level is provided (step S556).

Figure 25:
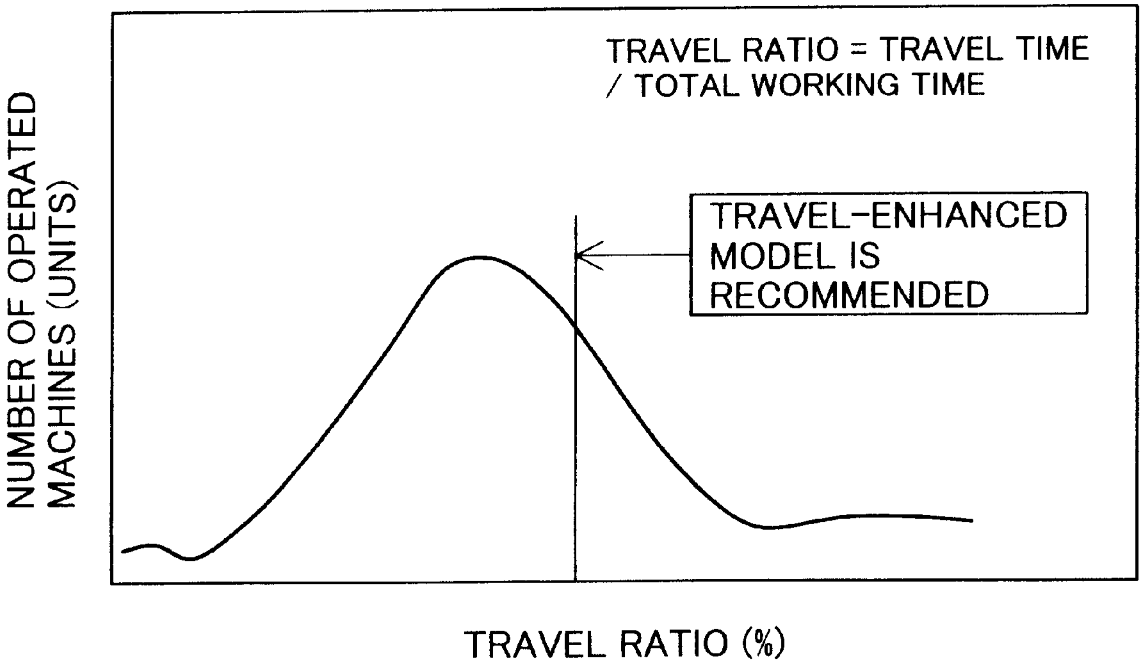
FIG. 25 is a graph showing one example of an evaluation result report.
Figure 26:
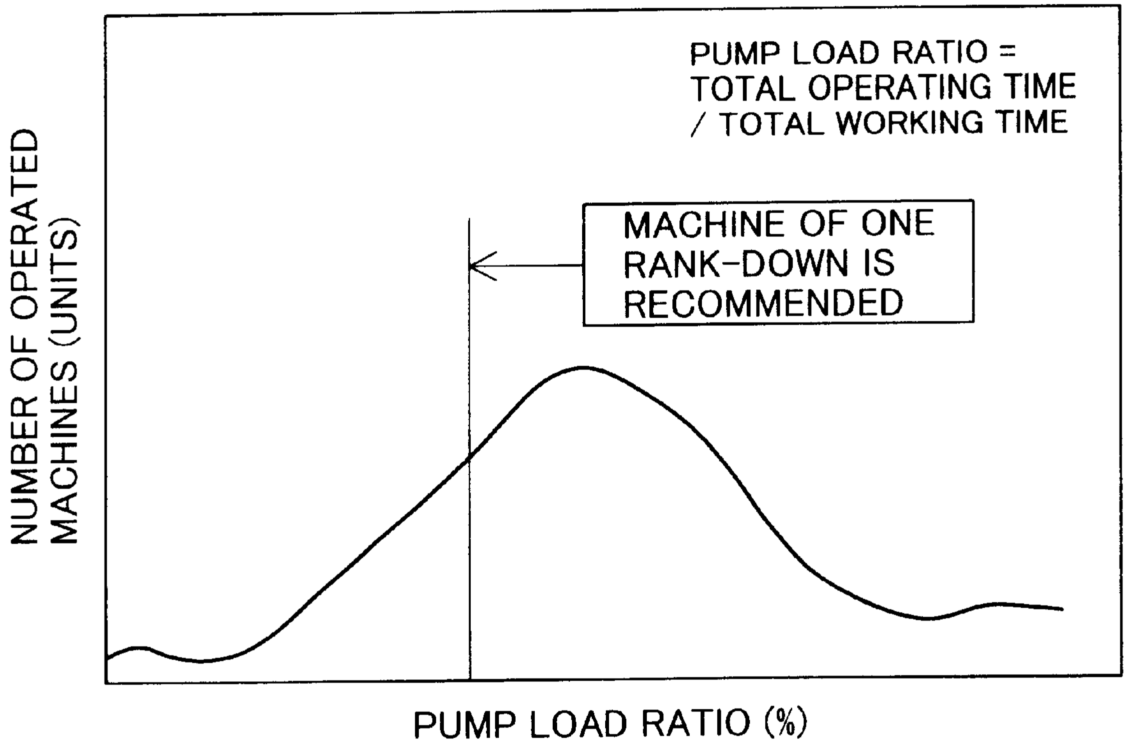
FIG. 26 is a graph showing one example of an evaluation result report.

FIGS. 25 and 26 each show one example of the evaluation result report prepared and outputted in the processing of step S518 in FIG. 21.

FIG. 25 shows one example of the report showing both a distribution graph of the number of operated machines with respect to the travel ratio for the machine model A, and the travel ratio of the machine corresponding to the inputted number. The travel ratio of the machine corresponding to the inputted number is indicated by a vertical line in the distribution graph. Also, in this example, since the travel ratio of the machine corresponding to the inputted number is higher than the average value (i.e., the peak value of the distribution graph), a message "Travel-enhanced model is recommended" is added to the evaluation result.

FIG. 26 shows one example of the report showing both a distribution graph of the number of operated machines with respect to the pump load ratio for the machine model A, and the pump load ratio of the machine corresponding to the inputted number. The pump load ratio of the machine corresponding to the inputted number is indicated by a vertical line in the distribution graph. Also, in this example, since the pump load ratio of the machine corresponding to the inputted number is lower than the average:value (i.e., the peak value of the distribution graph), a message "Model of one rank-down level is recommended" is added to the evaluation result.

With this embodiment constructed as described above, the sensors 40 to 46 and the controller 2 are provided as data measuring and collecting means in each of a plurality of hydraulic excavators 1 working in fields to measure an operating time for each of a plurality of sections (the engine 32, the front 15, the swing body 13 and the track body 12), which are operated for different periods of time per hydraulic excavator, and the measured operating time is transferred to the base station computer 3 to be stored and accumulated as operation data therein. In the base station computer 3, the operation data is read out for each hydraulic excavator to obtain an index value, such as a travel ratio, regarding the state of use of a particular hydraulic excavator and a distribution of the number of operated hydraulic excavators of the same model as the particular hydraulic excavator with respect to index values. The index value of the particular hydraulic excavator is compared with that distribution to determine whether the particular hydraulic excavator is an optimum model. Therefore, how the customer employs the owned hydraulic excavator (particular hydraulic excavator) in practice can be confirmed from comparison with other hydraulic excavators of the same model, and whether the particular hydraulic excavator is an optimum model for the customer can be evaluated. It is hence possible to give an advice about the optimum model depending on the state of use.

Further, since a daily report of operation information, a diagnostic report of maintenance and check results, etc. are provided to the user side as appropriate, the user can confirm the status of operation of the owned hydraulic excavator everyday, and can more easily perform management of the hydraulic excavator on the user side.

A second embodiment of the present invention will be described with reference to FIGS. 27 to 33. This embodiment is intended to additionally plot a distribution graph of the number of operated machines of another model having an average value of the index regarding the state of use, which is close to the index value of the machine corresponding to the inputted number, and to evaluate an optimum model with easier understanding.

A management system of a construction machine according to this embodiment has the same overall arrangement as that of the first embodiment, and has a system arrangement similar to that of the first embodiment shown in FIGS. 1 to 3. Also, the machine side controller 2 and the base station center server 3 have the same processing functions as those described above with reference to FIGS. 4 to 26 except for the points described below. The following description is made of the points different from the first embodiment.

Figure 27:
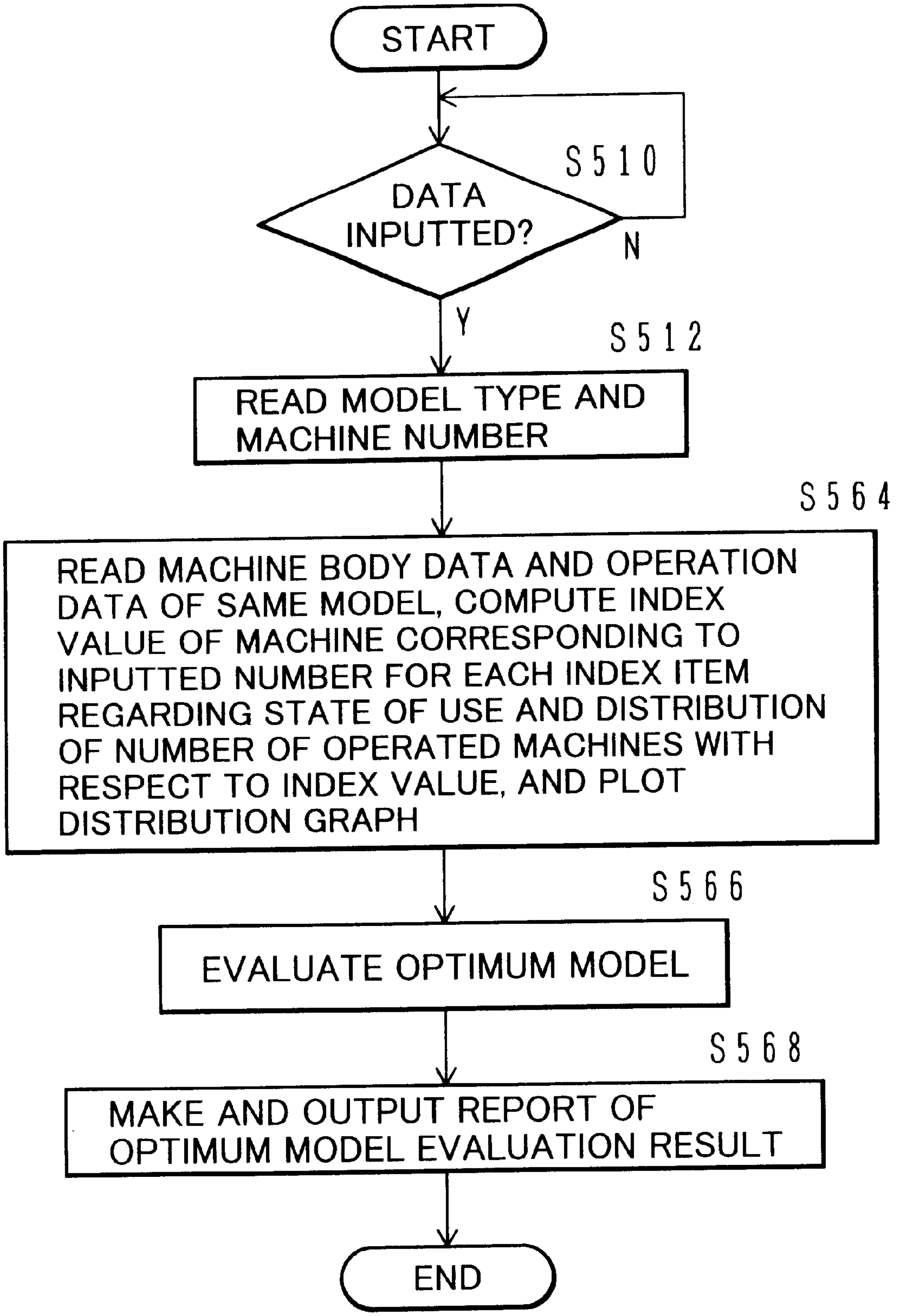
FIG. 27 is a flowchart showing the function of processing a request for evaluating an optimum model executed in the machine body information/optimum model evaluation processing section of the center server in a system for managing a construction machine according to a second embodiment of the present invention.

FIG. 27 is a flowchart showing the function of processing a request for evaluating an optimum model executed in the machine body information/optimum model evaluation processing section 51 of the center server 3 according to this embodiment.

In FIG. 27, processing to monitor whether a request for evaluating an optimum model is inputted (step S510) and processing to read the inputted demand for evaluating an optimum model (step S512) are the same as those in the first embodiment shown in FIG. 21. Thereafter, in this embodiment, the processing section 51 accesses the database 100 to read the machine body data as well as the operation data corresponding to the same machine number, to compute an index value of the hydraulic excavator corresponding to the inputted number for each index item regarding the state of use of the hydraulic excavator, and to obtain a distribution of the number of operated machines with respect to index values, thereby plotting a distribution graph (step S564). Subsequently, the processing section 51 evaluates whether the hydraulic excavator corresponding to the inputted machine number is an optimum model (step S566), and then prepares and outputs a report of the evaluation result (step S568).

Figure 28:
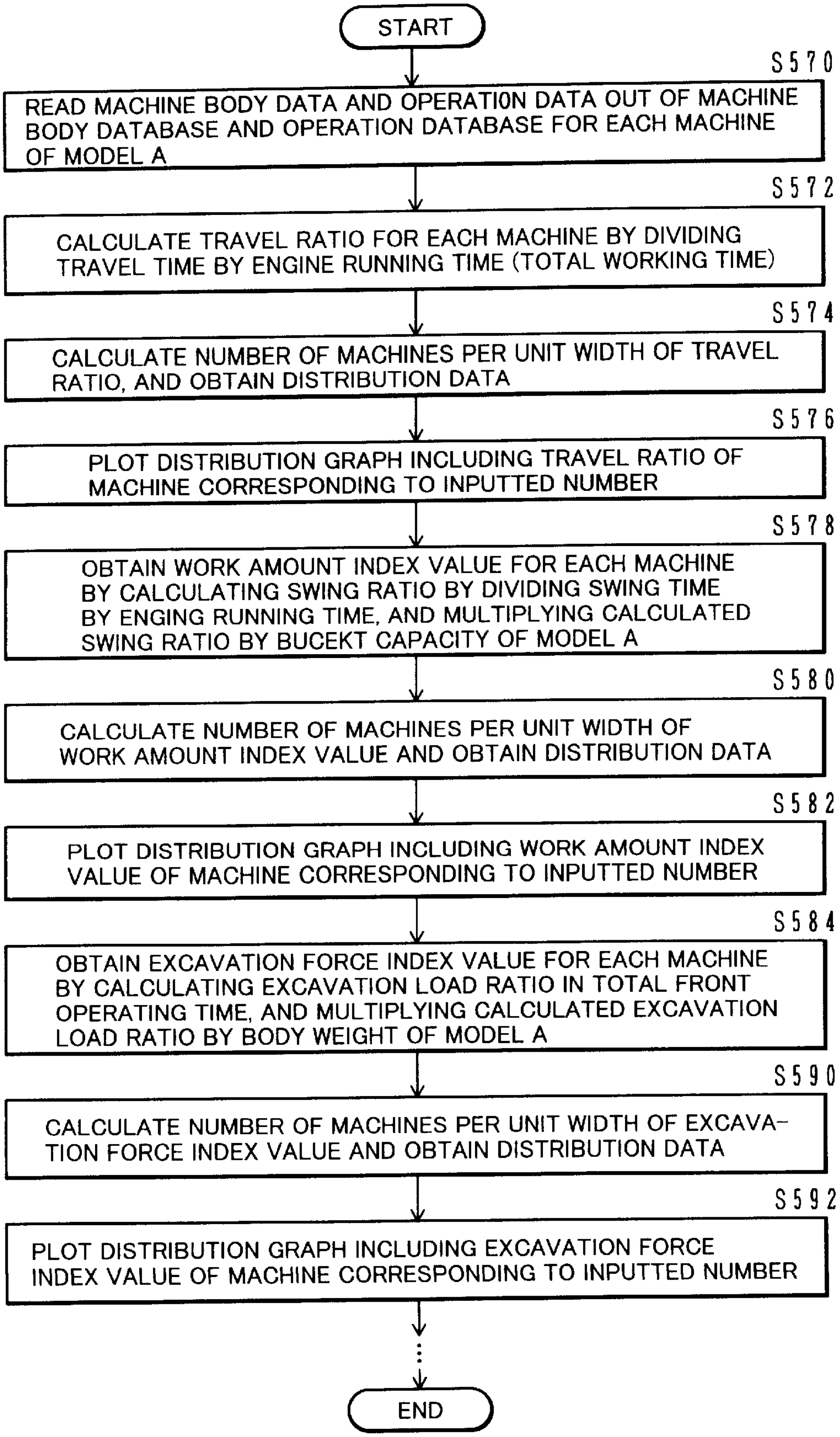
FIG. 28 is a flowchart showing details of processing to compute an index value of a hydraulic excavator corresponding to the inputted number for each index item regarding the state of use of the hydraulic excavator, to obtain a distribution of the number of operated machines with respect to index values, and to plot a distribution graph.

Details of the processing executed in step S564 is shown in a flowchart of FIG. 28.

In FIG. 28, first, the processing section 51 accesses the database 100 and reads the operating time data and the machine body data for each machine number of the model A (i.e., the model read in step S512 of FIG. 27), respectively, from the operation database shown in FIG. 8 and the machine body database shown in FIG. 20 (step S570).

Then, the processing section 51 calculates, per machine number, a travel ratio (%) by dividing the past total travel time (e.g., the latest accumulative value $T_T(K)$ of travel time for the No. N machine shown in FIG. 8) by the past total engine running time (e.g., the latest accumulative value $T_{NE}(K)$ of engine running time for the No. N machine shown in FIG. 8) (step S572). Thereafter, the processing section 51 classifies the calculated travel ratios and obtains a distribution of the number of operated machines with respect to the travel ratio (step S574). The thus-obtained distribution data is prepared in the form of a distribution graph, and the travel ratio of the machine corresponding to the inputted number is put in the distribution graph (S576). The processing executed in steps S572 to S576 is the same as that executed in steps S522 to S526 shown in FIG. 22.

Then, the processing section 51 calculates, per machine number, a swing ratio (%) by dividing the past total swing time (e.g., the latest accumulative value $T_S(K)$ of swing time for the No. N machine shown in FIG. 8) by the past total engine running time (e.g., the latest accumulative value $T_{NE}(K)$ of engine running time for the No. N machine shown in FIG. 8), and obtains a value resulting from multiplying the calculated swing ratio by the bucket capacity (e.g., $W_A$ shown in FIG. 20) of the model A. (step S578).

Herein, the term "swing ratio" represents a proportion of the swing time with respect to the total working time, i.e., a value indicating a rate at which the hydraulic excavator is used for swing. Further, since the swing operation of the hydraulic excavator is performed in many cases when carrying earth and sand with the bucket, for example, in earth and sand loading work, the amount of work can be understood from a value resulting from multiplying the calculated swing ratio by the bucket capacity. A rate of the amount of work performed by the hydraulic excavator is therefore estimated from the value resulting from multiplying the calculated swing ratio by the bucket capacity. That value is called a work amount index value hereinafter.

Then, the processing section 51 classifies the work amount index values thus calculated, and obtains a distribution of the number of operated machines with respect to the work amount index value (step S580). Such a distribution can be obtained in a similar manner to step S524 in FIG. 22. Specifically, the work amount index value is divided into ranges at a unit width and the number of operated machines belonging to each range is calculated so that the number of operated machines is correlated with each range of the work amount index value. The thus-obtained distribution data is prepared in the form of a distribution graph, and the work amount index value of the machine corresponding to the inputted number is put in the distribution graph (S582).

Then, the processing section 51 calculates, per machine number, an excavation load ratio with respect to the past total front operating time (e.g., the latest accumulative value $T_D(K)$ of front operating time for the No. N machine shown in FIG. 8), and obtains a value resulting from multiplying the calculated excavation load ratio by the body weight of the model A (step S584).

Figure 29:
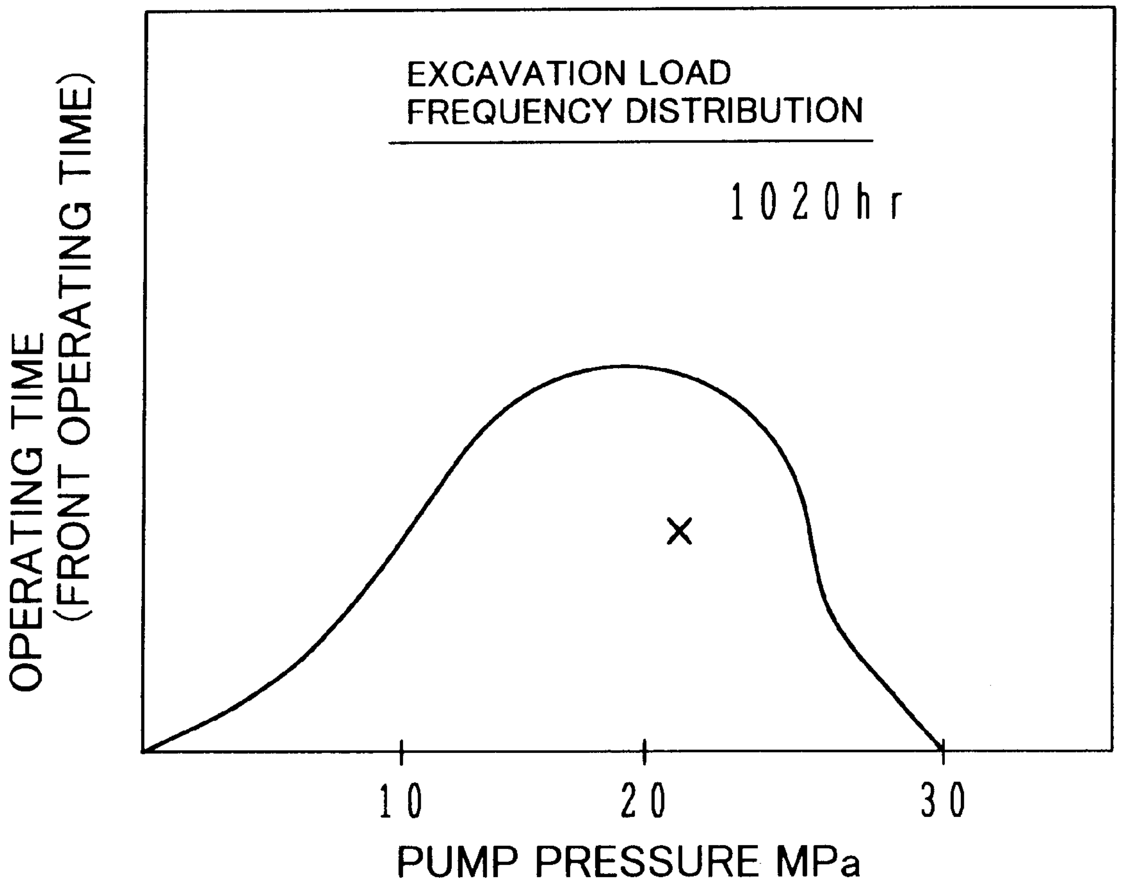
FIG. 29 is a graph showing one example of excavation load frequency distribution used for determining an excavation load ratio.

The excavation load ratio with respect to the total front operating time is obtained as follows. First, based on the operation frequency distribution data in the operation database shown in FIG. 8, the not-shown frequency distribution data of excavation load per 100 hours of operating time is summed up to obtain a pump load frequency distribution (=excavation load frequency distribution) at the latest accumulative value $T_D(K)$ of front operating time. FIG. 29 shows one example of the excavation load frequency distribution thus obtained. Then, a load ratio of the excavation load frequency distribution is computed.

One method for calculating an excavation load ratio is as follows. Assuming the total front operating time to be, e.g., 1020 hours, a rate of time during which the excavation load is not smaller than a predetermined load, e.g., a pump pressure of 20 MPa, is calculated and set as an excavation load ratio.

As another method, the center of gravity of an integral value of the excavation load frequency distribution, shown in FIG. 29, may be determined and set as an excavation load ratio. The position of the center of gravity is indicated by a mark x in FIG. 29.

Herein, the term "excavation load ratio" is a value representing a rate at which load acts upon the front in the total front operating time. An excavation force of the hydraulic excavator can be obtained as a value resulting from multiplying the excavation load ratio by the body weight. That value is called an excavation force index value hereinafter.

Subsequently, the processing section 51 classifies the excavation force index values thus calculated, and obtains a distribution of the number of operated machines with respect to the excavation force index value (step S590). Such a distribution can be obtained in a similar manner to step S524 in FIG. 22. The thus-obtained distribution data is prepared in the form of a distribution graph, and the excavation force index value of the machine corresponding to the inputted number is put in the distribution graph (S592).

Figure 30:
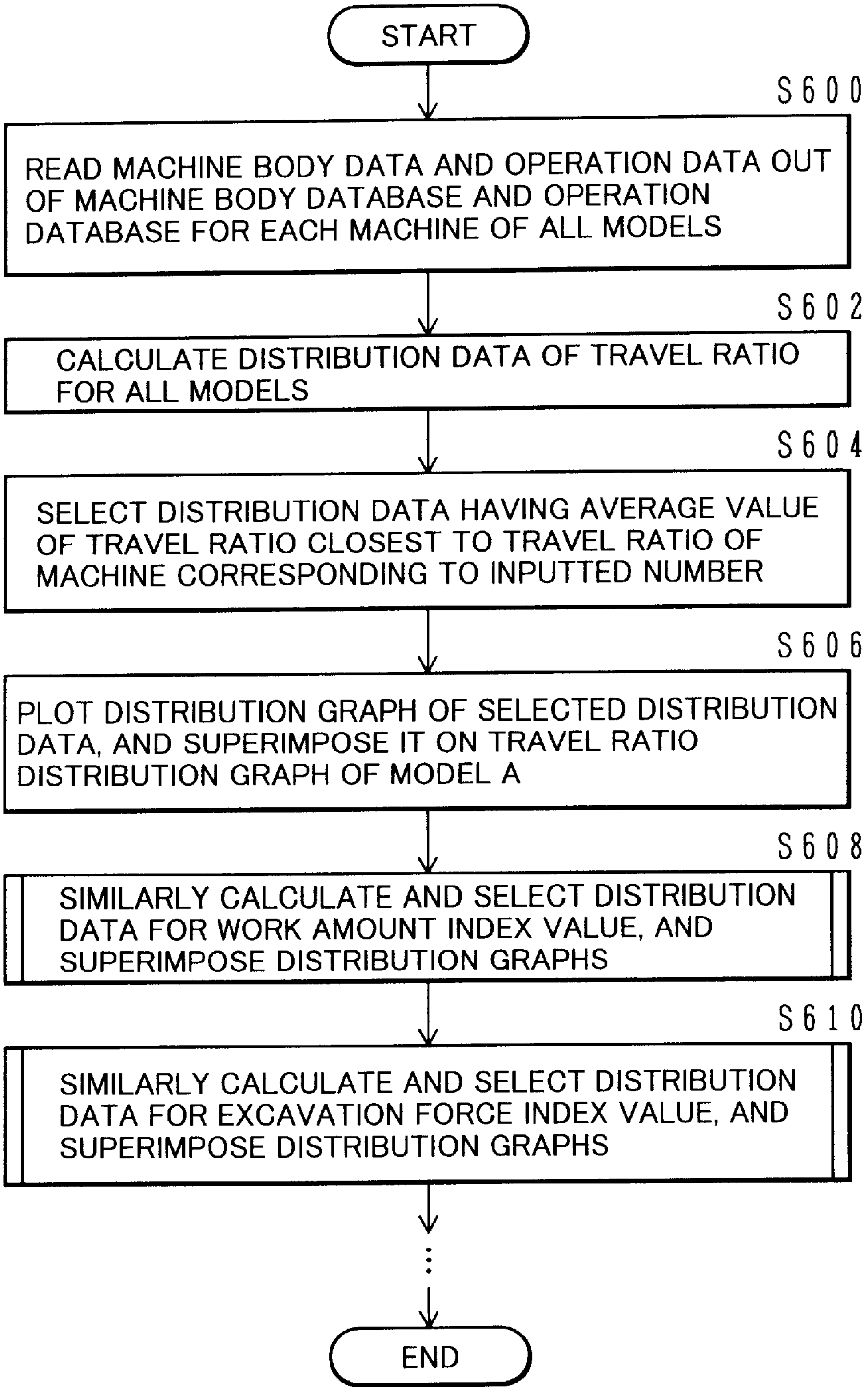
FIG. 30 is a flowchart showing details of an evaluation process.

FIG. 30 is a flowchart showing details of the processing of evaluation executed in step S566 of the flowchart shown in FIG. 27.

In FIG. 30, first, the processing section 51 accesses the database 100 and reads the operating time data and the machine body data for each machine of all models., respectively, from the operation database shown in FIG. 8 and the machine body database shown in FIG. 20 (step S600).

Then, the distribution data of travel ratio is computed for all models (step S602). A method for obtaining the distribution data of travel ratio is performed in the same manner as the processing executed in steps S572 and S574 of FIG. 28 except that the machine model A is replaced by all models.

Then, the processing section 51 compares the thus-computed distribution data of travel ratio for all models with the travel ratio of the machine corresponding to the inputted number, and selects the distribution data having an average value of the travel ratio (i.e., the travel ratio at which the number of operated machines in the distribution data is maximum), which is closest to the travel ratio of the machine corresponding to the inputted number (step S604). A distribution graph of the selected distribution data is plotted and superimposed on the distribution graph of the machine model A prepared in step S576 in the flowchart of FIG. 28 (step S606).

For each of the work amount index value and the excavation force index value, the processing section 51 similarly computes the distribution data for all models, selects the distribution data having an average value that is close to the index value of the machine corresponding to the inputted number, and superimposes a distribution graph of the selected distribution data on the distribution graph of the machine model A prepared in step S582 or S592 in the flowchart of FIG. 28 (steps S608, S610).

Figure 31:
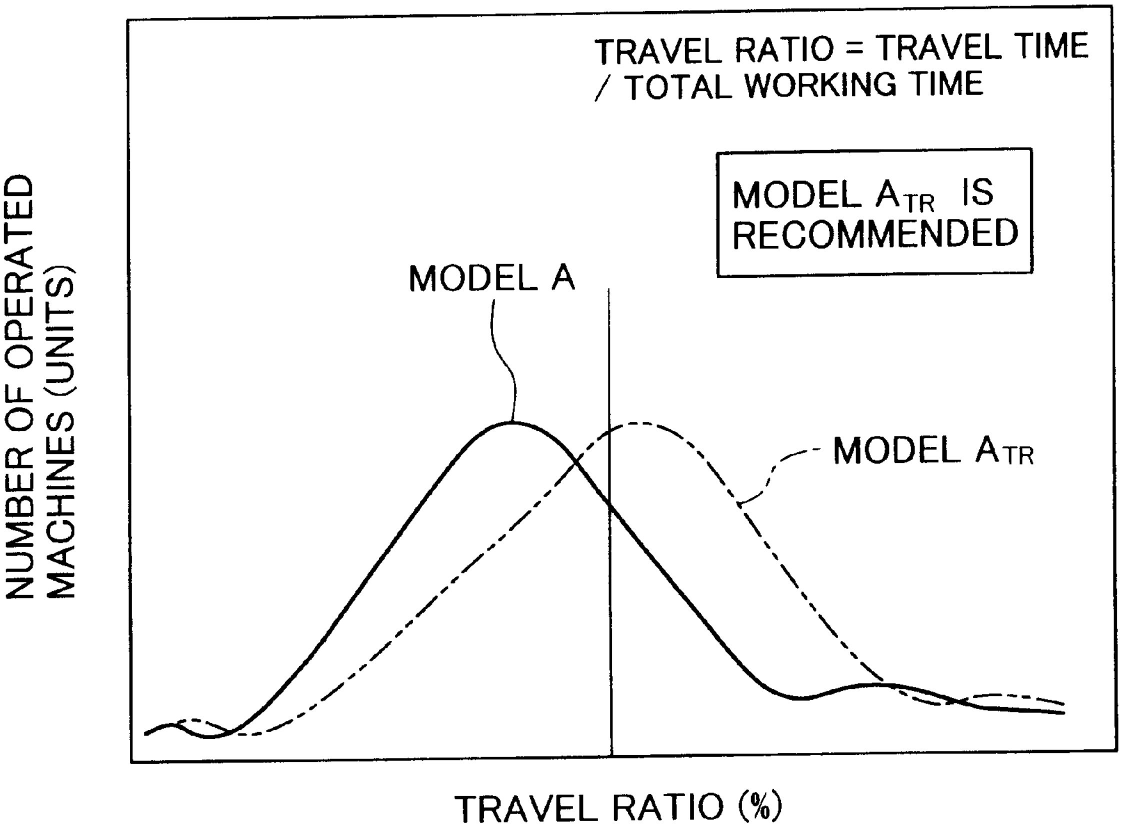
FIG. 31 is a graph showing one example of an evaluation result report.
Figure 32:
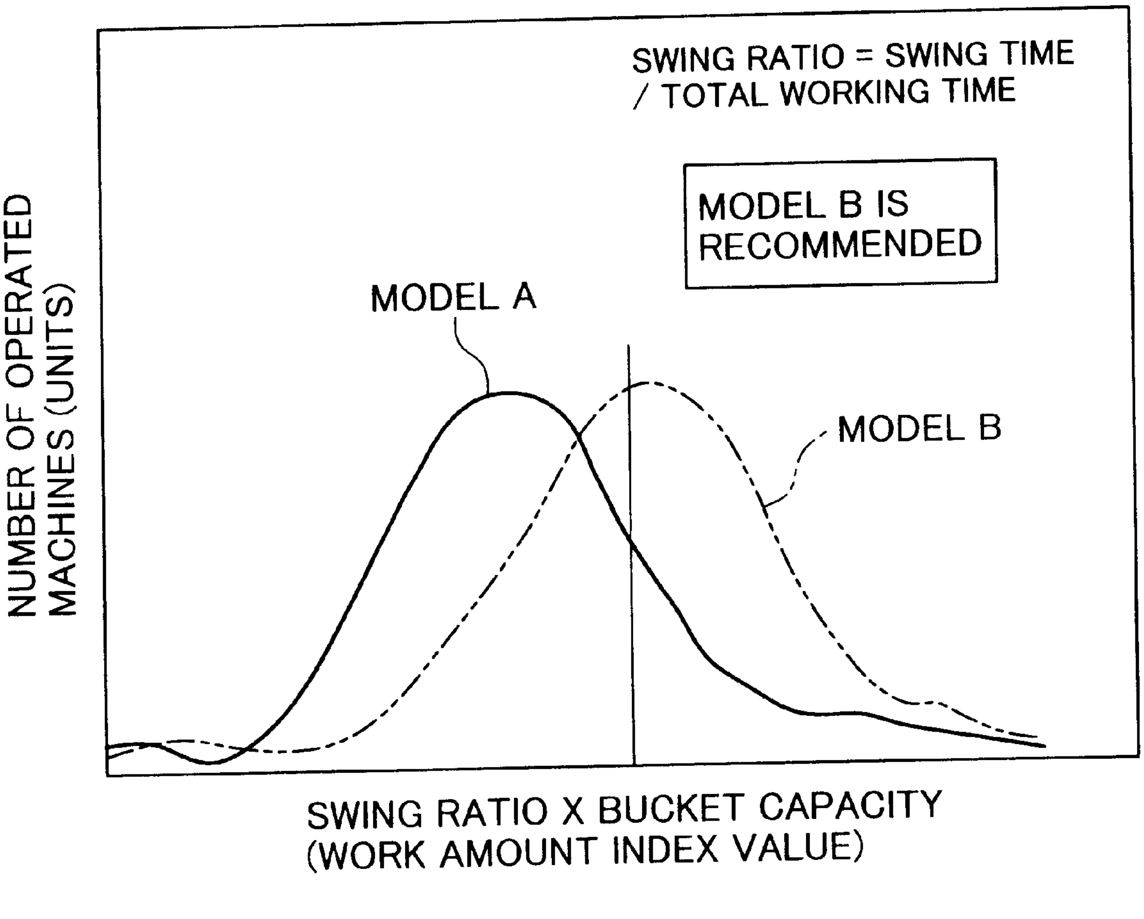
FIG. 32 is a graph showing one example of an evaluation result report.
Figure 33:
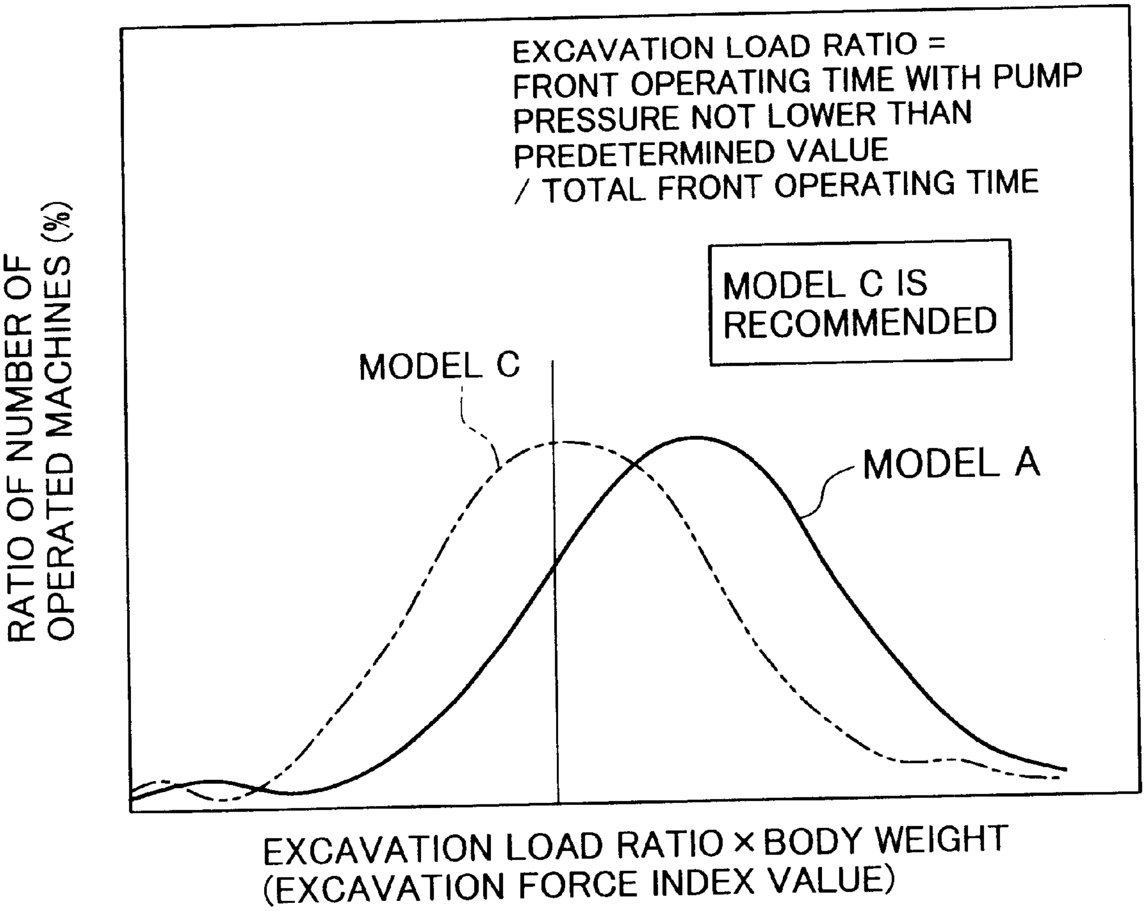
FIG. 33 is a graph showing one example of an evaluation result report.

FIGS. 31 to 33 each show one example of the evaluation result report prepared and outputted in the processing of step S568 in FIG. 27.

FIG. 31 shows one example of the report showing, in a superimposed manner, not only a distribution graph of the number of operated machines with respect to the travel ratio for the machine model A and the travel ratio of the machine corresponding to the inputted number, but also a distribution graph for the machine model $A_{TR}$ (travel-enhanced type) having an average value of the travel ratio which is closest to the travel ratio of the machine corresponding to the inputted number. The travel ratio of the machine corresponding to the inputted number is indicated by a vertical line in the distribution graphs. Also, in this example, since the travel ratio of the machine corresponding to the inputted number is close to that of the machine model $A_{TR}$, a message "Travel-enhanced model is recommended" is added to the evaluation result.

FIG. 32 shows one example of the report showing, in a superimposed manner, not only a distribution graph of the number of operated machines with respect to the work amount index value (swing ratio×bucket capacity) for the machine model A and the work amount index value of the machine corresponding to the inputted number, but also a distribution graph for the machine model B (model of one rank-up level) having an average value of the work amount index value which is closest to the work amount index value of the machine corresponding to the inputted number. The work amount index value of the machine corresponding to the inputted number is indicated by a vertical line in the distribution graphs. Also, in this example, since the work amount index value of the machine corresponding to the inputted number is close to that of the machine model B, a message "Model B is recommended" is added to the evaluation result.

FIG. 33 shows one example of the report showing, in a superimposed manner, not only a distribution graph of the number of operated machines with respect to the excavation force index value (excavation load ratio×body weight) for the machine model A and the excavation force index value of the machine corresponding to the inputted number, but also a distribution graph for the machine model C (model of one rank-down level) having an average value of the excavation force index value which is closest to the excavation force index value of the machine corresponding to the inputted number. The excavation force index value of the machine corresponding to the inputted number is indicated by a vertical line in the distribution graphs. Also, in this example, since the excavation force index value of the machine, corresponding to the inputted number is close to that of the machine model C, a message "Model C is recommended" is added to the evaluation result.

With this embodiment constructed as described above, from the operation data including the operating time for each section of the hydraulic excavator 1, there are obtained an index value, such as a travel ratio, regarding the state of use of one particular hydraulic excavator, a distribution of the number of operated hydraulic excavators of the same model as the particular hydraulic excavator with respect to index values, and a distribution of the number of operated hydraulic excavators of different model from the particular hydraulic excavator with respect to index values. Those three kinds of data are compared with one another to determine whether the particular hydraulic excavator is an optimum model. Therefore, how the customer employs the owned hydraulic excavator (particular hydraulic excavator) in practice can be confirmed from comparison with other hydraulic excavators of the same model and other hydraulic excavators of different model, and whether the particular hydraulic excavator is an optimum model for the customer can be evaluated. It is hence possible to give an advice about the optimum model more appropriately depending on the state of use.

A third embodiment of the present invention will be described with reference to FIGS. 1 to 4 and 34 to 40. This embodiment is intended to confirm the state of use by detecting, instead of the operating time, the number of times of operations as a parameter representing the operation status for each section of a construction machine in the first embodiment.

A management system of a construction machine according to this embodiment has the same overall arrangement as that of the first embodiment, and has a system arrangement similar to that of the first embodiment shown in FIGS. 1 to 4.

Also, in this embodiment, the machine side controller 2 has the function of collecting the operating time for each section of a hydraulic excavator, and correspondingly the machine body/operation information processing section 50 of the base station center server 3 has the function of processing the operating time. Further, the base station center server 3 includes the machine body information/optimum model evaluation processing section 51.

A description is first made of the function of collecting the operating data for each section of the hydraulic excavator, which is executed in the machine side controller 2.

Figure 34:
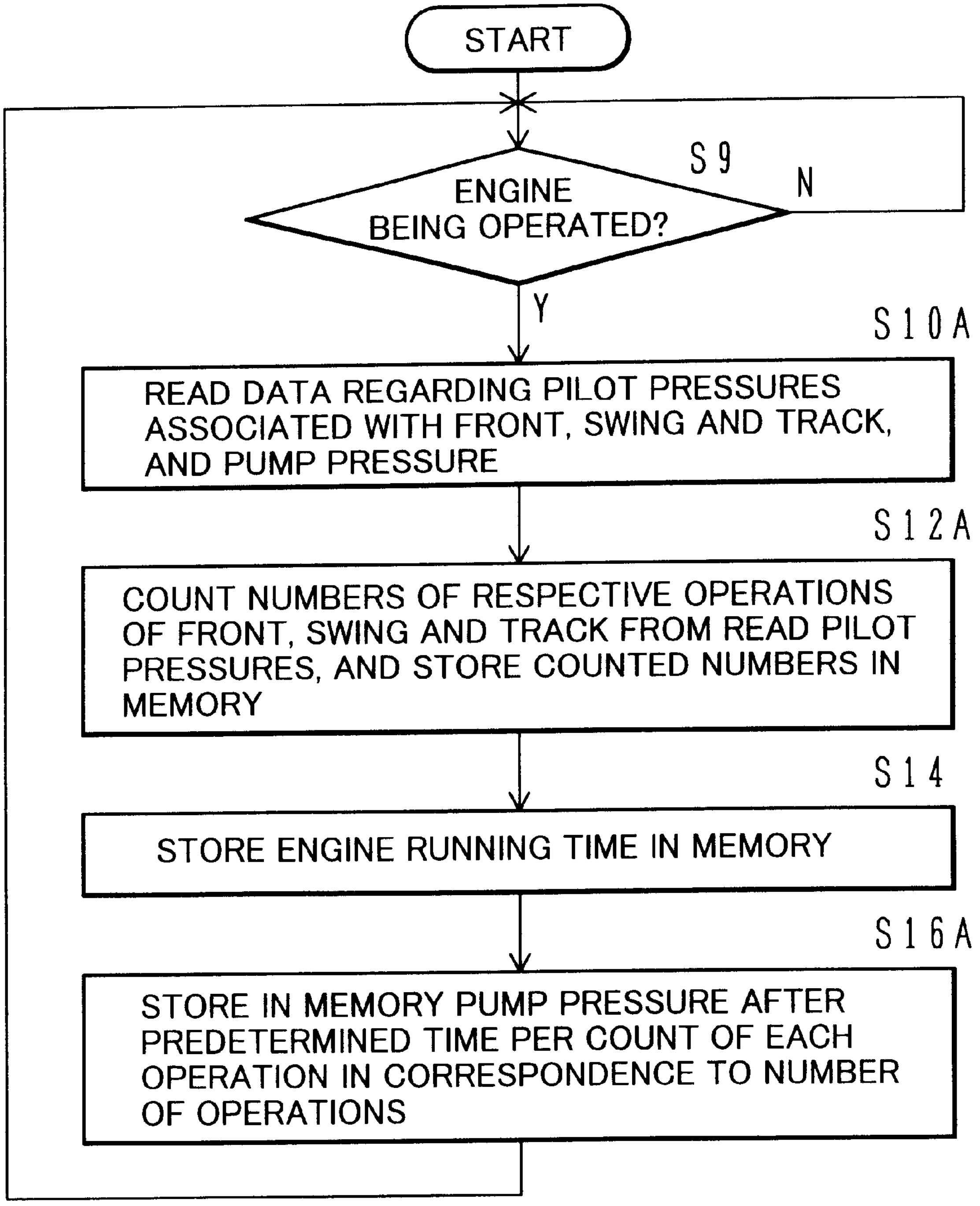
FIG. 34 is a flowchart showing the function of collecting operation data executed by the machine side controller in a system for managing a construction machine according to a third embodiment of the present invention.

FIG. 34 is a flowchart showing the function of collecting the operating data for each section of the hydraulic excavator executed in the CPU 2*c* of the controller 2. As with the first embodiment, the CPU 2*c* first determines whether the engine revolution speed signal from the sensor 46 is of a value not lower than a predetermined revolution speed, and hence whether the engine is being operated (step S9). If it is determined that the engine is being operated, the CPU 2*c* reads data regarding the pilot pressure detection signals associated with the front, swing and track from the sensors 40, 41 and 42, and the pump pressure detection signal from the sensor 44 (step S10A). Then, based on each of the read pilot pressures associated with the front, swing and track, the CPU 2*c* counts the number of times of each of front, swing and track operations, and stores and accumulates the counted result in the memory 2*d* in correspondence to the date and the time of day (step S12A). Herein, the number of times of operations is counted up one when the pilot pressure exceeds a predetermined pressure. Also, the number of times of front operations is counted depending on, e.g., the pilot pressure for arm crowding that is essential in excavation work. The number of times of operations may be counted up one depending on each of the pilot pressures for operating the boom, the arm and the bucket. To count it up one upon a combined operation of those sections in this embodiment, however, if another of the pilot pressures for operating the boom, the arm and the bucket exceeds the predetermined pressure when any one of them is in excess of the predetermined pressure, the number of times of operations is counted up one by taking logical "OR" of those detection signals. Then, an engine running time is stored and accumulated in the memory 2*d* (step S14). Thereafter, each time when the number of times of operations is counted in step S12A, the pump pressure after the lapse of a predetermined time (e.g., 2 to 3 seconds) is detected and then stored and accumulated in the memory 2*d* in correspondence to the number of times of operations (step S16A).

The machine body/operation information thus stored and accumulated is transmitted to the base station center server 3 once a day, as described above in connection with the first embodiment with reference to FIG. 6.

Figure 35:
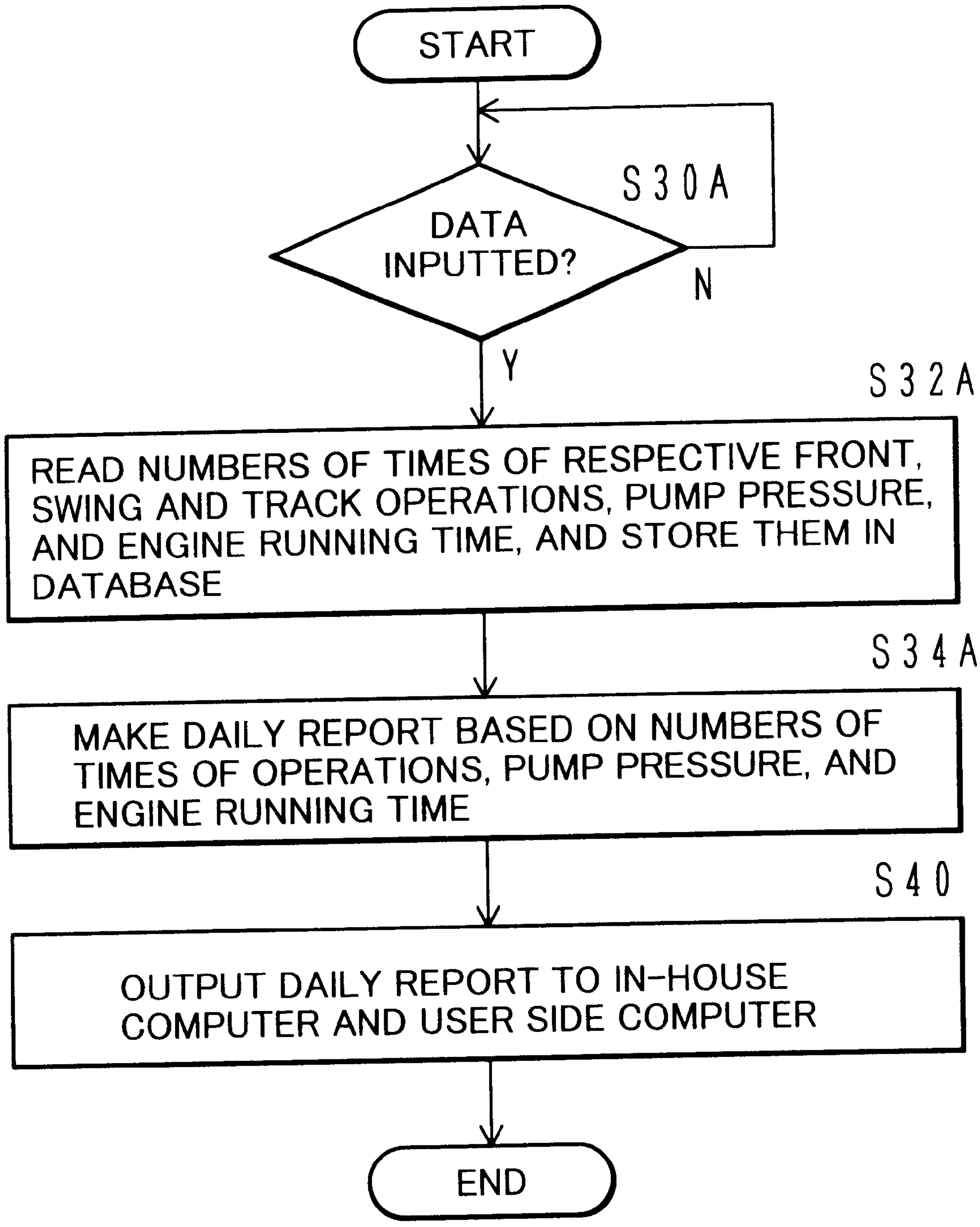
FIG. 35 is a flowchart showing the processing function of the machine body/operation information processing section in the base station center server executed when the operating time data is transmitted from the machine side controller.

FIG. 35 is a flowchart showing the processing function of the machine body/operation information processing section 50 in the center server 3 executed when the machine body/operation information is transmitted from the machine side controller 2.

In FIG. 35, the machine body/operation information processing section 50 monitors whether the machine body/operation information (the number of times of each of front, swing and track operations, the pump pressure, and the engine running time) is inputted from the machine side controller 2 (step S30A). When the machine body/operation information is inputted, the processing section 50 reads the inputted information, and then stores and accumulates it as operation data in the database 100 (step S32A). The processing section 50 then reads the operation data for a predetermined number of days, e.g., one month, out of the database 100 and makes a daily report regarding the operating data (step S34A). Thereafter, the thus-prepared daily report and a maintenance report are transmitted to the in-house computer 4 and the user side computer 5 (step S40).

Figure 36:
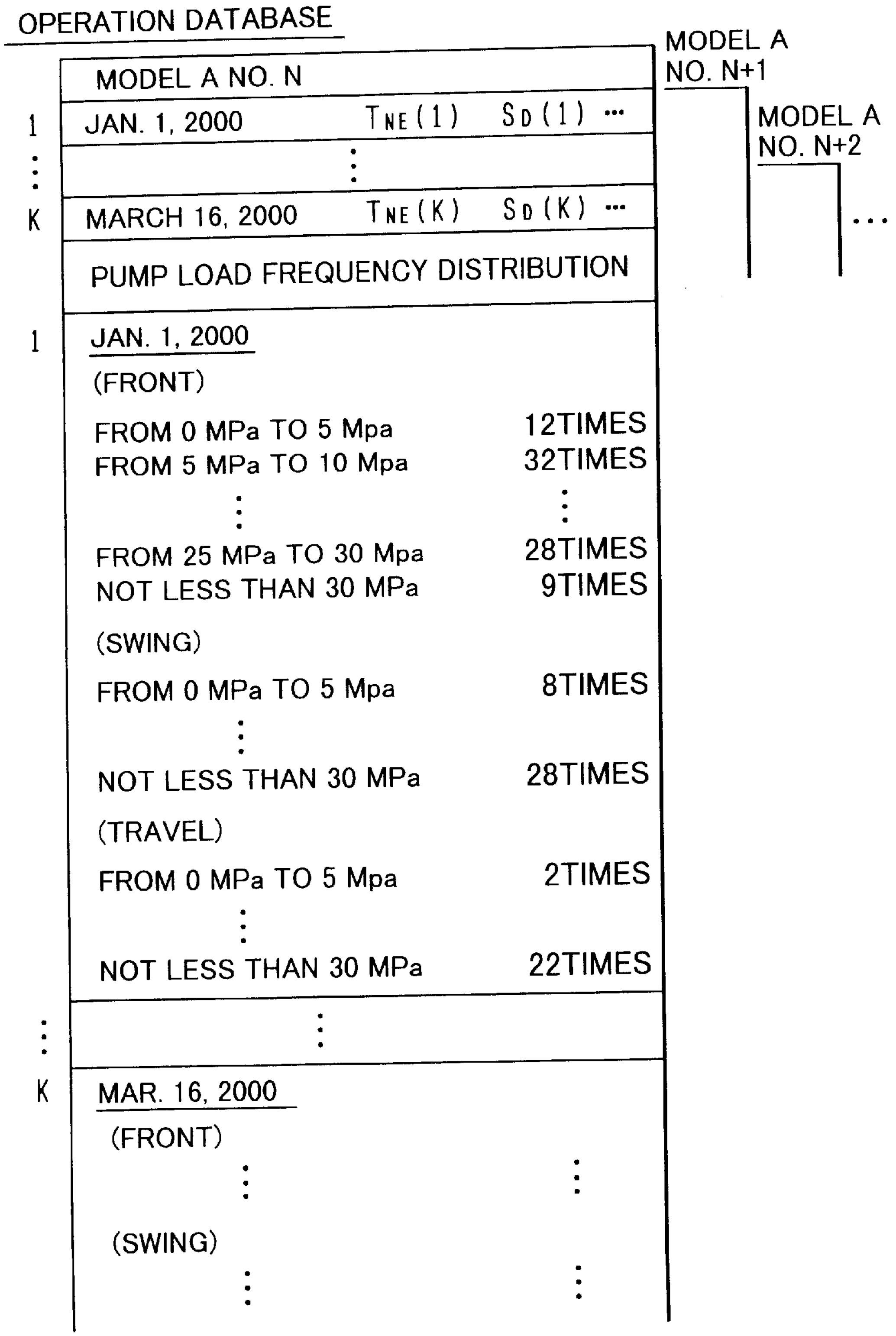
FIG. 36 shows how operation data is stored as a database in the base station center server.

FIG. 36 shows how the operation data is stored in the database 100. In the database 100, the engine running time, the number of times of front operations (the number of times of excavations), the number of times of swing operations, and the number of times of track operations are stored as an operation database per machine model and number in the form of accumulative values in correspondence to the date. In an illustrated example, $T_{NE}(1)$ and $S_D(1)$ represent respectively an accumulative value of the engine running time and an accumulative value for the number of times of front operations for a No. N machine of model A as of Jan. 1, 2000. $T_{NE}(K)$ and $S_D(K)$ represent respectively an accumulative value of the engine running time and an accumulative value for the number of times of front operations for the No. N machine of model A as of Mar. 16, 2000. Similarly, accumulative values $S_S(1)$ to $S_S(K)$ for the number of times of swing operations and accumulative values $S_T(1)$ to $S_T(K)$ for the number of times of track operations for the No. N machine of model A are stored in correspondence to the date. Similar data is also stored for a No. N+1 machine, a No. N+2 machine, etc. of models A, B, C, etc.

Further, in the operation database per machine model and number, the pump load frequency distribution is stored and accumulated for each of the front, swing and track operations in correspondence to the date. In an illustrated example, the number of times of front operations is stored in an area for the front operation dated Jan. 1, 2000 for each pump pressure zone of 5 MPa; e.g., from 0 MPa to 5 MPa: 12 times, from 5 MPa to 10 MPa: 32 times, . . . , from 25 MPa to 30 MPa: 28 times, and not lower than 30 MPa: 9 times. The pump load frequency distribution is also similarly stored in areas for the swing and track operations and areas for the subsequent dates.

The machine body information/optimum model evaluation processing section 51 of the base station center server 3 has, as with the first embodiment, the function of processing the machine body information per model and the function. of processing a request for evaluating an optimum model. The function of processing the machine body information per model is the same as that in the first embodiment described with reference to FIGS. 19 and 20.

Figure 37:
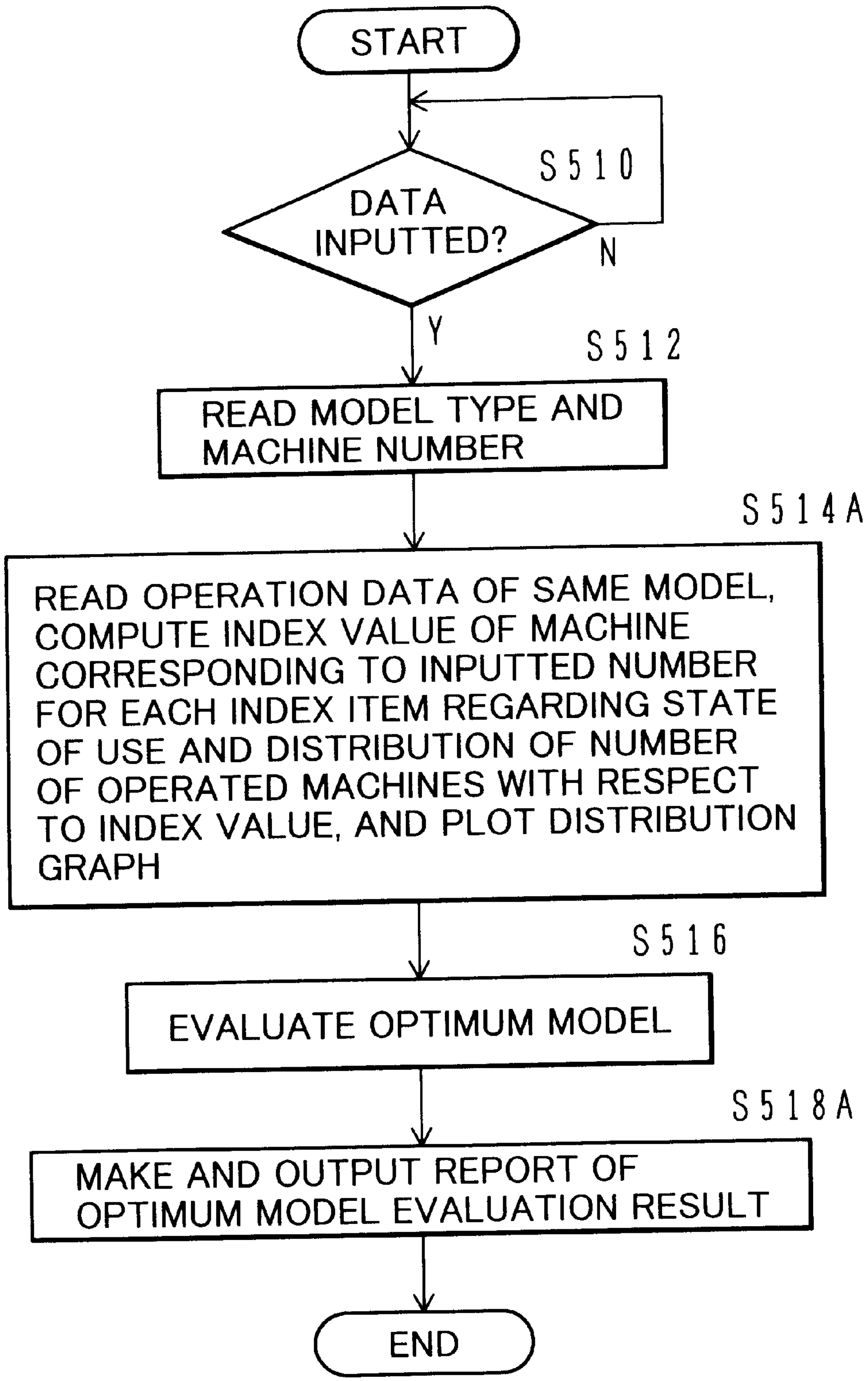
FIG. 37 is a flowchart showing the function of processing a request for evaluating an optimum model executed in the machine body information/optimum model evaluation processing section of the center server.
Figure 38:
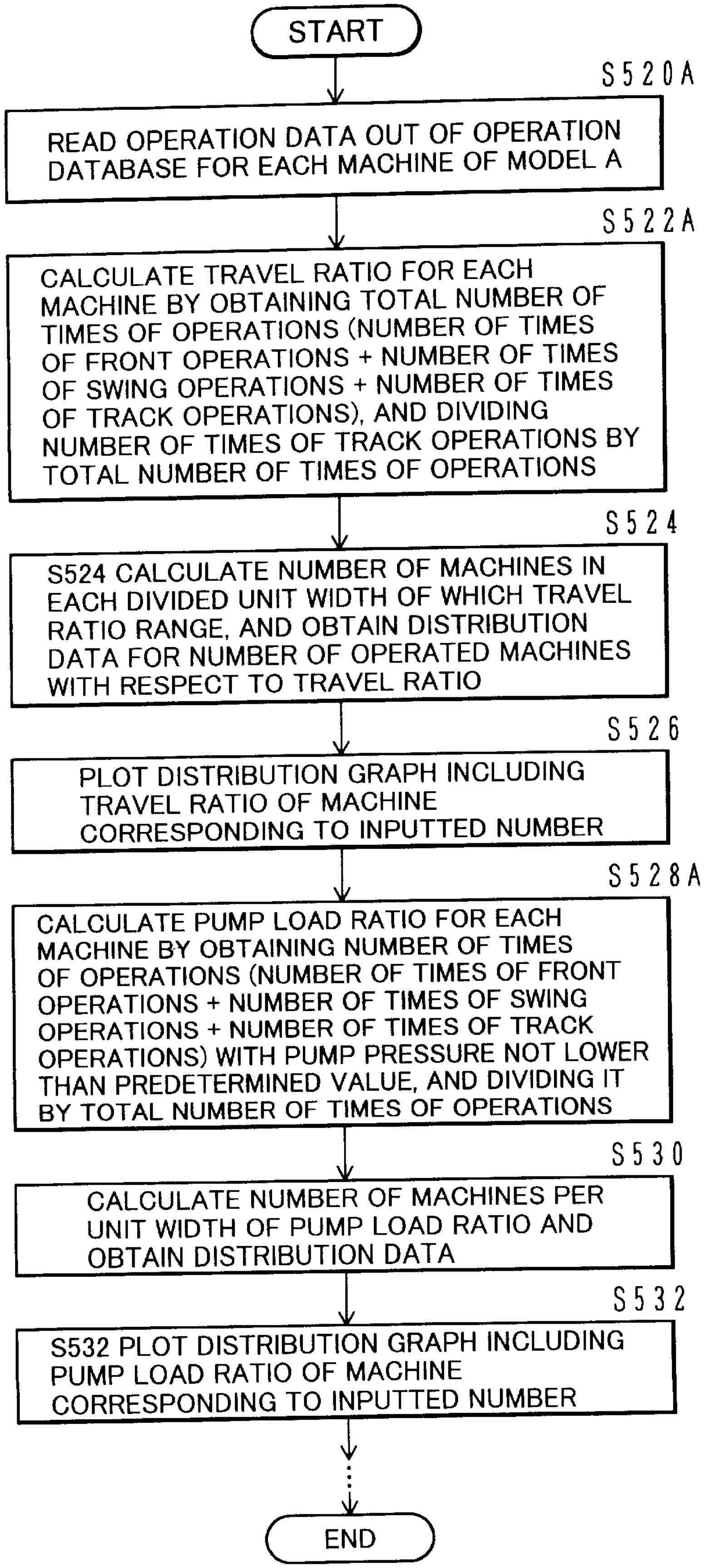
FIG. 38 is a flowchart showing details of processing to compute an index value of a hydraulic excavator corresponding to the inputted number for each index item regarding the state of use of the hydraulic excavator, to obtain a distribution of the number of operated machines with respect to index values, and to plot a distribution graph.

FIG. 37 is a flowchart showing the function of processing a request for evaluating an optimum model executed in the machine body information/optimum model evaluation processing section 51 of the center server 3, and FIG. 38 is a flowchart showing details of processing executed in step S514A of FIG. 37. The processing executed in steps S510 and S512 of FIG. 37 is the same as that in the first embodiment.

In step S514A of FIG. 37, the processing section 51 computes an index value of a hydraulic excavator corresponding to the inputted number for each index item regarding the state of use of the hydraulic excavator, obtains a distribution of the number of operated machines with respect to index values, and plots a distribution graph through the processing shown in FIG. 38.

In FIG. 38, first, the processing section 51 accesses the database 100 and reads the operation data for each machine number of the model A from the operation database shown in FIG. 36 (step S520A). Then, the processing section 51 calculates, per machine number, a travel ratio (%) by calculating the past total number of times of operations, which is resulted from adding the total number of front operations (e.g., the latest accumulative value $S_D(K)$ for the number of times of front operations for the No. N machine shown in FIG. 36), the total number of times of swing operations ($S_S(K)$) and the total number of times of track operations ($T_T(K)$), and then dividing the total number of times of track operations ($T_T(K)$) by the past total number of times of operations (step S522A). Subsequently, as with the first embodiment, the processing section 51 classifies the travel ratios calculated per machine number and obtains a distribution of the number of operated machines with respect to the travel ratio (step S524). The thus-obtained distribution data is prepared in the form of a distribution graph, and the travel ratio of the machine corresponding to the inputted number is put in the distribution graph (S526).

Likewise, the distribution data is obtained for a pump load ratio as another index, and a distribution. graph including the pump load ratio of the machine corresponding to the inputted number is plotted (steps S528A to S532). Herein, the term "pump load ratio" represents a proportion of the number of times of operations in which the pump load pressure is not lower than a predetermined pressure, with respect to the total number of times of operations per machine number. The number of times of operations in which the pump load pressure is not lower than the predetermined pressure can be obtained, from the pump load frequency distribution for all of the front, swing and track operations shown in FIG. 36, by totalizing the number of times of each of those operations in which the pump load pressure is not lower than the predetermined pressure. In this embodiment, the pump load ratio is a value representing a rate at which the hydraulic excavator is used for works under high load, and the predetermined pump pressure is set to, e.g., about 15 MPa.

Other indices than stated above, such as an excavation load ratio (number of times of excavations/total number of times of operations) and a swing load ratio (number of times of swing operations/total number of times of operations), can also be set as required, and a distribution graph for each index can be obtained in a similar manner.

Returning to FIG. 37, in steps S516 and S518A, the processing section 51 evaluates whether the hydraulic excavator corresponding to the inputted machine number is an optimum model, and then prepares and outputs a report of the evaluation result similarly to the first embodiment.

Figure 39:
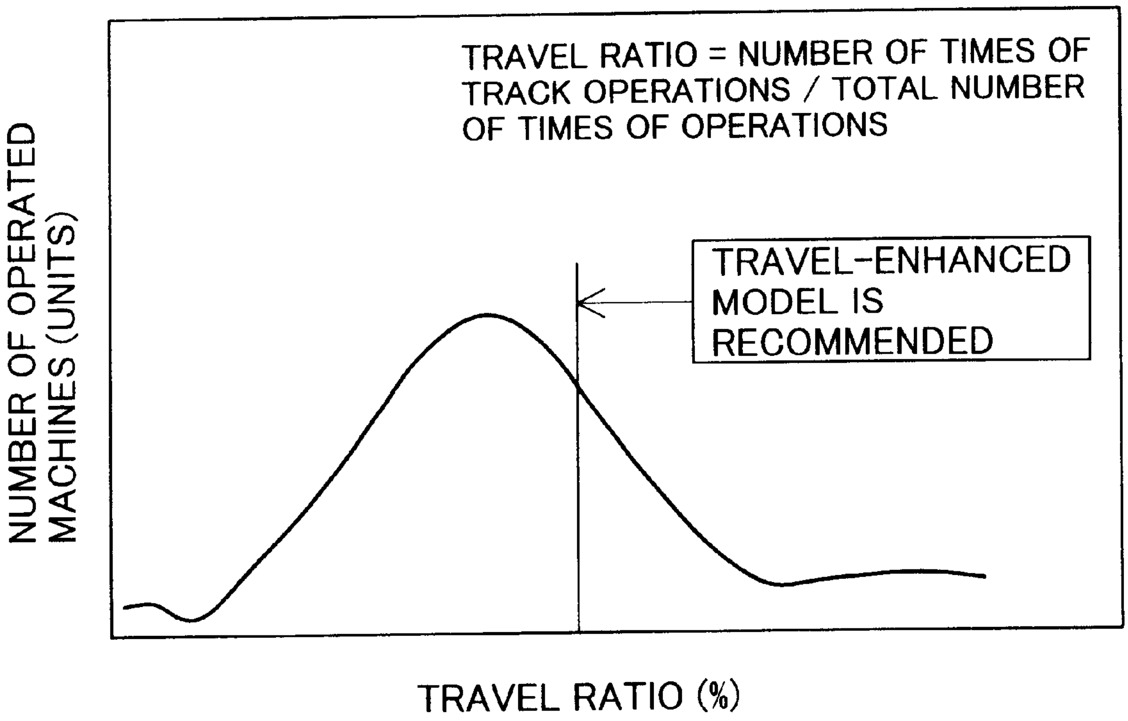
FIG. 39 is a graph showing one example of an evaluation result report.
Figure 40:
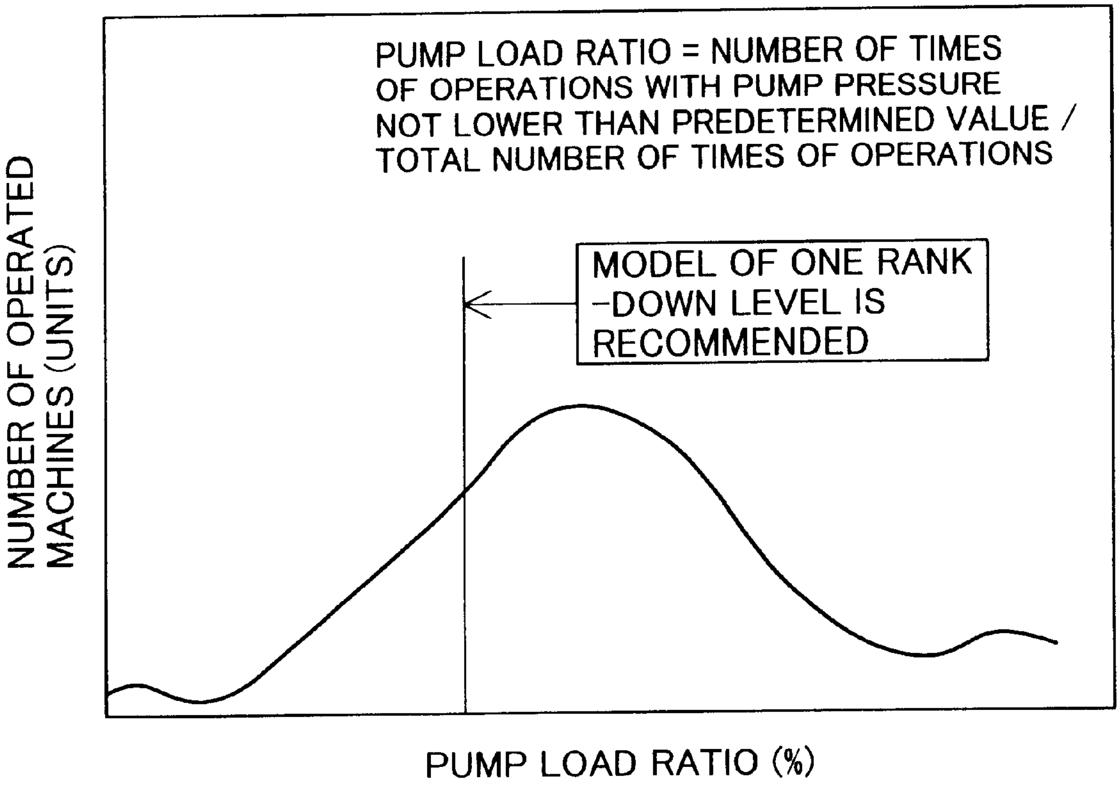
FIG. 40 is a graph showing one example of an evaluation result report.

FIGS. 39 and 40 each show one example of the evaluation result report prepared and outputted in the processing of step S518A in FIG. 37. The reports of FIGS. 39 and 40 are the same as those of FIGS. 25 and 26 for the first embodiment except that the travel ratio and the pump load ratio are defined respectively by "travel ratio=number of times of track operations/total number of times of operations" and "pump load ratio=number of times of operations implemented at the predetermined pump pressure or higher/total number of times of operations".

With this embodiment, therefore, how the customer employs the owned hydraulic excavator (particular hydraulic excavator) in practice can be confirmed from comparison with other hydraulic excavators of the same model by using the number of times of operations as a parameter representing the operation status, and whether the particular hydraulic excavator is an optimum model for the customer can be evaluated. It is hence possible to give an advice about the optimum model depending on the state of use.

A fourth embodiment of the present invention will be described with reference to FIGS. 1 to 4, 20, 36, and 41 to 46. This embodiment is intended to confirm the state of use by detecting, instead of the operating time, the number of times of operations as a parameter representing the operation status for each section of a construction machine in the second embodiment.

A management system of a construction machine according to this embodiment has the same overall arrangement as that of the first embodiment, and has a system arrangement similar to that of the first embodiment shown in FIGS. 1 to 4. The processing function of the machine side controller 2 and the processing function of the machine body/operation information processing section 50 in the base station center server 3 are the same as those in the third embodiment.

In this embodiment, the machine body information/optimum model evaluation processing section 51 of the base station center server 3 has the function of processing the machine body information per model, which is similar to that in the first embodiment. Also, the processing section 51 has the function of processing a request for evaluating an optimum model as described below.

Figure 41:
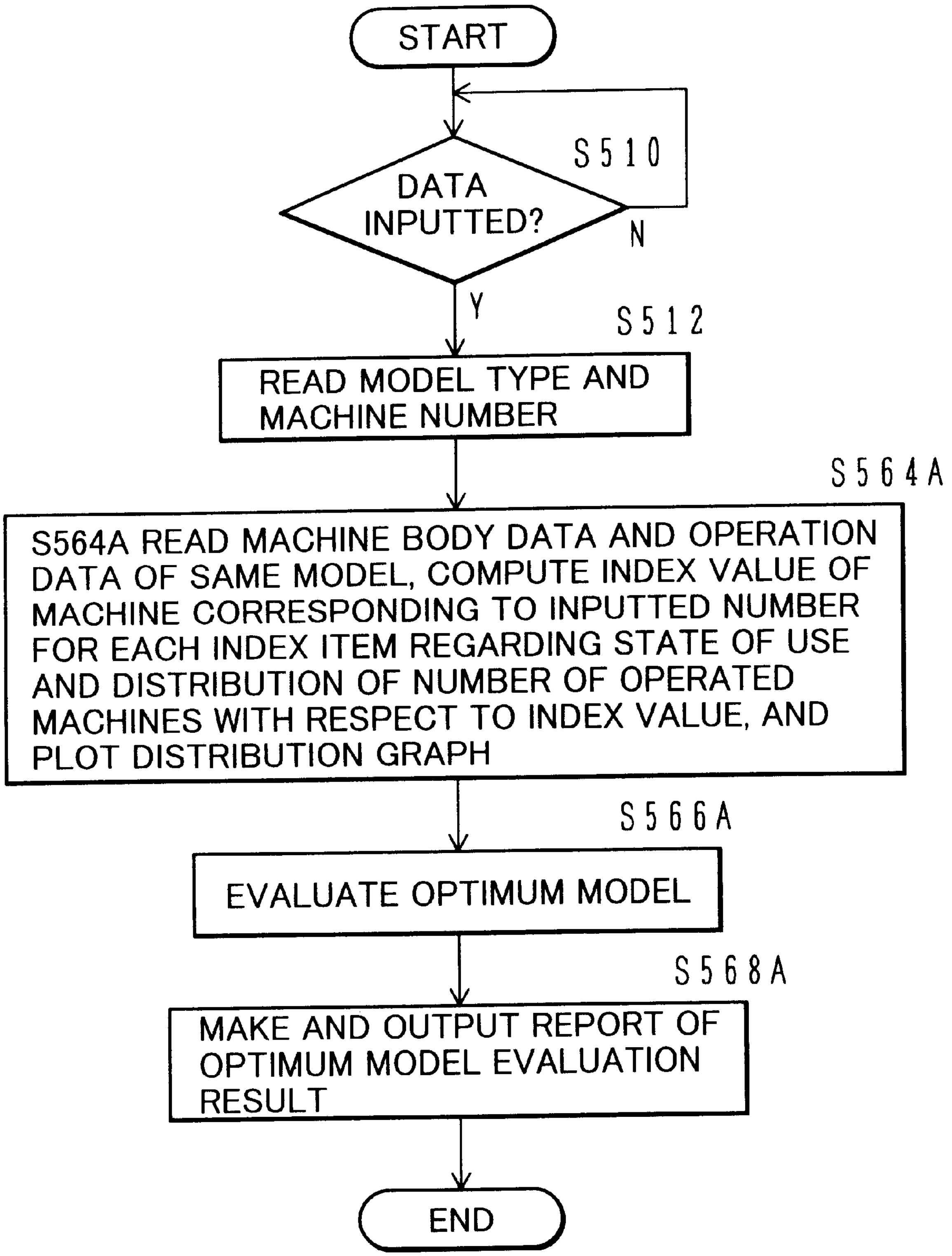
FIG. 41 is a flowchart showing the function of processing a request for evaluating an optimum model executed in the machine body information/optimum model evaluation processing section of the center server in a system for managing a construction machine according to a fourth embodiment of the present invention.
Figure 42:
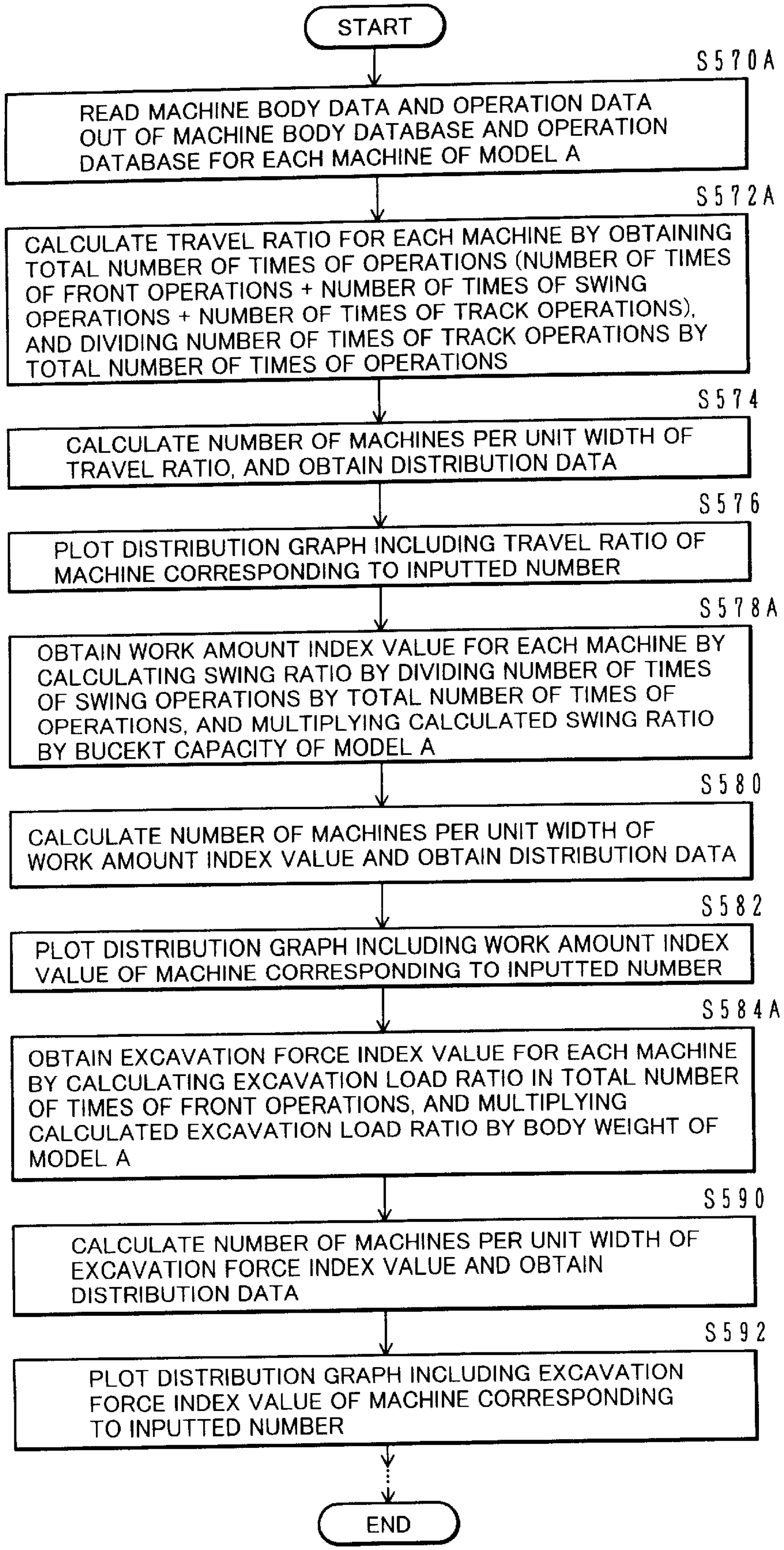
FIG. 42 is a flowchart showing details of processing to compute an index value of a hydraulic excavator corresponding to the inputted number for each index item regarding the state of use of the hydraulic excavator, to obtain a distribution of the number of operated machines with respect to index values, and to plot a distribution graph.

FIG. 41 is a flowchart showing the function of processing a request for evaluating an optimum model executed in the processing section 51 of the center server 3, and FIG. 42 is a flowchart showing details of processing executed in step S564A of FIG. 41. The processing executed in steps S510 and S512 of FIG. 41 is the same as that in the first embodiment.

In step S564A of FIG. 41, through the processing shown in FIG. 42, the processing section 51 computes an index value of a hydraulic excavator corresponding to the inputted number for each index item regarding the state of use of the hydraulic excavator, obtains a distribution of the number of operated machines with respect to index values, and plots a distribution graph.

In FIG. 42, first, the processing section 51 accesses the database 100 and reads the operating data and the machine body data for each machine number of the model A (i.e., the model read in step S512 of FIG. 41), respectively, from the operation database shown in FIG. 36 and the machine body database shown in FIG. 20 (step S570A).

Then, the processing section 51 calculates, per machine number, a travel ratio (%) by calculating the past total number of times of operations, which is resulted from adding the total number of front operations (e.g., the latest accumulative value $S_D(K)$ for the number of times of front operations for the No. N machine shown in FIG. 36), the total number of times of swing operations ($S_S(K)$) and the total number of times of track operations ($T_T(K)$), and then dividing the total number of times of track operations ($T_T(K)$) by the past total number of times of operations (step S572A). Subsequently, as with the second embodiment, the processing section 51 classifies the calculated travel ratios and obtains a distribution of the number of operated machines with respect to the travel ratio (step S574). The thus-obtained distribution data is prepared in the form of a distribution graph, and the travel ratio of the machine corresponding to the inputted number is put in the distribution graph (S576). Then, the processing section 51 calculates, per machine number, a swing ratio (%) by dividing the past total number of times of swing operations ($S_S(K)$) by the past total number of times of operations calculated above, and obtains a value resulting from multiplying the calculated swing ratio by the bucket capacity (e.g., $W_A$ shown in FIG. 20) of the model A, i.e., a work amount index value (step S578A). Then, as with the second embodiment, the calculated work amount index values are classified, and a distribution of the number of operated machines with respect to the work amount index value is obtained (step S580). The thus-obtained distribution data is prepared in the form of a distribution graph, and the work amount index value of the machine corresponding to the inputted number is put in the distribution graph (S582).

Figure 43:
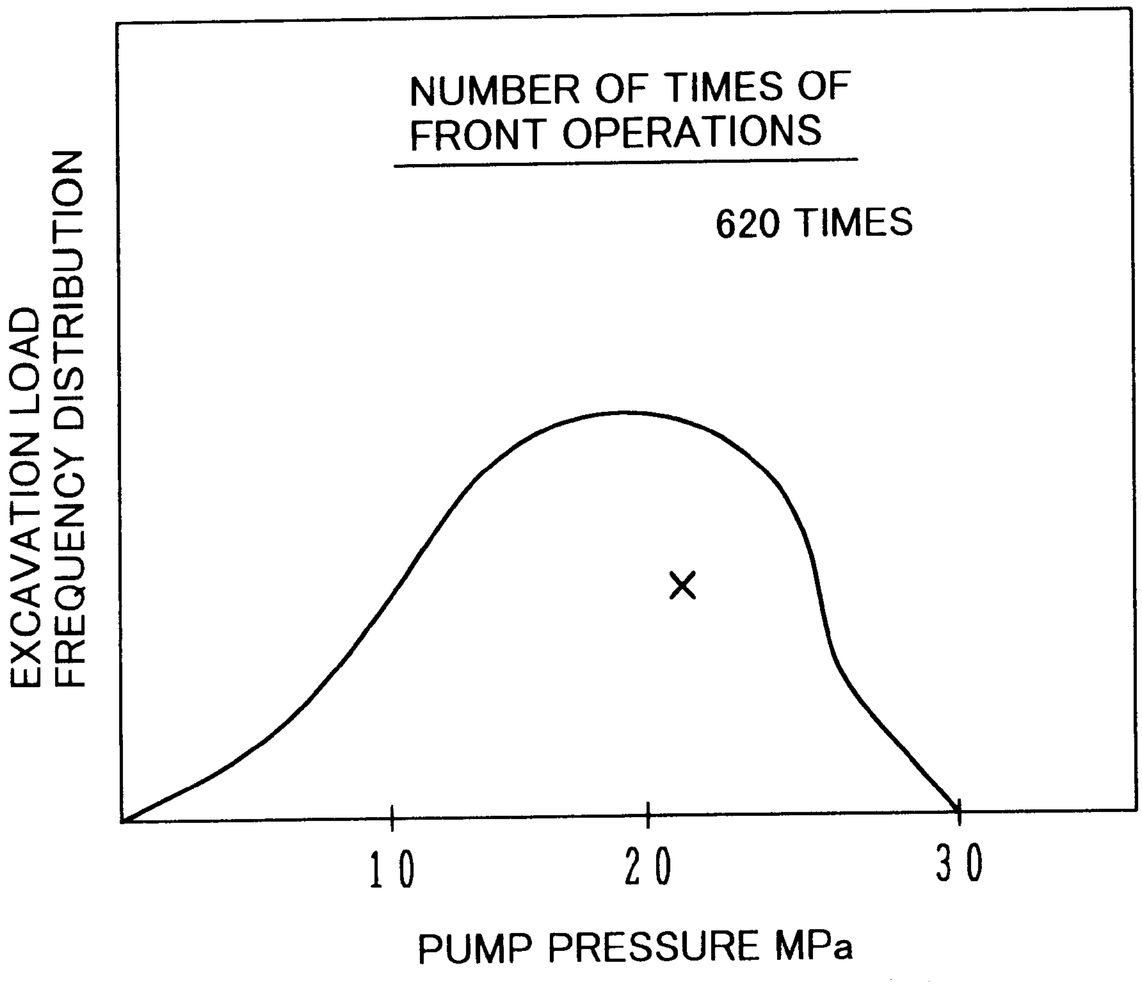
FIG. 43 is a graph showing one example of excavation load frequency distribution used for determining an excavation load ratio.

Then, the processing section 51 calculates, per machine number, an excavation load ratio with respect to the past total number of times of front operations, and obtains a value resulting from multiplying the calculated excavation load ratio by the body weight of the model A, i.e., an excavation force index value (step S584A). Herein, the excavation load ratio with respect to the total number of times of front operations can be calculated essentially in the same manner as the case of calculating the excavation load ratio with respect to the total front operating time in the second embodiment. More specifically, based on the pump load frequency distribution data in the operation database shown in FIG. 36, the data regarding the front operation is summed up for all of the past working days to obtain a pump load frequency distribution (=excavation load frequency distribution). FIG. 43 shows one example of the excavation load frequency distribution thus obtained. Then, a load ratio of the excavation load frequency distribution is computed. For example, a rate of the number of times of front operations, in which the excavation load is not smaller than a predetermined load, e.g., a pump pressure of 20 MPa, with respect to the total number of times of front operations is calculated and set as an excavation load ratio. Alternatively, the center of gravity (mark x) of an integral value of the excavation load frequency distribution, shown in FIG. 43, may be determined and set as an excavation load ratio. The position of the center of gravity is indicated by a mark x in FIG. 29.

Subsequently, as with the second embodiment, the processing section 51 classifies the excavation force index values thus calculated, and obtains a distribution of the number of operated machines with respect to the excavation force index value (step S590). The thus-obtained distribution data is prepared in the form of a distribution graph, and the excavation force index value of the machine corresponding to the inputted number is put in the distribution graph (S592).

Figure 44:
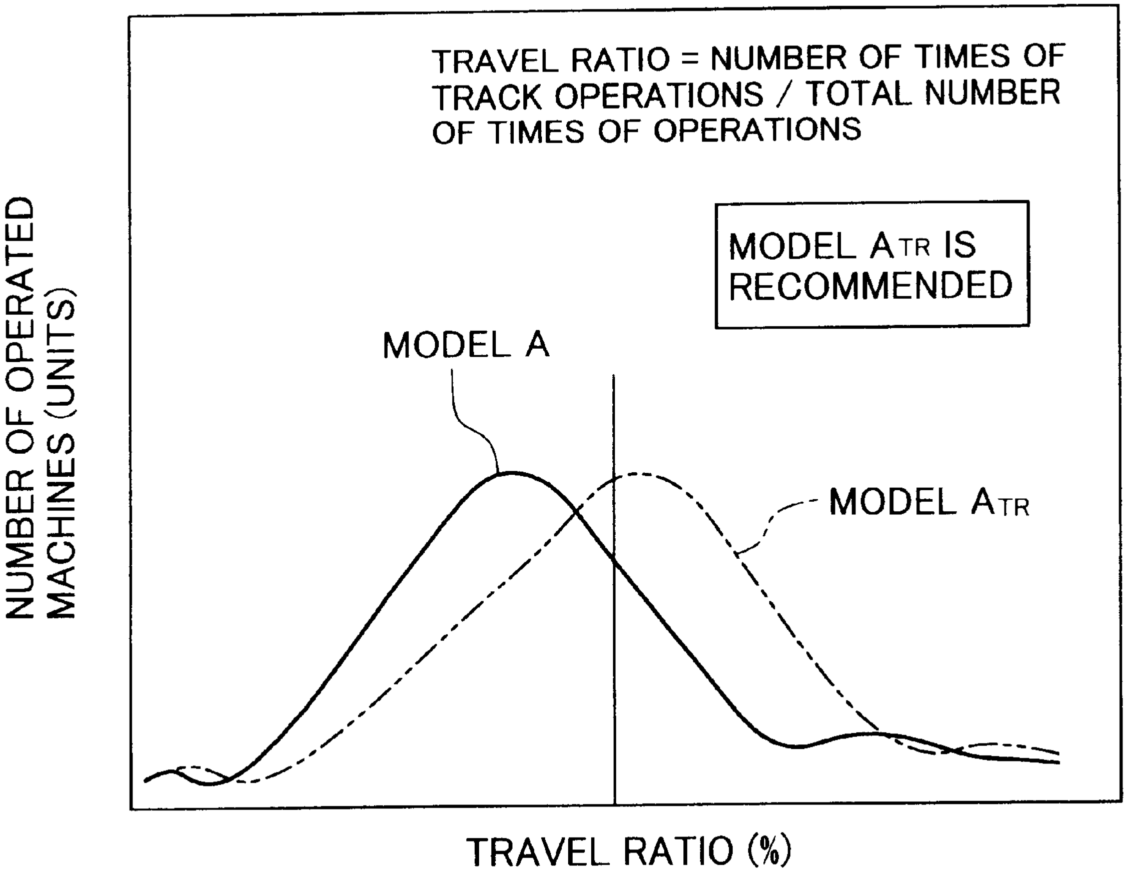
FIG. 44 is a graph showing one example of an evaluation result report.
Figure 45:
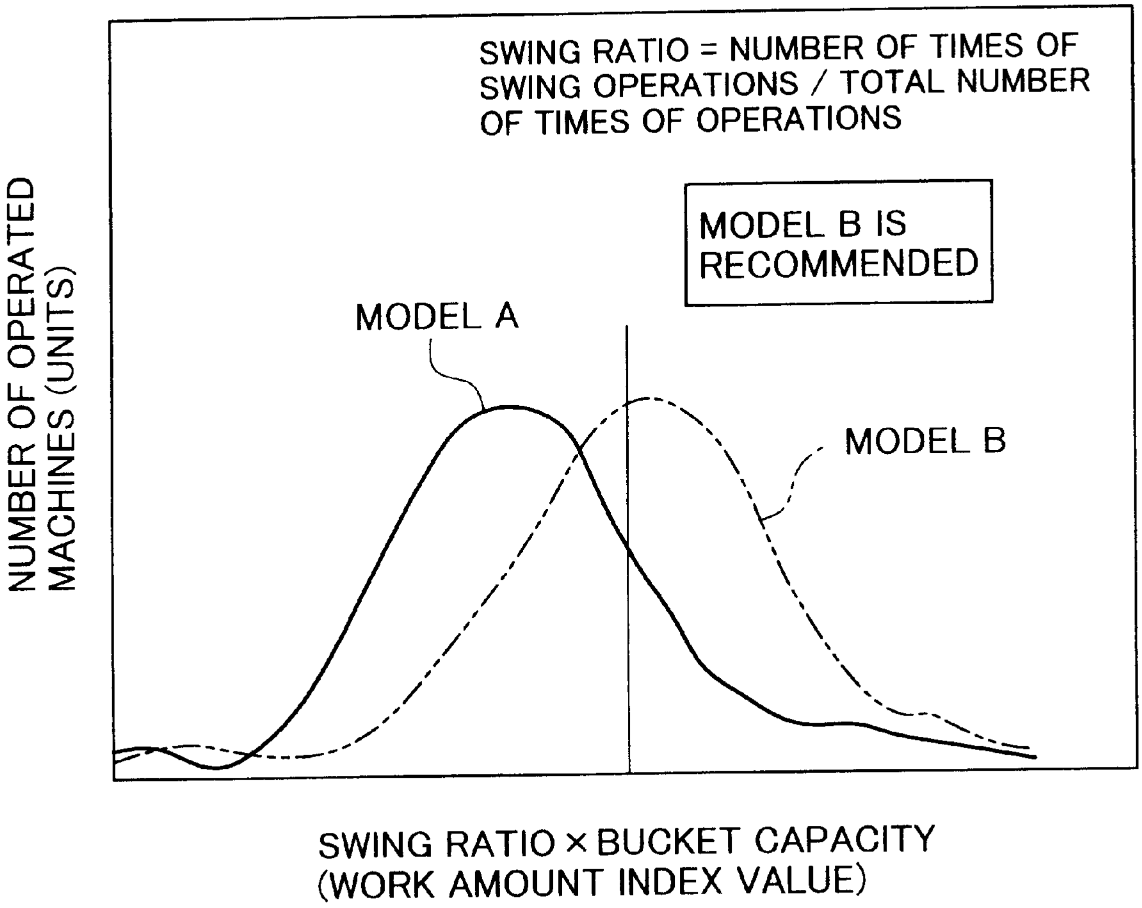
FIG. 45 is a graph showing one example of an evaluation result report.
Figure 46:
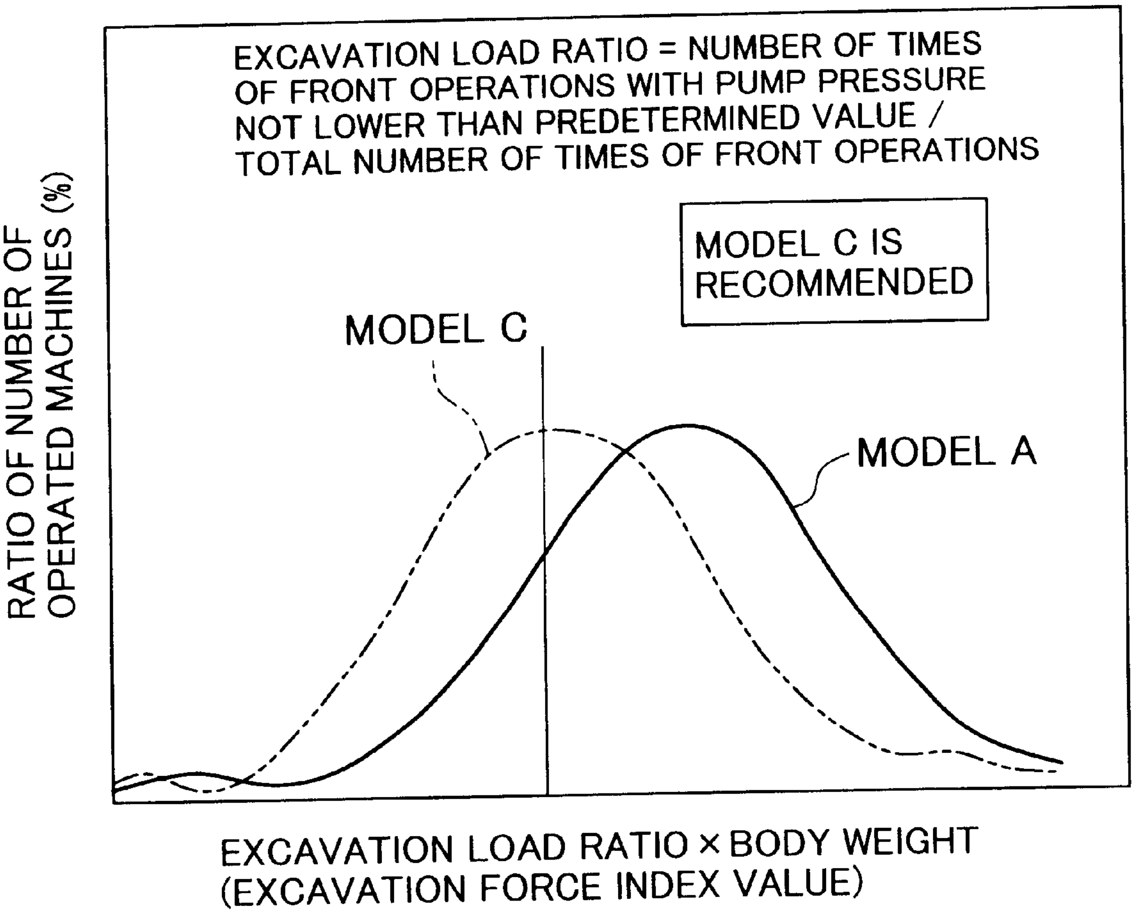
FIG. 46 is a graph showing one example of an evaluation result report.

Returning to FIG. 41, in steps S566A and S568A, the processing section 51 evaluates whether the hydraulic excavator corresponding to the inputted machine number is an optimum model, and then prepares and outputs a report of the evaluation result similarly to the second embodiment. However, the evaluation processing of step S566A in FIG. 41 is executed by using, instead of the operating time, the number of times of operations in the detailed processing of steps S600, S602, S608 and S610 shown in FIG. 30 in connection with the second embodiment similarly to the processing of FIG. 42. Further, in step S568A of FIG. 41, reports shown in FIGS. 44 to 46 are prepared and outputted. The reports of FIGS. 44 to 46 are the same as those of FIGS. 31 to 33 for the second embodiment except that the travel ratio, the swing ratio, and the excavation load ratio are defined respectively by "travel ratio=number of times of track operations/total number of times of operations", "swing ratio=number of times of swing operations/total number of times of operations", and "excavation load ratio= number of times of front operations implemented at the predetermined pump pressure or higher/total number of times of front operations".

With this embodiment, therefore, how the customer employs the owned hydraulic excavator (particular hydraulic excavator) in practice can be confirmed from comparison with other hydraulic excavators of the same model and other hydraulic excavators of different models by using the number of times of operations as a parameter representing the operation status, and whether the particular hydraulic excavator is an optimum model for the customer can be evaluated. It is hence possible to give an advice about the optimum model more appropriately depending on the state of use.

A fifth embodiment of the present invention will be described with reference to FIGS. 47 to 49. This embodiment is intended to modify the measured operation status for each section of a construction machine for an improvement in accuracy of an index value regarding the state of use of the construction machine, and to realize more appropriate evaluation of an optimum model.

Figure 47:
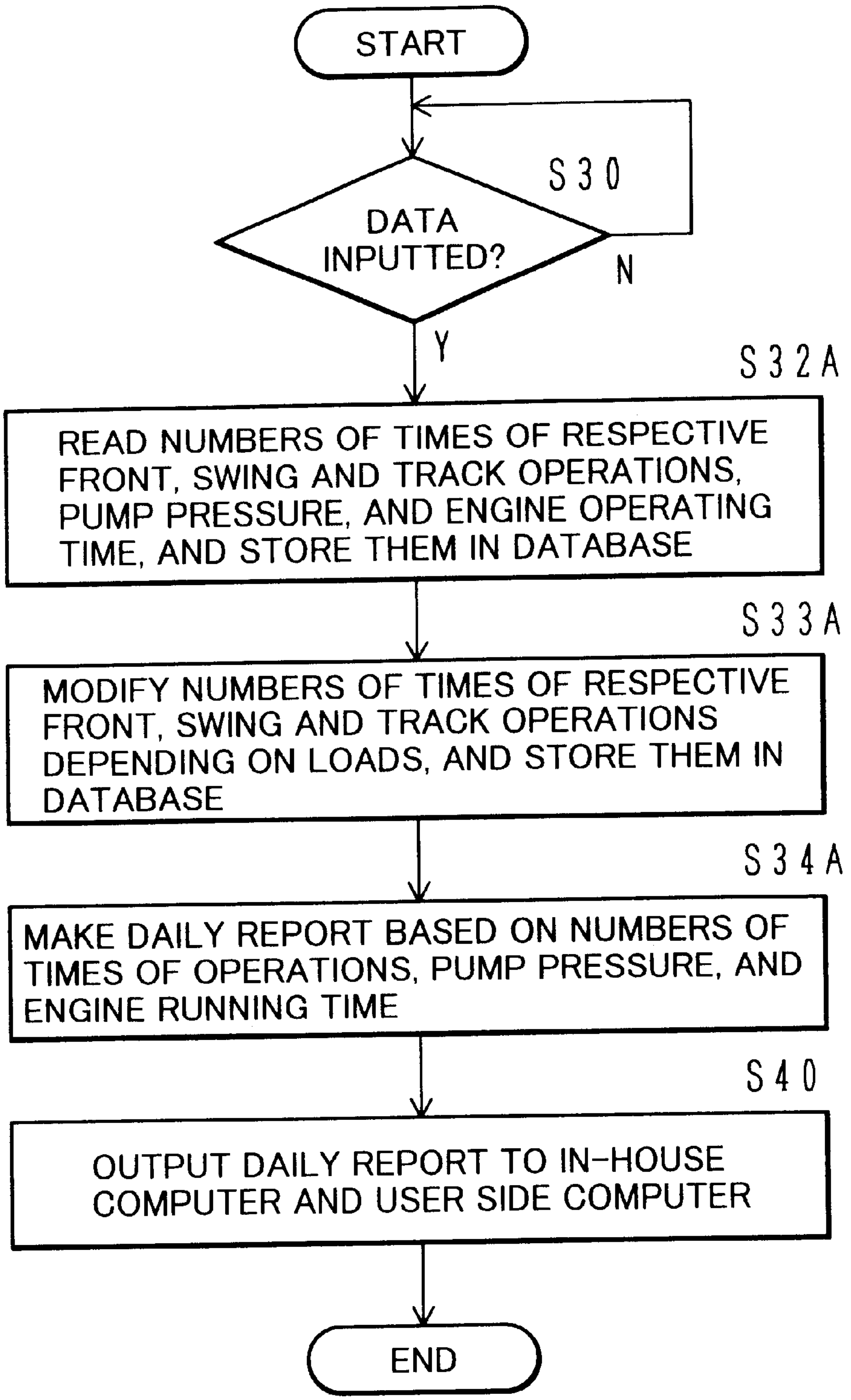
FIG. 47 is a flowchart showing the processing function of the machine body/operation information processing section of the base station center server in a system for managing a construction machine according to a fifth embodiment of the present invention, executed when the operating time data is transmitted from the machine side controller.

FIG. 47 is a flowchart showing the processing function of the machine body/operation information processing section 50 in the center server 3 executed when the machine body/operation information is transmitted from the machine side controller 2.

In FIG. 47, the processing of steps S30, S32A, S34A and S40 is the same as that of those steps of FIG. 35 in the third embodiment. This embodiment differs from the third embodiment in that, in step S33A, the accumulative value for the number of times of each of front, swing and track operations is read out, modified depending on load, and stored in the database again.

Figure 48:
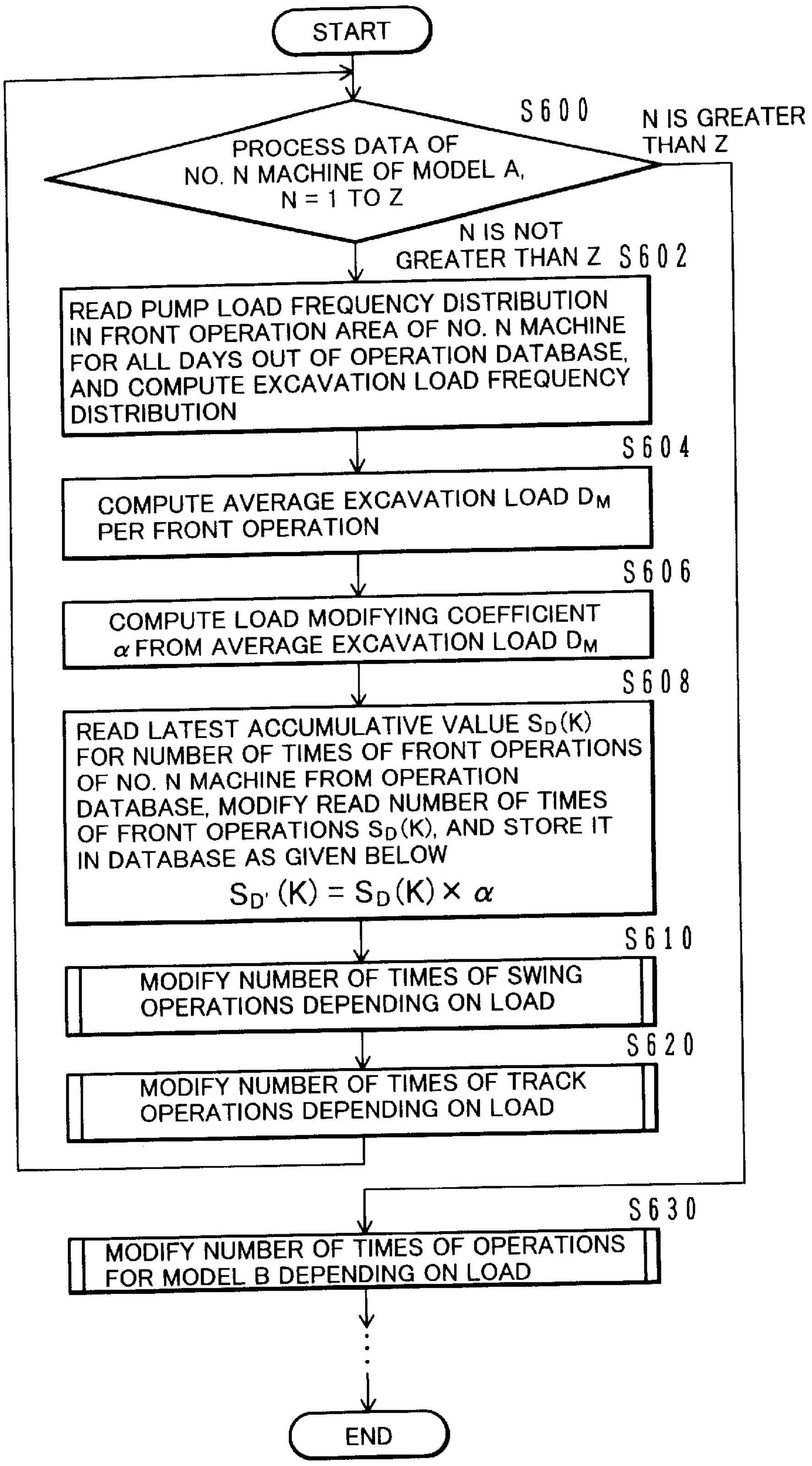
FIG. 48 is a flowchart showing details of processing to modify the number of times of operations depending on load.

FIG. 48 is a flowchart showing details of processing to modify the number of times of operations depending on load.

In FIG. 48, for processing all data of No. 1 to Z machines of the model A, the processing section 51 first determines whether the machine number N is not greater than Z (step S600). If N is not greater than Z, the pump load frequency distribution in a front operation area for the No. N machine is read for all working days out of the operation database shown in FIG. 36, and then classified to obtain an excavation load frequency distribution (step S602). This process is the same as that used to obtain the excavation load frequency distribution for computing the excavation load ratio in step S584A of FIG. 42 in the fourth embodiment, and the obtained excavation load frequency distribution is as shown in FIG. 43. Then, an average excavation load $D_M$ per front operation is computed (step S604). The average excavation load $D_M$ is determined, for example, by calculating the products of respective pump pressures and the number of times of front operations based on the excavation load ratio distribution, shown in FIG. 43, which is obtained in step S602, and then dividing the sum of those products by the number of times of front operations. As an alternative, the average excavation load $D_M$ may be determined by obtaining the position of the center of gravity (mark x) of an integral value of the excavation load frequency distribution shown in FIG. 43, and setting the pump pressure at the position of the center of gravity as $D_M$.

After obtaining the average excavation load $D_M$ as described above, a load modifying coefficient $\alpha$ is derived from the average excavation load $D_M$ (step S606). That process is executed using the preset relationship between the average excavation load $D_M$ and the load modifying coefficient a, which is shown, by way of example, in FIG. 49.

Figure 49:
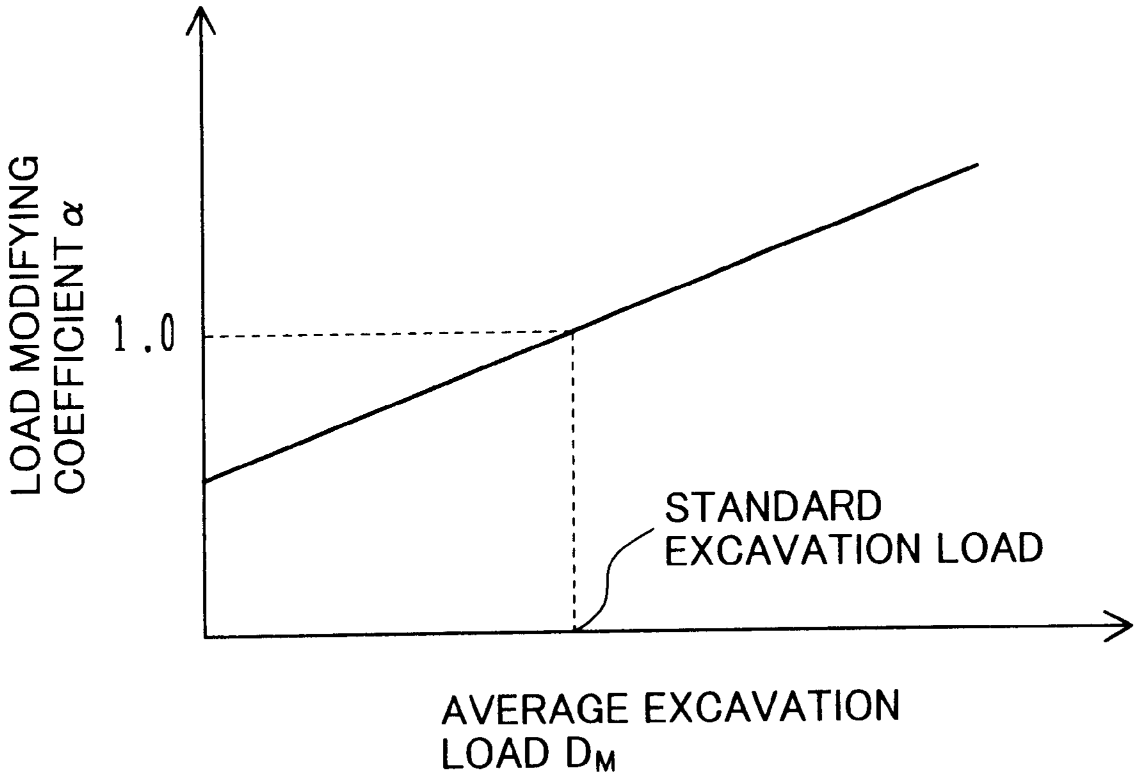
FIG. 49 is a graph showing the preset relationship between, an average excavation load $D_M$ and a load modifying coefficient $\alpha$.

In FIG. 49, the relationship between the average excavation load $D_M$ and the load modifying coefficient $\alpha$ is set such that $\alpha=1$ is held when $D_M$ is a standard load, but a is gradually increased from 1 as $D_M$ increases from the standard load, and $\alpha$ is gradually decreased as $D_M$ decreases from the standard load.

After obtaining the load modifying coefficient $\alpha$ as described above, the latest accumulative value $S_D(K)$ for the number of times of front operations is read out of the operation database shown in FIG. 36, and the read-out accumulative value $S_D(K)$ is modified with the load modifying coefficient $\alpha$, thereby obtaining the number $S'_D(K)$ of times of operations as given below (step S608):

$$S'_D(K)=S_D(K)\times\alpha$$

The thus-obtained number $S'_D(K)$ of times of operations is stored in the database 100 as the number of times of operations modified depending on load.

For each of the number of times of swing operations and the number of times of track operations, the number of times of operations modified depending on load is similarly obtained and stored in the database 100 (steps S610 and S620). Then, the above-described processing is executed for all of the machine numbers 1 to Z to obtain the number of times of operations modified depending on load for each of all hydraulic excavators of the model A, which is also stored in the database 100. Similarly, the number of times of operations modified depending on load is further obtained for each of all hydraulic excavators of other models such as B, and then stored in the database 100 (step S630).

The other processing in this embodiment than described above is the same as that in the third embodiment described with reference to FIGS. 34 to 40.

Also, for the fourth embodiment shown in FIGS. 41 to 46, the number of times of operations can be modified depending on load in a like manner.

Although the operating time of the hydraulic excavator and the operating time for each section are employed as they are in the first embodiment, that operating time can also be similarly modified depending on load as with the number of times of operations employed in the fifth embodiment.

In a construction machine such as a hydraulic excavator, not only the operation status but also the load differ among sections, and the state of use of the machine varies depending on the amount of load of each section as well. In this embodiment, the measured operation status (operating time or number of times of operations) for each section is modified depending on load, and the load-dependent modified operation status (operating time or number of times of operations) is statistically processed to confirm,how the customer employs the owned hydraulic excavator in practice. Therefore, whether the owned hydraulic excavator is an optimum model for the customer can be evaluated after compensating for differences in the state of use caused by differences in load. It is hence possible to give an advice about the optimum model more appropriately depending on the state of use.

In the above embodiments, an optimum model evaluation processing section (step S516 in FIG. 21 and step S566 in FIG. 27) is provided in an evaluating system so that the evaluating system determines by itself whether the particular hydraulic excavator is an optimum model. However, whether the particular hydraulic excavator is an optimum model may be determined by any suitable person, such as a serviceman, by directly outputting two kinds of data, i.e., a value of an operation status variable of the particular hydraulic excavator and a distribution of the number of operated hydraulic excavators of the same model as the particular hydraulic excavator with respect to the operation status variable, or three kinds of data, i.e., the above twos and a distribution of the number of operated hydraulic excavators of different model having an average value of the operation status variable, which is close to the value of the operation status variable of the particular hydraulic excavator.

Also, in the above embodiments, the data and graph for a distribution of the number of hydraulic excavators working in fields with respect to the operating time thereof are prepared and transmitted everyday in the center server 3 along with preparation and transmission of a daily report. However, such processing is not necessarily required to be made everyday, and may be executed at different frequencies such that the distribution data is prepared everyday and the distribution graph is plotted and transmitted once a week. Further, the distribution data may be automatically prepared in the center server 3, and the distribution graph may be plotted and transmitted in response to an instruction from the serviceman using the in-house computer. Alternatively, both the distribution data and the distribution graph may be prepared and transmitted in response to an instruction from the serviceman.

Further, in the above embodiments, the machine body information/optimum model evaluation processing section 51 of the center server 3 executes the whole of the processing to evaluate an optimum model whenever data is inputted from the in-house computer. However, the amount of processing required for evaluating whether the particular hydraulic excavator is an optimum model may be reduced by previously obtaining the distribution data for all machine models and all operation status variables, and storing the obtained distribution data as a database. This enables the customer to know the evaluation result with a faster response.

Moreover, while the engine running time is measured using the engine revolution speed sensor 46, it may be measured by a combination of a timer and a signal resulting from detecting turning-on/off of the engine key switch by the sensor 43. As an alternative, the engine running time may be measured by a combination of a timer and turning-on/off of a power generation signal from an alternator associated with the engine, or by rotating an hour meter with power generated by the alternator.

Additionally, while the information created by the center server 3 is transmitted to the user-side and in-house computers, it may also be returned to the side of the hydraulic excavator 1.

Industrial Applicability

According to the present invention, a value of an operation status variable of a particular construction machine and a distribution of the number of operated construction machines of the same model as the particular construction machine with respect to the operation status variable are obtained from operation data including an operating time for each section of the construction machine, and are compared with each other to determine whether the particular construction machine is an optimum model. Therefore, how the customer employs the owned construction machine (particular construction machine) in practice can be confirmed from comparison with other construction machines of the same model. It is hence possible to give an advice about the optimum model depending on the state of work.

Also, according to the present invention, a value of an operation status variable of a particular construction machine, a distribution of the number of operated construction machines of the same model as the particular construction machine with respect to the operation status variable, and a distribution of the number of operated construction machines of different model with respect to the operation status variable are obtained from operation data including an operating time for each section of the construction machine, and are compared with one another to determine whether the particular construction machine is an optimum model. Therefore, how the customer employs the owned construction machine (particular construction machine) in practice can be confirmed from comparison with other construction machines of the same model and other construction machines of different model. It is hence possible to give an advice about the optimum model more appropriately depending on the state of work.

What is claimed is:

1. A method for managing a construction machine, the method comprising the steps of:

a first step of measuring an operation status for sections of each of a plurality of construction machines working in fields and including a plurality of different models, and transferring the measured operation status to a base station computer and then storing and accumulating it as operation data in a database; and a second step of, in said base station computer, statistically processing said accumulated operation data and producing and outputting evaluation data for determining whether a selected one of said plurality of construction machines is an optimum model based on the operation status of the selected construction machine.

2. A method for managing a construction machine according to claim 1, wherein said second step includes a third step of calculating, as said evaluation data, a value of at least one index regarding the state of use which represents how the selected one of said plurality of construction machines is used based on said accumulated operation data, and determines based on the calculated index value whether the selected construction machine is an optimum model based on operation status of the selected construction machine.

3. A method for managing a construction machine according to claim 2, wherein said second step further includes a fourth step of calculating, as said evaluation data, a value of said index for each of construction machines of the same model as the selected construction machine based on said accumulated operation data, thereby obtaining first correlation between said index and the number of operated construction machines, and compares the index value of the selected construction machine with the first correlation to determine whether the selected construction machine is an optimum model based on the operation status of the selected construction machine.

4. A method for managing a construction machine according to claim 3, wherein said second step further includes a fifth step of calculating, as said evaluation data, a value of said index for each of construction machines of at least one of the different models of said plurality of construction machines, which differs from the model of the selected construction machine, based on said accumulated operation data, thereby obtaining second correlation between said index and the number of operated construction machines, and compares the index value of the selected construction machine with the first and second correlations to determine whether the selected construction machine is an optimum model based on the operation status of the selected construction machine.

5. A method for managing a construction machine according to claim 1, wherein said first step measures a load for each of said sections in addition to the operation status for each section, and stores and accumulates the measured load in the database of said base station computer; and said second step further includes a sixth step of modifying the measured operation status depending on an amount of the measured load, and produces said evaluation data by using, as said operation data, the load-dependent modified operation status.

6. A method for managing a construction machine according to claim 1, wherein the operation status is represented by at lease one of an operating time and the number of times of operations.

7. A method for managing a construction machine according to claim 1, wherein said construction machine is a hydraulic excavator, and said section is any of a front, a swing body, a track body and an engine of the hydraulic excavator.

8. A method for managing a construction machine according to claim 1, wherein said construction machine is a hydraulic excavator; said sections include a front, a swing body, a track body and an engine of the hydraulic excavator; the operation status is represented by an operating time for each of said front, said swing body, said track body and said engine; and said index includes at least one of a ratio of an engine running time to a travel time, a ratio of the engine running time to a time during which a pump pressure is not lower than a predetermined value, the product of a ratio of the engine running time to a swing time and a bucket capacity, and the product of a ratio of the engine running time to an excavation time and an excavator body weight.

9. A method for managing a construction machine according to claim 1, wherein said construction machine is a hydraulic excavator; said sections include a front, a swing body and a track body of the hydraulic excavator; the operation status is represented by the number of times of operations for each of said front, said swing body and said track body; and said index includes at least one of a ratio of the total number of times of operations to the number of times of track operations, a ratio of the total number of times of operations to the number of times of operations in which a pump pressure is not lower than a predetermined value, the product of a ratio of the total number of times of operations to the number of times of track operations and a bucket capacity, and the product of a ratio of the total number of times of operations to the number of times of front operations and an excavator body weight.

10. A system for managing a construction machine, the system comprising:

data measuring and collecting means for measuring and collecting an operation status for each section of each of a plurality of construction machines working in fields and including a plurality of different models; and a base station computer mounted in a base station and having a database in which the operation status measured and collected for each section is stored and accumulated as operation data, said base station computer including computing means for statistically processing said accumulated operation data to produce and output evaluation data for determining whether a selected one of said plurality of construction machines is an optimum model based on the operation status of the selected construction machine.

11. A system for managing a construction machine according to claim 10, wherein said computing means includes first means for calculating, as said evaluation data, a value of at least one index regarding the state of use which represents how the selected one of said plurality of construction machines is used based on said accumulated operation data, and determines based on the calculated index value whether the selected construction machine is an optimum model based on the operation status of the selected construction machine.

12. A system for managing a construction machine according to claim 11, wherein said computing means further includes second means for calculating, as said evaluation data, a value of said index for each of construction machines of the same model as the selected construction machine based on said accumulated operation data, thereby obtaining first correlation between said index and the number of operated construction machines, and compares the index value of the selected construction machine with the first correlation to determine whether the selected construction machine is an optimum model based on the operation status of the selected construction machine.

13. A system for managing a construction machine according to claim 12, wherein said computing means further includes third means for comparing the index value of the selected construction machine with the first correlation to determine whether the selected construction machine is an optimum model for the operation status of the selected construction machine.

14. A system for managing a construction machine according to claim 12, wherein said computing means further includes fourth means for calculating, as said evaluation data, a value of said index for each of construction machines of at least one of the different models of said plurality of construction machines, which differs from the model of the selected construction machine, based on said accumulated operation data, thereby obtaining second correlation between said index and the number of operated construction machines, and compares the index value of the selected construction machine with the first and second correlations to determine whether the selected construction machine is an optimum model based on the operation status of the selected construction machine.

15. A system for managing a construction machine according to claim 14, wherein said computing means further includes fifth means for comparing the index value of the selected construction machine with the first and second correlations to determine whether the selected construction machine is an optimum model based on the operation status of the selected construction machine.

16. A system for managing a construction machine according to claim 10, wherein said data measuring and collecting means measures and collects, in addition to the operation status for each section, a load for each section;

said base station computer stores and accumulates the operation status and the load measured and collected for each section, as the operation data, in the database; and said computing means further includes sixth means for modifying the measured operation status depending on an amount of the measured load, and produces said evaluation data by using, as said operation data, the load-dependent modified operation status.

17. A processing apparatus wherein an operation status for sections of each of a plurality of construction machines working in fields and including different models is stored and accumulated as operation data, and the accumulated operation data is statistically processed to produce and output evaluation data for determining whether a selected one of said plurality of construction machines is an optimum model based on the operation status of the selected construction machine.

* * * * *